United States Patent
Mukawa

(10) Patent No.: US 9,972,135 B2
(45) Date of Patent: *May 15, 2018

(54) DISPLAY INSTRUMENT AND IMAGE DISPLAY METHOD

(71) Applicant: Sony Corporation, Tokyo (JP)

(72) Inventor: Hiroshi Mukawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/353,110

(22) Filed: Nov. 16, 2016

(65) Prior Publication Data

US 2017/0069140 A1 Mar. 9, 2017

Related U.S. Application Data

(63) Continuation of application No. 13/875,593, filed on May 2, 2013.

(30) Foreign Application Priority Data

May 9, 2012 (JP) .................................. 2012-107213

(51) Int. Cl.
*G06T 19/00* (2011.01)
*G06T 5/50* (2006.01)
(Continued)

(52) U.S. Cl.
CPC .......... *G06T 19/006* (2013.01); *G02B 27/017* (2013.01); *G02B 27/0172* (2013.01);
(Continued)

(58) Field of Classification Search
CPC ..... G06T 5/50; G06T 19/006; G06T 2215/16; G02B 27/017; G02B 27/0172;
(Continued)

(56) References Cited

U.S. PATENT DOCUMENTS 6,137,457 A 10/2000 Tokuhashi et al.
7,924,506 B2 4/2011 Rieger
(Continued)

FOREIGN PATENT DOCUMENTS

CN 1071262 A 4/1993
CN 1774661 A 5/2006
(Continued)

OTHER PUBLICATIONS

Keller et al., Head mounted Displays for Medical Use. J Disp Tech. Dec. 1, 2008;4(4):468-72.
(Continued)

*Primary Examiner* — Jwalant Amin
(74) *Attorney, Agent, or Firm* — Wolf, Greenfield & Sacks, P.C.

(57) ABSTRACT

A head-mounted display device including an image display apparatus configured to display a captured image of a portion of an environment viewable through the head-mounted display device; and a dimmer configured to, while the captured image is displayed, allow a portion of ambient light from the environment to pass through the dimmer. Also, a method of displaying information on a head-mounted display device. The method may include displaying a captured image of a portion of an environment viewable through the display device; and dimming ambient light received through the head-mounted display device from the environment while displaying the captured image.

21 Claims, 29 Drawing Sheets

(51) Int. Cl.
  *G06F 3/01* (2006.01)
  *G06F 3/16* (2006.01)
  *G06K 9/62* (2006.01)
  *G09G 5/00* (2006.01)
  *G02B 27/01* (2006.01)

(52) U.S. Cl.
  CPC ......... *G02B 27/0179* (2013.01); *G06F 3/013* (2013.01); *G06F 3/167* (2013.01); *G06K 9/6201* (2013.01); *G06T 5/50* (2013.01); *G09G 5/003* (2013.01); *G02B 2027/014* (2013.01); *G02B 2027/0118* (2013.01); *G02B 2027/0138* (2013.01); *G02B 2027/0178* (2013.01); *G02B 2027/0187* (2013.01); *G06T 2215/16* (2013.01)

(58) Field of Classification Search
  CPC .... G02B 2027/0118; G02B 2027/0138; G02B 2027/0187; G02B 27/0179; G02B 2027/014; G02B 2027/0178; G06F 3/013; G06F 3/167; G06K 9/6201; G09G 5/003
  See application file for complete search history.

(56) References Cited

U.S. PATENT DOCUMENTS

| | | | |
|---|---|---|---|
| 8,411,134 B2 | 4/2013 | Tomita | |
| 8,570,242 B2 | 10/2013 | Chosokabe et al. | |
| 8,797,433 B2 | 8/2014 | Kaizu et al. | |
| 8,861,090 B2 | 10/2014 | Mukawa | |
| 8,907,865 B2 | 12/2014 | Miyawaki et al. | |
| 8,976,453 B2 | 3/2015 | Akutsu et al. | |
| 8,988,315 B2 | 3/2015 | Mukawa et al. | |
| 9,016,864 B2 | 4/2015 | Sasazaki et al. | |
| 9,096,920 B1 | 8/2015 | Gomez et al. | |
| 9,164,221 B2 | 10/2015 | Akutsu et al. | |
| 9,201,242 B2 | 12/2015 | Miyawaki et al. | |
| 9,311,752 B2 | 4/2016 | Chosokabe et al. | |
| 9,451,244 B2 | 9/2016 | Sasazaki et al. | |
| 9,488,846 B2 | 11/2016 | Hayashi | |
| 9,558,540 B2 | 1/2017 | Mukawa | |
| 9,569,897 B2 | 2/2017 | Miyawaki et al. | |
| 9,658,456 B2 | 5/2017 | Mukawa | |
| 9,709,809 B2 | 7/2017 | Miyawaki et al. | |
| 9,726,890 B2 | 8/2017 | Akutsu et al. | |
| 9,753,284 B2 | 9/2017 | Machida et al. | |
| 9,759,920 B2 | 9/2017 | Akutsu et al. | |
| 9,766,453 B2 | 9/2017 | Mukawa | |
| 9,791,701 B2 | 10/2017 | Ato et al. | |
| 2006/0228073 A1 | 10/2006 | Mukawa et al. | |
| 2007/0012925 A1 | 1/2007 | Hong et al. | |
| 2007/0070859 A1 | 3/2007 | Hirayama | |
| 2007/0091445 A1 | 4/2007 | Amitai | |
| 2007/0159673 A1 | 7/2007 | Freeman et al. | |
| 2008/0285140 A1 | 11/2008 | Amitai | |
| 2010/0110368 A1 | 5/2010 | Chaum | |
| 2010/0128107 A1 | 5/2010 | Tomita | |
| 2010/0277687 A1 | 11/2010 | Shehadeh et al. | |
| 2010/0321409 A1* | 12/2010 | Komori | G02B 27/017 345/656 |
| 2011/0050727 A1 | 3/2011 | Mukawa | |
| 2011/0090389 A1 | 4/2011 | Saito | |
| 2011/0241975 A1 | 10/2011 | Mukawa et al. | |
| 2011/0248904 A1 | 10/2011 | Miyawaki et al. | |
| 2011/0248905 A1 | 10/2011 | Chosokabe et al. | |
| 2012/0044571 A1 | 2/2012 | Mukawa | |
| 2012/0119978 A1 | 5/2012 | Border et al. | |
| 2012/0127434 A1 | 5/2012 | Sasazaki et al. | |
| 2012/0194420 A1 | 8/2012 | Osterhout et al. | |
| 2012/0212398 A1 | 8/2012 | Border et al. | |
| 2012/0218426 A1 | 8/2012 | Kaizu et al. | |
| 2012/0249895 A1 | 10/2012 | Kaifu | |
| 2012/0297014 A1* | 11/2012 | Lahcanski | G06Q 30/0241 709/217 |
| 2013/0113973 A1 | 5/2013 | Miao | |
| 2013/0128611 A1 | 5/2013 | Akutsu et al. | |
| 2013/0135749 A1 | 5/2013 | Akutsu et al. | |
| 2013/0241948 A1 | 9/2013 | Kimura | |
| 2013/0242555 A1 | 9/2013 | Mukawa | |
| 2013/0300766 A1 | 11/2013 | Mukawa | |
| 2014/0022284 A1 | 1/2014 | Chosokabe et al. | |
| 2014/0253605 A1 | 9/2014 | Border et al. | |
| 2014/0334010 A1 | 11/2014 | Mukawa | |
| 2014/0340286 A1 | 11/2014 | Machida et al. | |
| 2014/0340550 A1 | 11/2014 | Kaizu et al. | |
| 2014/0347252 A1 | 11/2014 | Miyawaki et al. | |
| 2015/0062699 A1 | 3/2015 | Hayashi | |
| 2015/0109679 A1 | 4/2015 | Mukawa et al. | |
| 2015/0138647 A1 | 5/2015 | Akutsu et al. | |
| 2015/0226970 A1 | 8/2015 | Mukawa | |
| 2015/0229897 A1 | 8/2015 | Mukawa | |
| 2015/0235620 A1 | 8/2015 | Takahota et al. | |
| 2015/0260994 A1 | 9/2015 | Akutsu et al. | |
| 2015/0260995 A1 | 9/2015 | Mukawa | |
| 2015/0269784 A1 | 9/2015 | Miyawaki et al. | |
| 2015/0277125 A1 | 10/2015 | Hirano et al. | |
| 2015/0277126 A1 | 10/2015 | Hirano et al. | |
| 2015/0288954 A1 | 10/2015 | Sasazaki et al. | |
| 2015/0338660 A1 | 11/2015 | Mukawa | |
| 2015/0346494 A1 | 12/2015 | Tanaka et al. | |
| 2015/0362735 A1 | 12/2015 | Akutsu et al. | |
| 2015/0370075 A1 | 12/2015 | Hong et al. | |
| 2016/0041394 A1 | 2/2016 | Tanaka et al. | |
| 2016/0062123 A1 | 3/2016 | Tanaka et al. | |
| 2016/0097931 A1 | 4/2016 | Takahota et al. | |
| 2016/0147069 A1 | 5/2016 | Tanaka et al. | |
| 2016/0154243 A1 | 6/2016 | Aiki | |
| 2016/0337570 A1 | 11/2016 | Tan et al. | |
| 2017/0115492 A1 | 4/2017 | Miyawaki et al. | |
| 2017/0184857 A1 | 6/2017 | Ato et al. | |
| 2017/0322420 A1 | 11/2017 | Machida et al. | |

FOREIGN PATENT DOCUMENTS

| | | |
|---|---|---|
| CN | 1957269 A | 5/2007 |
| CN | 101141568 A | 3/2008 |
| CN | 103119512 A | 5/2013 |
| EP | 2 535 760 A2 | 12/2012 |
| EP | 2 662 723 A1 | 11/2013 |
| JP | 57-026822 A | 2/1982 |
| JP | 01-188826 A | 7/1989 |
| JP | 02-004212 A | 1/1990 |
| JP | 08-160340 A | 6/1996 |
| JP | 08-160344 A | 6/1996 |
| JP | 10-126711 A | 5/1998 |
| JP | 10-319240 A | 12/1998 |
| JP | 2000-171750 A | 6/2000 |
| JP | 2003-015075 | 1/2003 |
| JP | 2004-101197 A | 4/2004 |
| JP | 2005-172851 A | 6/2005 |
| JP | 2005-308889 A | 11/2005 |
| JP | 2006-162767 A | 6/2006 |
| JP | 2006-209144 A | 8/2006 |
| JP | 2006-267887 A | 10/2006 |
| JP | 2006-308858 | 11/2006 |
| JP | 2006-343747 | 12/2006 |
| JP | 2007-094175 A | 4/2007 |
| JP | 2007-264324 A | 10/2007 |
| JP | 2008-085548 A | 4/2008 |
| JP | 2008-103916 A | 5/2008 |
| JP | 2009-104170 | 5/2009 |
| JP | 2009-145513 A | 7/2009 |
| JP | 2009-251428 A | 10/2009 |
| JP | 2009-284175 A | 12/2009 |
| JP | 2010-145674 A | 7/2010 |
| JP | 2010-282231 A | 12/2010 |
| JP | 2011-209732 A | 10/2011 |
| JP | 2012-013940 | 1/2012 |
| JP | 2012-088472 A | 5/2012 |
| JP | 2012-252091 A | 12/2012 |
| JP | 2013-005201 A | 1/2013 |
| JP | 2013-122519 A | 6/2013 |
| JP | 2013-210643 A | 10/2013 |

(56) References Cited

FOREIGN PATENT DOCUMENTS

| JP | 2013-214856 A | 10/2013 |
|---|---|---|
| WO | WO 2005/093493 | 10/2005 |
| WO | WO 2006/085310 A1 | 8/2006 |
| WO | WO 2008/078320 A2 | 7/2008 |
| WO | WO 2010/087293 A1 | 8/2010 |

OTHER PUBLICATIONS

U.S. Appl. No. 14/422,103, filed Feb. 17, 2015, Takahota et al.
U.S. Appl. No. 12/624,576, filed Nov. 24, 2009, Tomita.
U.S. Appl. No. 13/053,697, filed Mar. 22, 2011, Mukawa et al.
U.S. Appl. No. 13/078,153, filed Apr. 1, 2011, Chosokabe et al.
U.S. Appl. No. 13/078,147, filed Apr. 1, 2011, Miyawaki et al.
U.S. Appl. No. 13/207,673, filed Aug. 11, 2011, Mukawa.
U.S. Appl. No. 13/295,607, filed Nov. 14, 2011, Sasazaki et al.
U.S. Appl. No. 13/399,222, filed Feb. 17, 2012, Kaizu et al.
U.S. Appl. No. 13/677,410, filed Nov. 15, 2012, Akutsu et al.
U.S. Appl. No. 13/678,604, filed Nov. 16, 2012, Akutsu et al.
U.S. Appl. No. 13/779,008, filed Feb. 27, 2013, Mukawa.
U.S. Appl. No. 13/875,593, filed May 2, 2013, Mukawa.
U.S. Appl. No. 14/031,740, filed Sep. 19, 2013, Chosokabe et al.
U.S. Appl. No. 14/326,963, filed Jul. 9, 2014, Kaizu et al.
U.S. Appl. No. 14/337,620, filed Jul. 22, 2014, Mukawa.
U.S. Appl. No. 14/370,362, filed Jul. 2, 2014, Machida et al.
U.S. Appl. No. 14/457,836, filed Aug. 12, 2014, Hayashi.
U.S. Appl. No. 14/458,354, filed Aug. 13, 2014, Miyawaki et al.
U.S. Appl. No. 14/581,037, filed Dec. 23, 2014, Mukawa et al.
U.S. Appl. No. 14/604,122, filed Jan. 23, 2015, Akutsu et al.
U.S. Appl. No. 14/612,484, filed Feb. 3, 2015, Mukawa.
U.S. Appl. No. 14/612,710, filed Feb. 3, 2015, Mukawa.
U.S. Appl. No. 14/640,437, filed Mar. 6, 2015, Mukawa.
U.S. Appl. No. 14/655,243, filed Jun. 24, 2015, Tanaka et al.
U.S. Appl. No. 14/659,784, filed Mar. 17, 2015, Hirano et al.
U.S. Appl. No. 14/659,943, filed Mar. 17, 2015, Hirano et al.
U.S. Appl. No. 14/680,632, filed Apr. 7, 2015, Sasazaki et al.
U.S. Appl. No. 14/733,700, filed Jun. 8, 2015, Miyawaki et al.
U.S. Appl. No. 14/758,818, filed Jul. 1, 2015, Mukawa.
U.S. Appl. No. 14/762,615, filed Jul. 22, 2015, Ato et al.
U.S. Appl. No. 14/781,972, filed Oct. 2, 2015, Tanaka et al.
U.S. Appl. No. 14/728,054, filed Oct. 2, 2015, Tanaka et al.
U.S. Appl. No. 14/797,663, filed Jul. 13, 2015, Akutsu et al.
U.S. Appl. No. 14/889,502, filed Nov. 6, 2015, Takahota et al.
U.S. Appl. No. 14/901,192, filed Dec. 28, 2015, Aiki.
U.S. Appl. No. 14/903,639, filed Jan. 8, 2016, Tanaka et al.
Chinese Office Action and English Translation thereof dated Feb. 24, 2016 in connection with Chinese Application No. 201310157754.3.
Chinese Office Action dated Dec. 3, 2015 and English translation thereof in connection with Chinese Application No. 201280067360.2.
Extended European Search Report dated Mar. 4, 2016 in connection with European Application No. 12866948.8.
Extended European Search Report dated Dec. 8, 2015 in connection with European Application No. 15152708.2.
Extended European Search Report, dated Aug. 5, 2013 in connection with European Application No. 13002324.5.
International Preliminary Report on Patentability dated Aug. 7, 2014 in connection with Application No. PCT/JP2012/082461.
International Preliminary Report on Patentability dated Sep. 3, 2015 in connection with Application No. PCT/JP2014/000338.
International Search Report and Written Opinion dated Jan. 15, 2013 in connection with Application No. PCT/JP2012/082461.
International Search Report and Written Opinion dated Mar. 24, 2014 in connection with Application No. PCT/JP2014/000338.
Japanese Office Action dated Jan. 12, 2016 in connection with Japanese Application No. 2013-030773.
Japanese Office Action dated Jan. 12, 2016 in connection with Japanese Application No. 2013-555152.
Japanese Office Action dated Mar. 8, 2016 in connection with Japanese Application No. 2012-107213.
Japanese Office Action dated Sep. 8, 2015 in connection with Japanese Application No. 2012-107213.
Partial European Search Report dated Sep. 2, 2015 in connection with European Application No. 15152708.2.
Japanese Office Action dated Oct. 4, 2016 in connection with Japanese Application No. 2012-107213.
U.S. Appl. No. 14/640,349, filed Mar. 6, 2015, Akutsu et al.
U.S. Appl. No. 15/388,544, filed Dec. 22, 2016, Miyawaki et al.
Japanese Office Action dated Dec. 20, 2016 in connection with Japanese Application No. 2016-041730.
Japanese Office Action dated Dec. 20, 2016 in connection with Japanese Application No. 2014-053191.
U.S. Appl. No. 15/454,472, filed Mar. 9, 2017, Ato et al.
U.S. Appl. No. 15/658,601, filed Jul. 25, 2017, Machida et al.
Japanese Office Action dated Aug. 8, 2017 in connection with Japanese Application No. 2014-053191 and English translation thereof.

* cited by examiner (EMBODIMENT 1)

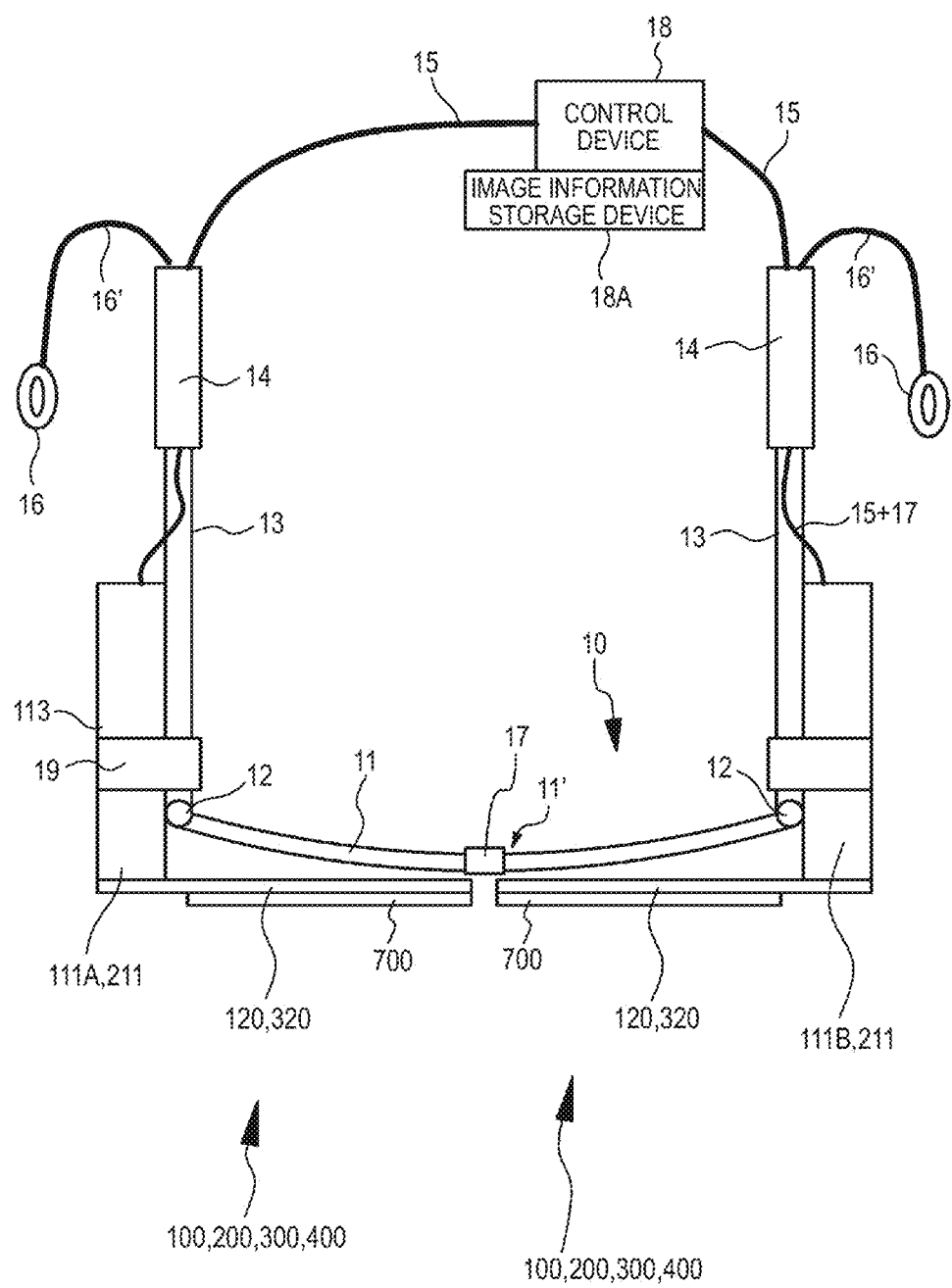

IMAGE DISPLAYED ON OPTICAL DEVICE

SUBJECT A

IMAGE DISPLAYED ON OPTICAL DEVICE

IMAGE OF SUBJECT A

EXTERNAL WORLD VIEWED THROUGH OPTICAL DEVICE

IMAGE OF SUBJECT A DISPLAYED ON OPTICAL DEVICE (EMBODIMENT 2)

FIG.13 (EMBODIMENT 3)

(EMBODIMENT 5)

(EMBODIMENT 6)

(EMBODIMENT 7)

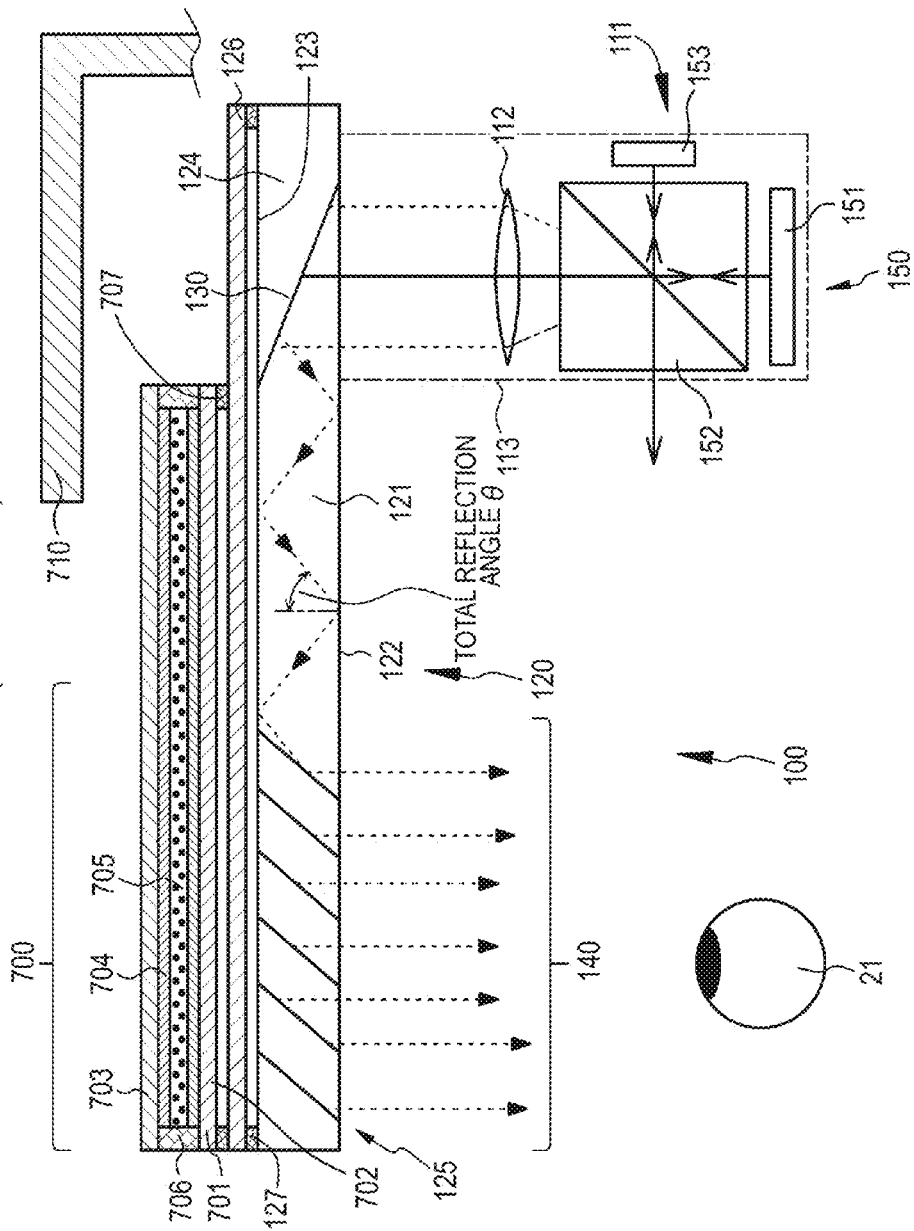

(EMBODIMENT 9)

FIG.28 (EMBODIMENT 12)

DISPLAY INSTRUMENT AND IMAGE DISPLAY METHOD

RELATED APPLICATIONS

This application is a continuation of and claims the benefit under 35 U.S.C. § 120 of U.S. patent application Ser. No. 13/875,593, titled "DISPLAY INSTRUMENT AND IMAGE DISPLAY METHOD," filed on May 2, 2013, which claims priority to Japanese Patent Application Number JP 2012-107213 filed in the Japan Patent Office on May 9, 2012, the entire contents of which are hereby incorporated by reference.

FIELD

The present disclosure relates to a display instrument and an image display method, and more specifically to a display instrument used as a head mounted display (HMD) and an image display method.

BACKGROUND

In recent years, an augmented reality (AR) technique has attracted attention, in which a virtual object or a variety of information as additional information is combined with a real environment (or a portion thereof), and the combined result is presented as electronic information. In order to realize this augmented reality technique, for example, a head mounted display has been examined as an instrument for presenting visual information. In addition, examples of application fields include provision of route guidance information and provision of technique information to an engineer who performs maintenance, which are expected to support the work in a real environment. Particularly, the head mounted display is very convenient since the hands are free. In addition, in a case where videos or images are desired to be enjoyed while moving outdoors as well, the videos or the images and the external environment can be understood simultaneously in the range of vision, and thus smooth movement is possible.

For example, JP-A-2006-162767 discloses a virtual image display apparatus (image display apparatus) which causes a two-dimensional image formed by an image forming device to be observed by an observer as an enlarged virtual image using a virtual image optical system.

As shown in FIG. 29 which is a conceptual diagram, the image display apparatus 100' includes an image forming device 111 provided with a plurality of pixels arranged in a two-dimensional matrix state, a collimating optical system 112 which converts light emitted from the pixels of the image forming device 111 into parallel light, and an optical device (light guide unit) 120 which guides and emits incident light which has been converted into the parallel light in the collimating optical system 112. The optical device 120 includes a light guide plate 121 which causes the incident light to propagate through total reflection and to be emitted, a first deflection unit 130 (for example, formed of a single-layer light reflection film) which reflects the light incident to the light guide plate 121 such that the light incident to the light guide plate 121 is totally reflected inside the light guide plate 121, and a second deflection unit 140 (for example, formed of multi-layer light reflection films having a multi-layer laminate structure) which emits the light which has propagated inside the light guide plate 121 through the total reflection, from the light guide plate 121. In addition, if, for example, an HMD is formed using the image display apparatus 100', it is possible to achieve light weight and miniaturization of the apparatus. In addition, an image display apparatus according to Embodiment 1 described with reference to FIG. 1 is referred to in relation to the reference numerals indicating other constituent elements in FIG. 29.

Alternatively, for example, JP-A-2007-94175 discloses a virtual image display apparatus (image display apparatus) which employs a hologram diffraction grating in order to cause a two-dimensional image formed by an image forming device to be observed by an observer as an enlarged virtual image using a virtual image optical system.

As shown in FIG. 30 which is a conceptual diagram, the image display apparatus 300' basically includes an image forming device 111 which displays an image, a collimating optical system 112, and an optical device (light guide unit) 320 to which light displayed in the image forming device 111 is incident and which guides the light to the pupil 21 of the observer. Here, the optical device 320 includes a light guide plate 321, and a first diffraction grating member 330 and a second diffraction grating member 340 formed by a reflective volume hologram diffraction grating provided in the light guide plate 321. In addition, light emitted from each pixel of the image forming device 111 is incident to the collimating optical system 112, and thus a plurality of parallel light beams of which angles incident to the light guide plate 321 are different are generated by the collimating optical system 112 and are incident to the light guide plate 321. The incident parallel light beams are emitted from a first surface 322 of the light guide plate 321. On the other hand, the first diffraction grating member 330 and the second diffraction grating member 340 are installed on a second surface 323 of the light guide plate 321, parallel to the first surface 322 of the light guide plate 321. In addition, an image display apparatus according to Embodiment 3 described with reference to FIG. 13 is referred to in relation to the reference numerals indicating other constituent elements in FIG. 30.

In addition, an image is displayed on the image display apparatus 100' or 300', and thereby an observer can observe an external object and the displayed image in an overlapping manner. In addition, for convenience, these image display apparatuses 100' and 300' are referred to as "semi-transmissive image display apparatuses".

On the other hand, for example, JP-A-2008-103916 discloses an image display apparatus of a type different from that of the above-described image display apparatuses. In the image display apparatus disclosed therein, an observer can observe an image, displayed in the image display apparatus, related to the augmented reality technique but is unable to observe an external object. In addition, for convenience, this image display apparatus is referred to as a "non-transmissive image display apparatus".

SUMMARY

However, in the semi-transmissive image display apparatus in the related art, a composite image in which an image of an external object captured by the imaging apparatus is combined with additional information related thereto with high accuracy through image processing is unable to be favorably viewed via the image display apparatus without being impeded by ambient light. In addition, in the non-transmissive image display apparatus in the related art, an external object is unable to be observed with the naked eye as described above.

Therefore, it is desirable to provide a display instrument having an image display apparatus which can be used as both of a semi-transmissive image display apparatus and a non-transmissive image display apparatus and enables a composite image in which an image of an external object captured by an imaging apparatus is combined with additional information related thereto with high accuracy through image processing to be favorably viewed via the image display apparatus without being impeded by ambient light, and an image display method using the related display instrument.

An embodiment of the present disclosure is directed to a display instrument, more specifically a head mounted display (HMD), including (i) a frame that is installed on a head part of an observer; (ii) an image display apparatus that is installed in the frame; and (iii) an imaging apparatus, wherein the image display apparatus includes (A) an image forming device; (B) an optical device that allows light emitted from the image forming device to be incident thereto, to be guided, and to be emitted therefrom; and (C) a dimming device that adjusts a light amount of ambient light incident from the outside, and wherein, in a first mode in which an image captured by the imaging apparatus is displayed on the image display apparatus, the light amount of ambient light incident from the outside is reduced by the dimming device.

Another embodiment of the present disclosure is directed to an image display method using a display instrument including (i) a frame that is installed on a head part of an observer; (ii) an image display apparatus that is installed in the frame; and (iii) an imaging apparatus, wherein the image display apparatus includes (A) an image forming device; (B) an optical device that allows light emitted from the image forming device to be incident thereto, to be guided, and to be emitted therefrom; and (C) a dimming device that adjusts a light amount of ambient light incident from the outside, the method including causing the dimming device to reduce the light amount of ambient light incident from the outside in a first mode in which an image captured by the imaging apparatus is displayed on the image display apparatus.

In the display instrument or the image display method according to the embodiment of the present disclosure, the dimming device is provided which adjusts a light amount of ambient light incident from the outside, and, in the first mode in which an image captured by the imaging apparatus is displayed on the image display apparatus, the light amount of ambient light incident from the outside is reduced by the dimming device. Therefore, a composite image in which an image of an external object captured by the imaging apparatus is combined with additional information related thereto with high accuracy through an image process can be favorably viewed via the image display apparatus without being impeded by ambient light.

Some embodiments are directed to a head-mounted display device. The device may include an image display apparatus configured to display a captured image of a portion of an environment viewable through the head-mounted display device; and a dimmer configured to, while the captured image is displayed, allow a portion of ambient light from the environment to pass through the dimmer.

Some embodiments are directed to a method of displaying information on a head-mounted display device. The method may include displaying a captured image of a portion of an environment viewable through the display device; and dimming ambient light received through the head-mounted display device from the environment while displaying the captured image.

BRIEF DESCRIPTION OF THE DRAWINGS

FIG. 2 is a schematic diagram of the display instrument of Embodiment 1 and the like, viewed from the top side.

FIG. 20 is a conceptual diagram of a display instrument of Embodiment 8.

DETAILED DESCRIPTION

Figure 1:
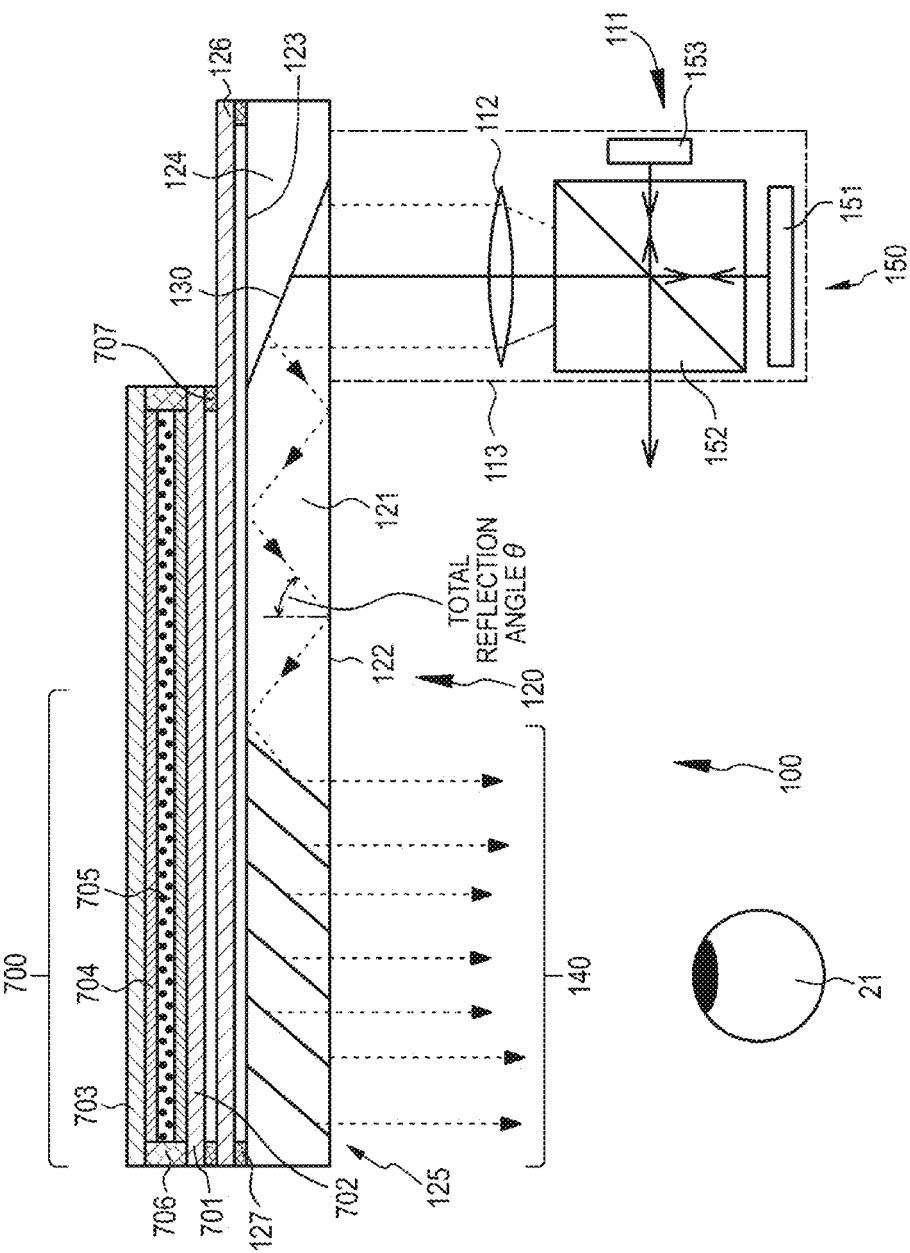
FIG. 1 is a conceptual diagram of a display instrument of Embodiment 1.

Hereinafter, the present disclosure will be described based on embodiments with reference to the drawings; however, the present disclosure is not limited to the embodiments, and various numerical values or materials in the embodiments are only an example. In addition, the description will be made in the following order.

1. Description of the overall display instrument and the image display method according to embodiments of the present disclosure
2. Embodiment 1 (a display instrument and an image display method, and an image forming device with a first configuration)
3. Embodiment 2 (a modification of Embodiment 1)
4. Embodiment 3 (another modification of Embodiment 1, and an image forming device with a second configuration)
5. Embodiment 4 (a modification of Embodiment 3)
6. Embodiment 5 (a modification of Embodiment 1 to Embodiment 4)
7. Embodiment 6 (a modification of Embodiment 1 to Embodiment 4)
8. Embodiment 7 (a modification of Embodiment 1 to Embodiment 4)
9. Embodiment 8 (a modification of Embodiment 1 to Embodiment 7, and a display instrument related to a first example of the present disclosure)
10. Embodiment 9 (a modification of Embodiment 8)
11. Embodiment 10 (another modification of Embodiment 8)
12. Embodiment 11 (a modification of Embodiment 8 to Embodiment 10)
13. Embodiment 12 (a modification of Embodiment 1 to Embodiment 7, and Embodiment 11, and a display instrument related to a second example of the present disclosure), and others

[Description of Overall Display Instrument and Image Display Method According to Embodiments of Present Disclosure]

In a display instrument according to an embodiment of the present disclosure or in a display instrument of an image display method according to an embodiment of the present disclosure, the overall image or a portion thereof captured by the imaging apparatus may be displayed in the image forming device in the first mode. In addition, in the first mode, the image display apparatus functions as a non-transmissive type.

Alternatively, in the display instrument according to the embodiment of the present disclosure or in the display instrument of the image display method according to the embodiment of the present disclosure, an image information storage device may be further provided, and, in the first mode, data regarding a subject imaged by the imaging apparatus may be compared with information stored in the image information storage device, and an image of the subject conforming to the information stored in the image information storage device may be displayed on the image display apparatus in a state where a light amount of ambient light incident from the outside is reduced by the dimming device. In other words, in this case, the overall image captured by the imaging apparatus is not displayed on the image display apparatus but an image (or an image which is a portion of the image captured by the imaging apparatus and includes a specific subject) of the specific subject which is a subject conforming to the information stored in the image information storage device is displayed on the image display apparatus. In addition, the "data regarding a subject imaged by the imaging apparatus" may include, for example, data of extracted feature points of the subject imaged by the imaging apparatus. Further, the "information stored in the image information storage device" may include, for example, data of feature points of various objects. Furthermore, the "comparison of the data regarding the subject imaged by the imaging apparatus with the information stored in the image information storage device" may include, specifically, for example, a comparison regarding whether extracted feature points of the subject imaged by the imaging apparatus conform to feature points stored in the image information storage device. In addition, in the first mode, the data regarding the subject imaged by the imaging apparatus may be compared with the information stored in the image information storage device, and information corresponding to the data regarding the subject may be displayed on the image display apparatus. Further, the "information corresponding to the data regarding the subject" will be described later.

In the display instrument according to the embodiment of the present disclosure or in the display instrument of the image display method according to the embodiment of the present disclosure, including the above-described preferable forms, in the first mode, when a light amount of ambient light incident to the dimming device is "1", a light amount of the ambient light passing through the dimming device is 0.1 or less, and preferably 0.05 or less. Thereby, it is possible to observe an image displayed on the image display apparatus without being influenced by the ambient light.

Further, in the display instrument according to the embodiment of the present disclosure including the above-described preferable forms, an image information storage device may be further provided, and, in a second mode different from the first mode, data regarding a subject imaged by the imaging apparatus may be compared with information stored in the image information storage device, and information corresponding to the data regarding the subject may be displayed on the image display apparatus in a state where a light amount of ambient light incident from the outside is not reduced by the dimming device. In addition, in the second mode, the image display apparatus functions as a semi-transmissive type. The "information corresponding to the data regarding the subject" may include, for example, a character, a sentence, a figure, an illustration, a still image, a picture, a moving image, and the like. This is also the same for the following.

Alternatively, in the image display method according to the embodiment of the present disclosure including the above-described preferable forms, an image information storage device may be further provided, and, in a second mode after an operation in the first mode, data regarding a subject imaged by the imaging apparatus may be compared with information stored in the image information storage device, and information corresponding to the data regarding the subject may be displayed on the image display apparatus in a state where a light amount of ambient light incident from the outside is not reduced by the dimming device.

In addition, in this configuration in the display instrument or the image display method according to the embodiment of the present disclosure, in the second mode, information corresponding to the data regarding the subject may be displayed on the image display apparatus so as to overlap the subject viewed through the dimming device and the optical device or around the subject. Further, in this configuration in the display instrument or the image display method according to the embodiment of the present disclosure, a microphone may be further provided, and, switching between the first mode and the second mode may be controlled by inputting sound using the microphone. Specifically, switching between the first mode and the second mode may be controlled in response to an instruction based on an observer's voice. Alternatively, an infrared-ray emitting and receiving device may be further provided, and switching between the first mode and the second mode may be controlled using the infrared-ray emitting and receiving device. Specifically, the switching between the first mode and the second mode may be controlled by detecting blinking of an observer using the infrared-ray emitting and receiving device.

In addition, in this configuration of the display instrument or the display instrument in the image display method according to the embodiment of the present disclosure, in the second mode, when a light amount of ambient light incident to the dimming device is "1", a light amount of the ambient light passing through the dimming device is 0.3 to 0.8, and preferably 0.5 to 0.8. Thereby, it is possible to clearly observe an external object and an image displayed on the image display apparatus.

In addition, in the display instrument according to the embodiment of the present disclosure including the above-described preferable forms and configurations, an image information storage device may be further provided, and, in a third mode different from the first mode (and the second mode), data regarding a subject imaged by the imaging apparatus may be compared with information stored in the image information storage device, and an image (this image is stored in the image information storage device) of the subject having data corresponding to information stored in the image information storage device may be displayed on the image display apparatus in a state where a light amount of ambient light incident from the outside is not reduced by the dimming device. In addition, in the third mode, the image display apparatus functions as a semi-transmissive type.

In addition, in the image display method according to the embodiment of the present disclosure including the above-described preferable forms and configurations, the image display apparatus may further include an image information storage device, and, in the third mode after an operation in the first mode (and/or the second mode), data regarding a subject imaged by the imaging apparatus may be compared with information stored in the image information storage device, and an image (this image is stored in the image information storage device) of the subject having data corresponding to information stored in the image information storage device may be displayed on the image display apparatus in a state where a light amount of ambient light incident from the outside is not reduced by the dimming device.

In addition, in this configuration of the display instrument or the display instrument in the image display method according to the embodiment of the present disclosure, in the third mode, when a light amount of ambient light incident to the dimming device is "1", a light amount of the ambient light passing through the dimming device is 0.1 to 0.6, and preferably 0.3 to 0.4. Thereby, it is possible to clearly observe an external object and an image displayed on the image display apparatus.

In the third mode including the above-described preferable configurations, an image of the subject displayed on the image display apparatus may be adjusted so as to overlap the subject viewed through the dimming device and the optical device with the image of the subject displayed on the image display apparatus. The adjustment of the image of the subject displayed on the image display apparatus may include enlargement and reduction processes, a rotation process and a movement process of the image, and, specifically, an image data process may be performed based on an affine transform matrix. This is also the same for the following. Alternatively, in the third mode including the above-described preferable configurations, an image of the subject displayed on the image display apparatus may be adjusted such that the image of the subject displayed on the image display apparatus is smaller than the subject viewed through the dimming device and the optical device.

In the display instrument or in the display instrument in the image display method according to the embodiment of the present disclosure including the above-described preferable forms and configurations, a pair of image display apparatuses installed in a frame may be provided, and one of the image display apparatuses may be in a state where a light amount of ambient light incident from the outside is not reduced by the dimming device at all times.

In the display instrument or in the display instrument in the image display method according to the embodiment of the present disclosure (hereinafter, they are collectively simply referred to as a "display instrument or the like" according to the embodiment of the present disclosure) including the above-described preferable forms and configurations, the dimming device may be disposed in the optical device, and, specifically, the dimming device may be disposed on an opposite side (opposite surface) to a side where the image forming device is disposed in the optical device. In addition, the dimming device may include a light shutter in which a light transmission control material layer is formed of a liquid crystal material layer, or the dimming device may include a light shutter in which the light transmission control material layer is formed of an inorganic electroluminescence material layer. However, the dimming device is not limited thereto, and the dimming device may use a light shutter which includes a plurality of charged electrophoretic particles and an electrophoretic dispersion liquid formed by electrophoretic dispersion media having colors different from those of the electrophoretic particles; a light shutter according to an electrodeposition method employing electrodeposition and dissociation phenomena caused by a reversible oxidation-reduction reaction of a metal (for example, silver particles); a light shutter employing a color variation of a material caused by the oxidation-reduction reaction of an electrochromic material; and a light shutter which controls light transmittance using an electrowetting phenomenon. Here, in a case where the dimming device includes the light shutter in which a light transmission control material layer is formed of a liquid crystal material layer, a material constituting the light transmission control material layer may include, for example, a TN (Twisted Nematic) type liquid crystal material, an STN (Super Twisted Nematic) type liquid crystal material, or the like, although not being limited thereto. In addition, in a case where the dimming device includes the light shutter in which the light transmission control material layer is formed of an inorganic electroluminescence material layer, a material constituting the light transmission control material layer may include, for example, tungsten oxide ($WO_3$) although not being limited thereto. Further, the optical device and the dimming device are preferably disposed in this order from an observer side; however, the dimming device and the optical device may be disposed in this order.

A light blocking member which blocks ambient light from being incident to the optical device may be disposed in a region of the optical device to which light emitted from the image forming device is incident. For convenience, this configuration is referred to as a "display instrument related to a first example of the present disclosure". In the display instrument related to the first example of the present disclosure, the light blocking member which blocks ambient light from being incident to the optical device may be disposed in a region of the optical device to which light emitted from the image forming device is incident. Thereby, since the ambient light is not originally incident to the region of the optical device to which light emitted from the image forming device is incident even if an incident light amount of the ambient light varies due to an operation of the dimming device, there is no deterioration in image display quality due to occurrence of undesired stray light or the like in the display instrument. In addition, the region of the optical device to which light emitted from the image forming device is incident is preferably included in an image in which the light blocking member is projected onto the optical device.

The light blocking member may be disposed apart from the optical device on an opposite side to the side where the image forming device is disposed in the optical device. In the display instrument with this configuration, the light blocking member may be manufactured using, for example, an opaque plastic material. This light blocking member may integrally extend from a casing of the image display apparatus or be installed in the casing of the image display apparatus, or may integrally extend from the frame or be installed in the frame. Alternatively, the light blocking member may be disposed in the optical device part on an opposite side to the side where the image forming device is disposed, or the light blocking member may be disposed in the dimming device. In addition, the light blocking member made of an opaque material may be formed on the surface of the optical device using a physical vapor deposition method (a PVD method), a chemical vapor deposition method (a CVD method), or using a printing method, or may be formed by bonding a film, a sheet or a foil made of an opaque material (a plastic material, a metal material, an alloy material, or the like) thereon. A projection image of an end portion of the dimming device onto the optical device is preferably included in a projection image of the light blocking member onto the optical device.

Alternatively, the dimming device may include a first substrate opposite to an optical device; a second substrate opposite to the first substrate; a first electrode and a second electrode respectively provided on the first substrate and the second substrate; and a light transmission control material layer sealed between the first substrate and the second substrate, and the first substrate may also be used as a constituent member of the optical device. For convenience, this configuration is referred to as a "display instrument related to a second example of the present disclosure". In the display instrument related to the second example of the present disclosure, the first substrate forming the dimming device is also used as a constituent member of the optical device. Thereby, the weight of the entire display instrument can be reduced, and thus there is no concern that a user of the display instrument may feel discomfort. In addition, the second substrate may be thinner than the first substrate.

Materials of the first substrate and the second substrate may include, specifically, a transparent glass substrate such as soda-lime glass or super white glass, a plastic substrate, and a plastic sheet, a plastic film. Here, the plastic may include polyethylene terephthalate, polyethylene naphtalate, polycarbonate, cellulose esters such as cellulose acetate, fluoropolymers such as a copolymer of polyvinylidene fluoride or polytetrafluoroethylene and hexafluoropropylene, polyethers such as polyoxymethylene, polyolefins such as polyacetal, polystyrene, polyethylene, polypropylene or methylpentene polymer, polyimides such as polyamidoimide or polyetherimide, polyamide, polyethersulfone, polyphenylene sulfide, polyvinylidene fluoride, tetra-acetylcelluose, phenoxy bromide, polyarylate, polysulfone, and the like. The plastic sheet and the plastic film may be rigid so as not to be easily bent, or may be flexible. In a case where the first substrate and the second substrate are formed of a transparent plastic substrate, a barrier layer made of an inorganic material or an organic material may be formed on an inner surface of the substrate.

The first electrode and the second electrode formed on the first substrate and the second substrate may be a so-called transparent electrode, and, specifically, may use indium tin oxide (ITO, including Sn-doped $In_2O_3$, crystalline ITO, and amorphous ITO), fluorine-doped $SnO_2$ (FTC)), IFO (F-doped $In_2O_3$), antimony-doped $SnO_2$ (ATO), $SnO_2$, ZnO (including Al-doped ZnO or B-doped ZnO), indium zinc oxide (IZO), spinel oxide, oxide with a $YbFe_2O_4$ structure, conductive polymers such as polyaniline, polypyrrole or polythiophene, and the like, but are not limited thereto, and may use combinations of two kinds or more thereof. The first electrode and the second electrode may be formed using a physical vapor deposition method (PVD method) such as a vacuum deposition method or a sputtering method, various chemical vapor deposition methods (CVD methods), and various coatings. Patterning of the electrode is not basically necessary; however, in a case where patterning is performed as necessary, the patterning may be performed using any method such as an etching method, a lift-off method, or a method using various masks.

The first substrate and the second substrate are sealed and adhered to each other in the outer edge part by a sealing agent. The sealing agent may use a variety of resins, for example, heat-cured type, light-cured type, moisture-cured type, and anaerobic-cured type resins, such as an epoxy resin, a urethane resin, an acryl resin, a vinyl acetate resin, an enethiol resin, a silicone resin, and a degeneration polymer resin.

A first illuminance sensor (for convenience, referred to as an "environmental illuminance measuring sensor" in some cases) which measures illuminance of the environment in which the display instrument is placed may be further provided, and, based on a measurement result of the first illuminance sensor, light transmittance of the dimming device may be controlled, or luminance of an image formed by the image forming device may be controlled. Alternatively, a second illuminance sensor (for convenience, referred to as a "transmission light illuminance measuring sensor" in some cases) which measures illuminance based on light transmitted through the dimming device from the external environment may be further provided, and, based on a measurement result of the second illuminance sensor, light transmittance of the dimming device may be controlled, or luminance of an image formed by the image forming device may be controlled. Here, the second illuminance sensor is preferably disposed further toward an observer side than the optical device.

As described above, since the transmittance of the dimming device is controlled and the luminance of an image formed by the image forming device is controlled based on a measurement result of the first illuminance sensor, and the transmittance of the dimming device is controlled and the luminance of an image formed by the image forming device is controlled based on a measurement result of the second illuminance sensor, it is possible to not only give high contrast to an image observed by an observer but also to optimize an observation state of the image depending on the illuminance of the peripheral environment in which the display instrument is placed. The illuminance sensors (the environmental illuminance measuring sensor and the transmitted light illuminance measuring sensor) may be formed using existing illuminance sensors, and the illuminance sensors may be controlled using existing control circuits.

In addition, when a measurement result of the first illuminance sensor is equal to or more than a predetermined value (for convenience, referred to as a "first illuminance measurement value" in some cases), the light transmittance of the dimming device may be made to be equal to or less than a predetermined value (for convenience, referred to as a "first light transmittance" in some cases). Alternatively, when a measurement result of the first illuminance sensor is equal to or less than a predetermined value (for convenience, referred to as a "second illuminance measurement value" in some cases), the light transmittance of the dimming device may be made to be equal to or more than a predetermined value (for convenience, referred to as a "second light transmittance" in some cases). Further, in a case where the measurement result of the second illuminance sensor is not a desired illuminance in view of the illuminance of the first illuminance sensor, or subtler illuminance adjustment is desired, the light transmittance of the dimming device may be adjusted while monitoring a value of the second illuminance sensor. Here, the first illuminance measurement value may be 10 lux, the first light transmittance may be any one of 1% to 30%, the second illuminance measurement value may be 0.01 lux, and the second light transmittance may be any one of 51% to 99%. In addition, in a case where an illuminance measurement value of the first illuminance sensor is $1 \times 10^{-3}$ lux or less, for example, a driving voltage of the dimming device is preferably controlled so as to reduce a driving time, thereby increasing the light transmittance of the dimming device as rapidly as possible.

Further, light transmitted through the dimming device may be colored in a desired color by the dimming device depending on cases. In addition, in these cases, a color of light colored by the dimming device may be variable, or a color of light colored by the dimming device may be fixed. In addition, in a case of the former, for example, a dimming device which colors light red, a dimming device which colors light green, and a dimming device which colors light blue may be laminated. Further, in a case of the latter, a color of light colored by the dimming device may be brown although is not limited thereto.

In addition, the dimming device may be disposed so as to be freely attachable and detachable depending on cases. In order to dispose the dimming device so as to be attachable and detachable, for example, the dimming device may be installed in, for example, the frame using screws made of transparent plastic, the frame may be cut so as to form grooves and the dimming device may be engaged with the grooves, magnets may be installed in the frame and the dimming device may be installed in the frame, or slide portions may be provided in the frame and the dimming device may be fitted and inserted into the slide portions. In addition, a connector may be installed in the dimming device, and the dimming device may be electrically connected to the control circuit (for example, included in a control device for controlling the image forming device) for controlling the light transmittance of the dimming device via the connector and wires. The dimming device may be curved.

Further, in the display instrument or the like according to the embodiment of the present disclosure including the above-described various preferable forms and configurations, the optical device may include (a) a light guide plate which allows incident light to propagate the inside thereof through total reflection, to be guided, and to be emitted therefrom, (b) a first deflection unit which deflects light incident to the light guide plate such that the light incident to the light guide plate is totally reflected inside the light guide plate, and (c) a second deflection unit which causes the light which has propagated inside the light guide plate through the total reflection to undergo a plurality of deflections in order to emit the light which has propagated inside the light guide plate through the total reflection from the light guide plate. The term "total reflection" indicates total internal reflection or total reflection inside the light guide plate. This is also the same for the following. In addition, in this case, the second deflection unit may be located in a projection image of the dimming device, or the dimming device may be located in a projection image of the second deflection unit. Further, as described above, the first deflection unit and the second deflection unit may be covered by one (the first substrate) of the substrates forming the dimming device.

In the display instrument or the like according to the embodiment of the present disclosure including the above-described various preferable forms and configurations, the optical device is of a semi-transmissive type (see-through type). Specifically, at least the optical device part facing the pupil of an observer is semi-transmissive (see-through), thereby allowing viewing of the outside via the optical device part. The display instrument may include a single image display apparatus or two image display apparatuses.

Here, the first deflection unit may reflect light incident to the light guide plate, and the second deflection unit may cause the light which has propagated inside the light guide plate through total reflection to undergo a plurality of transmissions and reflections. In addition, in this case, the first deflection unit may function as a reflective mirror, and the second deflection unit may function as a semi-transmissive mirror.

In this configuration, the first deflection unit may include, for example, a light reflection film (a kind of mirror) which is made of metal including an alloy and reflects light incident to the light guide plate, or a diffraction grating (for example, a hologram diffraction grating film) which diffracts light incident to the light guide plate. In addition, the second deflection unit may include a multi-layer laminate structure in which a plurality of dielectric laminate films are laminated, a half mirror, a polarization beam splitter, or a hologram diffraction grating film. Further, the first deflection unit and the second deflection unit are disposed inside the light guide plate (built in the light guide plate), and, in the first deflection unit, parallel light incident to the light guide plate is reflected or diffracted such that the parallel light incident to the light guide plate is totally reflected inside the light guide plate. On the other hand, in the second deflection unit, the parallel light which propagates inside the light guide plate through the total reflection undergoes a plurality of linear reflections or diffractions, and is then emitted from the light guide plate in a parallel light state.

Alternatively, the first deflection unit may diffract light incident to the light guide plate, and the second deflection unit may cause the light which has propagated inside the light guide plate through the total reflection to undergo a plurality of diffractions. In addition, in this case, the first deflection unit and the second deflection unit may include diffraction grating elements. Further, the diffraction grating elements may be formed by a reflective diffraction grating element or a transmissive diffraction grating element, or one of the diffraction grating elements may be formed by a reflective diffraction grating element, and the other thereof may be formed by a transmissive diffraction grating element. In addition, the reflective diffraction grating element may include a reflective volume hologram diffraction grating. For convenience, the first deflection unit formed by the reflective volume hologram diffraction grating is referred to as a "first diffraction grating member", and, for convenience, the second deflection unit formed by the reflective volume hologram diffraction grating is referred to as a "second diffraction grating member".

An image may be displayed in a single color (for example, green) by the image display apparatus according to the embodiment of the present disclosure; however, in a case of displaying an image in color, the first diffraction grating member or the second diffraction grating member may be formed by laminating P diffraction grating layers including the reflective volume hologram diffraction grating so as to correspond to diffractive reflection of the P kinds of light beams having the P kinds (for example, P is 3 and the three kinds of red, green and blue) of different wavelength bands (or wavelengths). An interference pattern corresponding to one kind of wavelength band (or wavelength) is formed on each diffraction grating layer. Alternatively, the P kinds of interference patterns may be formed in the first diffraction grating member or the second diffraction grating member which includes a single diffraction grating layer in order to correspond to diffractive reflection of the P kinds of light beams having the P kinds of different wavelength bands (or wavelengths). Alternatively, an angle of view may be equally divided into, for example, three, and the first diffraction grating member or the second diffraction grating member may be formed by laminating diffraction grating layers corresponding to the respective angles of view. Alternatively, for example, a structure may be employed in which the first diffraction grating member and the second diffraction grating member including a diffraction grating layer formed by a reflective volume hologram diffract ion grating which diffracts and reflects light with a red wavelength band (or wavelength) are disposed in a first light guide plate, the first diffraction grating member and the second diffraction grating member including a diffraction grating layer formed by a reflective volume hologram diffraction grating which diffracts and reflects light with a green wavelength band (or wavelength) are disposed in a second light guide plate, the first diffraction grating member and the second diffraction grating member including a diffraction grating layer formed by a reflective volume hologram diffract ion grating which diffracts and reflects light with a blue wavelength band (or wavelength) are disposed in a third light guide plate, and the first light guide plate, the second light guide plate, and the third light guide plate may be laminated with a gap therebetween. In addition, by employing this configuration, it is possible to increase diffraction efficiency, increase a diffraction acceptance angle and optimize a diffraction angle when the light with each wavelength band (or a wavelength) is diffracted and reflected in the first diffraction grating member or the second diffraction grating member. A protection member is preferably disposed such that the reflective volume hologram diffraction grating does not directly contact the air.

A material of the first diffraction grating member and the second diffraction grating member may be a photopolymer material. A constituent material or a basic structure of the first diffraction grating member and the second diffraction grating member including the reflective volume hologram diffraction grating may be the same as a constituent material or a structure of a reflective volume hologram diffraction grating in the related art. The reflective volume hologram diffraction grating indicates a hologram diffraction grating which diffracts and reflects only diffraction light of +1 order. In the diffraction grating member, an interference pattern is formed from the surface to the inside, and a forming method of the related interference pattern itself may be the same as a forming method in the related art. Specifically, for example, a member (for example, a photopolymer material) forming the diffraction grating member may be irradiated with object light from a first predetermined direction on one side, and, simultaneously, the member forming the diffraction grating member may be irradiated with reference light from a second predetermined direction on the other side, such that an interference pattern formed by the object light and the reference light is recorded inside the member forming the diffraction grating member. The first predetermined direction, the second predetermined direction, and wavelengths of the object light and the reference light may be appropriately selected, thereby obtaining a desired pitch of the interference pattern and a desired slant angle on the surface of the diffraction grating member. The slant angle of the interference pattern indicates an angle formed between a surface of the diffraction grating member (or the diffraction grating layer) and the interference pattern. In a case where the first diffraction grating member and the second diffraction grating member include a laminate structure of P diffraction grating layers formed by the reflective volume hologram diffraction grating, in relation to the lamination of the diffraction grating layers, P diffraction grating layers may be manufactured separately, and the P diffraction grating layers may be laminated (adhered) using, for example, an ultraviolet-cured adhesive. In addition, after a single diffraction grating layer is manufactured using a photopolymer material having the adhesiveness, diffraction grating layers may be manufactured by sequentially adhering photopolymer materials having the adhesiveness thereon, thereby manufacturing the P diffraction grating layers.

Alternatively, in the image display apparatus according to the embodiment of the present disclosure, the optical device may include a semi-transmissive mirror which allows light emitted from the image forming device to be incident thereto and to be emitted therefrom toward the pupil of an observer.

In addition, the light emitted from the image forming device may propagate through the air and be incident to the semi-transmissive mirror, or may propagate inside a transparent member such as, for example, a glass plate or a plastic plate (specifically, a member made of the same material as a material of a light guide plate described later) and be incident to the semi-transmissive mirror. Further, the semi-transmissive mirror may be installed in the image forming device via the transparent member, or the semi-transmissive mirror may be installed in the image forming device via a member other than the transparent member.

In the image display apparatus according to the embodiment of the present disclosure including the above-described various preferable forms and configurations, the image forming device may include a plurality of pixels arranged in a two-dimensional matrix state. In addition, this configuration of the image forming device is referred to as an "image forming device with a first configuration".

The image forming device with the first configuration may include, for example, an image forming device constituted by a reflective spatial light modulation device and a light source; an image forming device constituted by a transmissive spatial light modulation device and a light source; and an image forming device constituted by a light emitting element such as an organic EL (ElectroLuminescence), an inorganic EL, or a light emitting diode (LED), and, among them, the image forming device constituted by a reflective spatial light modulation device and a light source is preferable. The spatial light modulation device may include a light valve, for example, a transmissive or reflective liquid crystal display such as an LCOS (Liquid Crystal On Silicon) and a digital micromirror device (DMD), and the light source may include a light emitting element. Further, the reflective spatial light modulation device may include a liquid crystal display, and a polarization beam splitter which reflects some of light beams from a light source so as to be guided to the liquid crystal display and transmits some of light beams reflected by the liquid crystal display so as to be guided to an optical system. The light emitting element forming the light source may include a red light emitting element, a green light emitting element, a blue light emitting element, and a white light emitting element. Alternatively, red light, green light, and blue light which are respectively emitted from a red light emitting element, a green light emitting element, and a blue light emitting element may be mixed and undergo luminance uniformity by a light pipe, thereby obtaining white light. As the light emitting element, for example, a semiconductor laser element or a solid-state laser, and an LED may be exemplified. The number of pixels may be determined based on specifications required by the image display apparatus, the detailed values of the number of pixels may exemplify 320×240, 432×240, 640×480, 1024×768, 1920×1080, and the like.

Alternatively, in the image display apparatus according to the embodiment of the present disclosure including the above-described preferable forms and configurations, the image forming device may include a light source, and a scanning unit which scans parallel light emitted from the light source. In addition, for convenience, the configuration of the image forming device is referred to as an "image forming device with a second configuration".

In the image forming device with the second configuration, a light emitting element is used as the light source, and, specifically, a red light emitting element, a green light emitting element, a blue light emitting element, and a white light emitting element may be used. Alternatively, red light, green light, and blue light which are respectively emitted from a red light emitting element, a green light emitting element, and a blue light emitting element may be mixed and undergo luminance uniformity by a light pipe, thereby obtaining white light. As the light emitting element, for example, a semiconductor laser element or a solid-state laser, and an LED may be exemplified. The number of pixels (virtual pixels) of the image forming device with the second configuration may also be determined based on specifications required by the image display apparatus, and the detailed values of the number of pixels (virtual pixels) may be exemplified by 320×240, 432×240, 640×480, 1024×768, 1920×1080, and the like. In a case where an image is displayed in color, and the light source is constituted by a red light emitting element, a green light emitting element, and a blue light emitting element, colors are preferably combined using, for example, a cross prism. The scanning unit may use MEMS (Micro Electro Mechanical Systems) or a galvanic mirror which scans light emitted from a light source horizontally and vertically and has, for example, a micromirror capable of rotating in a two-dimensional direction.

In the image forming device with the first configuration or the image forming device with the second configuration, light which is converted into a plurality of parallel light beams in the optical system (the optical system converts emitted light into parallel light and is referred to as a "parallel light emitting optical system" in some cases, and may be specifically, for example, a collimating optical system or a relay optical system) is incident to the light guide plate, and, this demand for the parallel light is based on it being necessary for light wave surface information when the light is incident to the light guide plate to be preserved even after the light is emitted from the light guide plate via the first deflection unit and the second deflection unit. In addition, in order to generate a plurality of parallel light beams, specifically, for example, a light emitting portion of the image forming device may be disposed, for example, at a location (position) corresponding to a focal length of the parallel light emitting optical system. The parallel light emitting optical system has a function of converting position information of a pixel into angle information in the optical system of the optical device. The parallel light emitting optical system may exemplify an optical system which has positive optical power as a whole by using a convex lens, a concave lens, a free-form-surface prism, and a holographic lens, singly or together. A light blocking portion having an opening may be disposed between the parallel light emitting optical system and the light guide plate in order to prevent a case where undesired light is emitted from the parallel light emitting optical system and is incident to the light guide plate.

The light guide plate has two parallel surfaces (a first surface and a second surface) extending in parallel to the axial line (X axis) of the light guide plate. When the surface of the light guide plate to which light is incident is a light guide plate incidence surface, and the surface of the light guide plate from which light is emitted is a light guide plate emission surface, the first surface may form the light guide plate incidence surface and the light guide plate emission surface, or the first surface may form the light guide plate incidence surface, and the second surface may form the light guide plate emission surface. A material of the light guide plate may use glass including optical glass such as quartz glass or BK7, or a plastic material (for example, PMMA, a polycarbonate resin, an acryl resin, an amorphous polypropylene resin, a styrene resin including an AS resin). A shape of the light guide plate is not limited to a plate shape and may be a curved shape.

In the display instrument or the like according to the embodiment of the present disclosure, the frame may include a front portion which is disposed on the front side of an observer, and two temple portions which are installed in both ends of the front portion via hinges so as to be rotatable. In addition, a modern portion is installed in a front end part of each temple portion. Although the image display apparatus is installed in the frame, specifically, for example, the image forming device may be installed in the temple portions. Further, the front portion and the two temple portions may be integrally formed. In other words, when the overall display instrument according to the embodiment of the present disclosure is viewed, the frame generally has substantially the same structure as glasses. A material of the frame including a pad portion may use the same material as a material of typical glasses, such as a metal, an alloy, plastic, and a combination thereof. Further, a nose pad may be installed in the front portion. In other words, when the overall display instrument or the like according to the embodiment of the present disclosure is viewed, an assembly of the frame and the nose pad has substantially the same structure as typical glasses except that there is no rim. The nose pad may also have existing configurations and structures.

In addition, in the display instrument or the like according to the embodiment of the present disclosure, from the viewpoint of design or easiness of installation, wires (a signal line, a power supply line, and the like) of one or two image forming devices preferably extend outward from the front end part of the modern portion via the insides of the temple portion and the modern portion and are connected to the control device (a control circuit or a control unit). Further, each image forming device includes a headphone portion, and wires for the headphone portion from each image forming device may extend from the front end part of the modern portion to the headphone portion via the temple portion and the inside of the modern portion. The headphone portion may use, for example, an inner ear type headphone portion, or a canal type headphone portion. Preferably, more specifically, the wire for the headphone portion extends from the front end part of the modern portion to the headphone portion so as to go around the back side of the auricle.

The imaging apparatus may be installed at the central part of the front portion. The imaging apparatus includes, specifically, a solid-state imaging element formed by, for example, a CCD or a CMOS sensor, and a lens. Wires from the imaging apparatus may be connected to one of the image display apparatuses (or the image forming devices) via, for example, the front portion, and, further, may be included in wires extending from the image display apparatus (or the image forming device).

Light beams which are emitted from the center of the image forming device and pass through a node on the image forming device side of the optical system are referred to as "central light beams", and, among the central light beams, a central light beam which is perpendicularly incident to the optical device is referred to as a "central incident light beam". In addition, a point where the central incident light beam is incident to the optical device is set as a central point of the optical device, an axial line which passes through the central point of the optical device and is parallel to the axial line direction of the optical device is set as an X axis, and an axial line which passes through the central point of the optical device and conforms to the normal line of the optical device is set as a Y axis. A horizontal direction in the display instrument or the like according to the embodiment of the present disclosure is a direction parallel to the X axis, and is hereinafter referred to as an "X axis direction" in some cases. Here, the optical system is disposed between the image forming device and the optical device and converts light emitted from the image forming device into parallel light. In addition, a light flux converted into the parallel light in the optical system is incident to the optical device, is guided and is emitted therefrom. Further, a central point of the first deflection unit is set as an "optical device central point".

The display instrument or the like according to the embodiment of the present disclosure including the above-described various modified examples may be used for display of, for example, various descriptions, or symbols, signs, marks, labels, designs, and the like when observation targets (subjects) such as various devices are worked, operated, maintained, and dismantled; display of various descriptions, or symbols, signs, marks, labels, designs, and the like regarding observation targets (subjects) such as persons or products; display of moving images or still images; display of subtitles of a movie or the like; display of an explanation or a closed caption regarding a picture synchronized with the picture; display of various descriptions regarding observation targets (subjects) in a play or a kabuki play, a noh play, a comedic drama, an opera, a concert, a ballet, various theaters, an amusement park, an art gallery, a tourist spot, a resort area, travel guidance, and the like, and an explanation for explaining content, progress, background thereof, or the like, or display of closed captions. In addition, the above-described variety of content represents information corresponding to data regarding a subject. In a play or a kabuki play, a noh play, a comedic drama, an opera, a concert, a ballet, various theaters, an amusement park, an art gallery, a tourist spot, a resort area, travel guidance, and the like, characters related to an observation target may be displayed as an image on the display instrument at an appropriate timing. Specifically, according to a progress of a movie or the like, or according to a progress of a theater production or the like, an image control signal is sent to the display instrument, and an image is displayed on the display instrument, by an operator's operation or under the control of a computer or the like, based on a predetermined schedule and allocation of time. In addition, although display of various descriptions regarding observation targets (subjects) such as various devices, persons or products is performed, observation targets (subjects) such as various devices, persons or products may be imaged by the imaging apparatus, and the imaged content is analyzed in the display instrument, thereby various descriptions, created in advance, regarding the observation targets (subjects) such as various devices, persons or products may be displayed on the display instrument. Alternatively, the display instrument or the like according to the embodiment of the present disclosure may be used as a stereoscopic display instrument. In this case, a polarization plate or a polarization film may be installed in the optical device so as to be attachable and detachable, or a polarization plate or a polarization film may be bonded to the optical device, depending on cases.

Image signals applied to the image forming device may include not only an image signal (for example, character data) but also, for example, luminance data (luminance information) regarding an image to be displayed, or chromaticity data (chromaticity information), or luminance data and chromaticity data. The luminance data may be luminance data corresponding to the luminance of a predetermined region including an observation target viewed through the optical device, and the chromaticity data may be chromaticity data corresponding to the chromaticity of a predetermined region including an observation target viewed through the optical device. As above, the luminance data regarding an image is included, thereby controlling the luminance (brightness) of the displayed image, the chromaticity data regarding an image is included, thereby controlling the chromaticity (color) of the displayed image, and the luminance data and the chromaticity data regarding an image are included, thereby controlling the luminance (brightness) and the chromaticity (color) of the displayed image. In a case of using luminance data corresponding to the luminance of a predetermined region including an observation target viewed through the image display apparatus, a value of the luminance data may be set such that the higher the value of the luminance of the predetermined region including the observation target viewed through the image display apparatus, the higher the value of the luminance of the image (that is, the more brightly the image is displayed). In a case of using chromaticity data corresponding to the chromaticity of a predetermined region including an observation target viewed through the image display apparatus, a value of the chromaticity data may be set such that the chromaticity of the predetermined region including the observation target viewed through the image display apparatus and the chromaticity of an image to be displayed have a substantially complementary color relationship. The complementary color indicates a combination of colors located directly opposite to each other in the color circle. Examples of the complementary colors include red and green, yellow and violet, blue and orange, and the like. Although a color causing chroma reduction is also specified like white in a case of light and black in a case of an object when a certain color is mixed with other colors at an appropriate ratio, the visual effect complementation when colors are arranged in parallel is different from the visual effect complementation when the colors are mixed. The colors are also called complemental colors, contrasting colors, or opposite colors. However, the opposite colors directly indicate opposite colors, whereas a range indicated by the complementary colors is a slightly wider. A combination of complementary colors causes the synergistic effect of uniting the colors so as to support each other, which is called complementary color harmony.

Embodiment 1

Figure 3A:
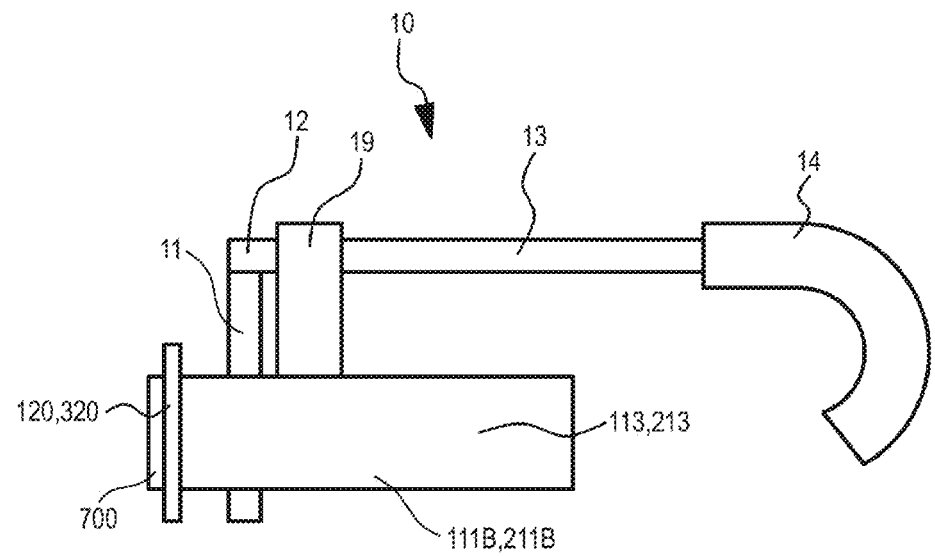
FIGS. 3A and 3B are respectively a schematic diagram of the display instrument of Embodiment 1 viewed from the lateral side and a schematic diagram of optical device and dimming device parts in the display instrument of Embodiment 1 viewed from the front side.
Figure 3B:
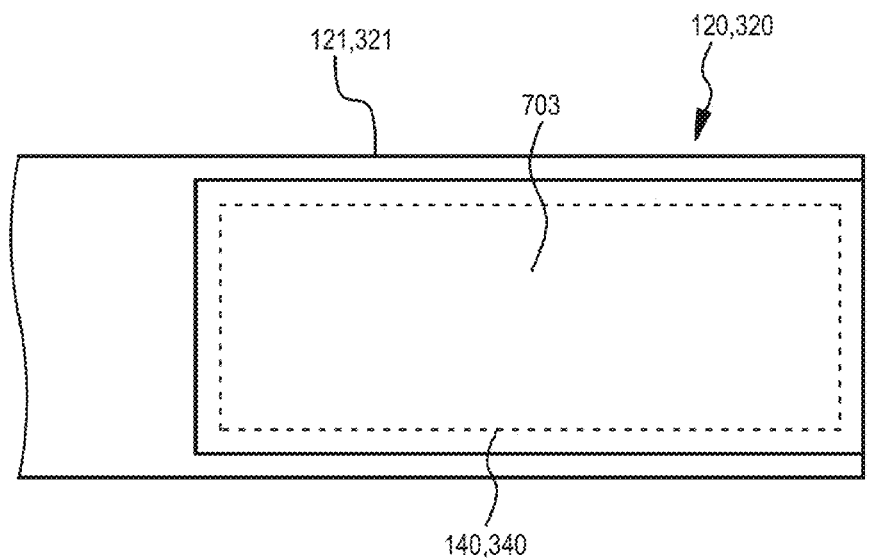
Figure 4A:
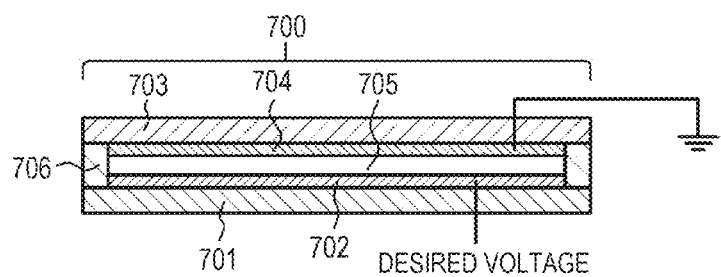
FIGS. 4A and 4B are schematic cross-sectional views of the dimming device schematically illustrating a behavior of the dimming device in the display instrument of Embodiment 1.
Figure 4B:
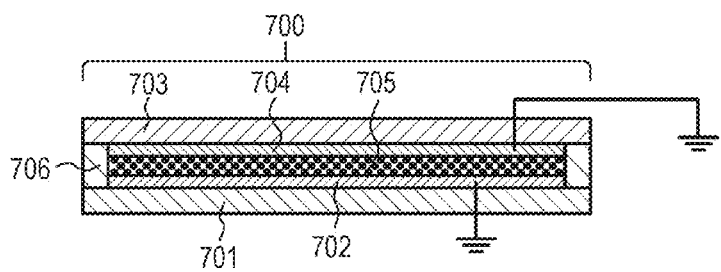
Figure 5:
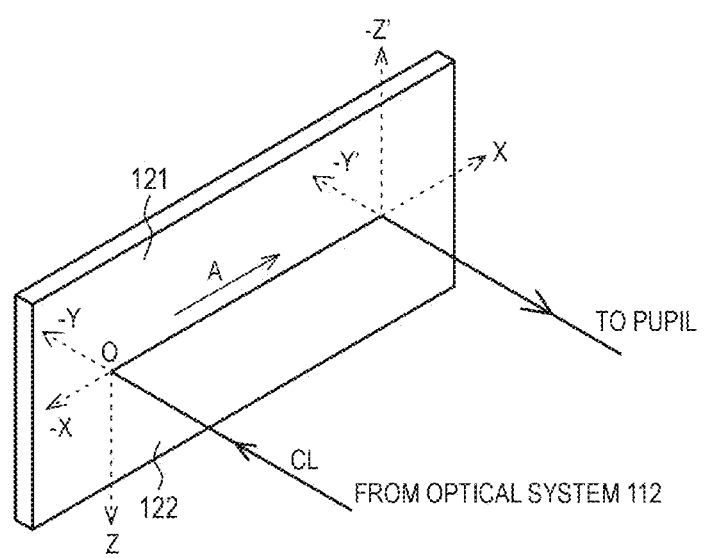
FIG. 5 is a diagram schematically illustrating propagation of light in a light guide plate forming the image display apparatus.

Embodiment 1 relates to a display instrument and an image display method according to embodiment of the present disclosure. FIG. 1 is a conceptual diagram illustrating an image display apparatus according to Embodiment 1; FIG. 2 is a schematic diagram of the display instrument (specifically, a head mounted display (HMD)) of Embodiment 1 and the like, viewed from the top side; FIG. 3A is a schematic diagram of the display instrument viewed from the lateral side; FIG. 3B is a schematic diagram of optical device and dimming device parts viewed from the front side; and FIGS. 4A and 4B are schematic cross-sectional views of the dimming device schematically illustrating a behavior of the dimming device in the display instrument of Embodiment 1. In addition, FIG. 5 is a diagram schematically illustrating propagation of light in a light guide plate forming the image display apparatus.

The display instrument of Embodiment 1 or Embodiments 2 to 12 described later is more specifically a head mounted display (HMD), and includes (i) a frame (for example, a glasses-type frame 10) worn on the head part of an observer, (ii) an image display apparatus 100, 200, 300, 400 or 500 installed in the frame 10, and (iii) an imaging apparatus 17. In addition, although the display instrument of Embodiment 1 or Embodiments 2 to 12 described later is, specifically, of a binocular type in which two image display apparatuses are provided, the display instrument may be of a monocular type in which a single image display apparatus is provided. In addition, the image forming device 111 or 211 displays, for example, a monochrome (for example, green) image.

In addition, the image display apparatus 100, 200, 300, 400 or 500 in Embodiment 1 or Embodiments 2 to 12 described later includes (A) the image forming device 111 or 211, (B) an optical device (a light guide unit) 120, 320 or 520 which allows light emitted from the image forming device 111 or 211 to be incident thereto, to be guided, and to be emitted therefrom, (C) a dimming device 700 which adjusts a light amount of ambient light incident from the outside, and (D) an optical system (parallel light emitting optical system) 112 or 254 which converts light emitted from the image forming device 111 or 211 into parallel light. Here, a light flux which has been converted into parallel light in the optical system 112 or 254 is incident to, is guided, and is emitted from the optical device 120, 320 or 520.

In addition, the image display apparatus 100, 200, 300, 400 or 500 may be installed in the frame so as to be fixed, or may be installed so as to be attachable and detachable. Here, the optical system 112 or 254 is disposed between the image forming device 111 or 211 and the optical device 120, 320 or 520. In addition, a light flux which is converted into parallel light in the optical system 112 or 254 is incident to, is guided, and is emitted from the optical device 120, 320 or 520. In addition, the optical device 120, 320 or 520 is of a semi-transmissive type (a see-through type). Specifically, at least optical device parts (more specifically, light guide plates 121 or 321 and second deflection units 140 or 340 described later) facing both eyes of the observer are semi-transmissive (see-through).

In addition, in Embodiment 1 or Embodiments 2 to 7 described later, among light beams (central light beams CL) which are emitted from the center of the image forming device 111 or 211 and pass through a node on the image forming device side of the optical system 112 or 254, a point where a central incident light beam which is perpendicularly incident to the optical device 120 or 320 is incident to the optical device 120, 320 or 520 is set as an optical device central point O. In addition, an axial line which passes through the optical device central point O and is parallel to the axial line direction of the optical device 120, 320 or 520 is set as an X axis, and an axial line which passes through the optical device central point O and conforms to the normal line of the optical device 120, 320 or 520 is set as a Y axis. In addition, a central point of the first deflection unit 130 or 330 described below is the optical device central point O. That is to say, as shown in FIG. 5, in the image display apparatus 100, 200, 300, 400 or 500, the central incident light beam CL which is emitted from the center of the image forming device 111 or 211 and passes through the node on the image forming device side of the optical system 112 or 254 vertically runs into the light guide plate 121 or 321. In other words, the central incident light beam CL is incident to the light guide plate 121 or 321 at an incidence angle of 0°. In addition, in this case, a center of a displayed image conforms to the perpendicular line direction of the first surface 122 or 322 of the light guide plate 121 or 321.

In addition, in Embodiment 1 or Embodiments 2 to 12 described later, the dimming device 700 which adjusts a light amount of ambient light incident from the outside is disposed on an opposite side to the side where the image forming device 111 or 211 of the optical device 120, 320 or 520 is disposed. Specifically, the dimming device 700 which is a kind of light shutter is fixed to the optical device 120, 320 or 520 (specifically, a protection member (protection plate) 126 or 326 for protecting the light guide plate 121 or 321 or a semi-transmissive mirror 520) using an adhesive 707. In addition, the dimming device 700 is disposed in a region of the optical device 120, 320 or 520 on an opposite side to the observer. Further, the protection member (a protection plate) 126 or 326 is adhered to the second surface 123 or 323 of the light guide plate 121 or 321 by an adhesive member 127 or 327, and the first deflection unit 130 or 330 and the second deflection unit 140 or 340 are covered by the protection member (a protection plate) 126 or 326.

The optical device 120 or 320 in the Embodiment 1 or Embodiments 2 to 4 and Embodiments 6 to 12 described later includes (a) the light guide plate 121 or 321 that causes incident light to propagate to an inside thereof through total reflection and to be emitted therefrom, (b) the first deflection unit 130 or 330 that deflects the light incident to the light guide plate 121 or 321 such that the light incident to the light guide plate 121 or 321 is totally reflected inside the light guide plate 121 or 321, and (c) the second deflection unit 140 or 340 that causes the light which has propagated inside the light guide plate 121 or 321 through the total reflection to undergo a plurality of deflections such that the light which has propagated inside the light guide plate 121 or 321 through the total reflection is emitted from the light guide plate 121 or 321. In addition, the second deflection unit 140 or 340 is located in a projection image of the dimming device 700.

Here, in Embodiment 1, the first deflection unit 130 and the second deflection unit 140 are disposed inside the light guide plate 121. In addition, the first deflection unit 130 reflects light incident to the light guide plate 121, and the second deflection unit 140 causes the light which has propagated inside the light guide plate 121 through the total reflection to undergo a plurality of transmissions and reflections. In other words, the first deflection unit 130 functions as a reflective mirror, and the second deflection unit 140 functions as a semi-transmissive mirror. More specifically, the first deflection unit 130 disposed inside the light guide plate 121 is made of aluminum (Al), and includes a light reflection film (a kind of mirror) which reflects light incident to the light guide plate 121. On the other hand, the second deflection unit 140 provided inside the light guide plate 121 includes a multi-layer laminate structure in which a plurality of dielectric laminate films are laminated. The dielectric laminate film includes, for example, a $TiO_2$ film which is a high dielectric constant material, and a $SiO_2$ film which is a low dielectric constant material. The multi-layer laminate structure in which a plurality of dielectric laminate films are laminated is disclosed in JP-T-2005-521099. Although six-layer dielectric laminate films are shown in the figures, the present disclosure is not limited thereto. A thin piece made of the same material as a material of the light guide plate 121 is interposed between the dielectric laminate film and the dielectric laminate film. In addition, in the first deflection unit 130, parallel light incident to the light guide plate 121 is reflected (or diffracted) such that the parallel light incident to the light guide plate 121 is totally reflected inside the light guide plate 121. On the other hand, in the second deflection unit 140, the parallel light which has propagated inside the light guide plate 121 through the total reflection undergoes a plurality of reflections (diffractions) and is emitted from the light guide plate 121 toward the pupil 21 of the observer in a parallel light state.

In relation to the first deflection unit 130, a part 124 in which the first deflection unit 130 of the light guide plate 121 is provided may be cut so as to provide a tilt surface on which the first deflection unit 130 is formed in the light guide plate 121, and the cut part 124 of the light guide plate 121 may be adhered to the first deflection unit 130 after a light reflection film is vacuum-deposited on the related tilt surface. In addition, in relation to the second deflection unit 140, a multi-layer laminate structure in which the same material (for example, glass) as a material of the light guide plate 121 and a plurality of dielectric laminate films (can be formed in a vacuum deposition method, for example) are laminated may be manufactured, a part 125 on which the second deflection unit 140 is provided in the light guide plate 121 may be cut so as to form a tilt surface, and the multi-layer laminate structure may be adhered to the related tilt surface and be polished so as to trim the exterior. In this way, it is possible to obtain the optical device 120 in which the first deflection unit 130 and the second deflection unit 140 are provided inside the light guide plate 121.

Here, in Embodiment 1 or Embodiments 2 to 4 and Embodiments 6 to 12 described later, the light guide plate 121 or 321 made of optical glass or a plastic material has two parallel surfaces (the first surface 122 or 322 and the second surface 123 or 323) which extend in parallel to the light propagation direction (X axis) through the total internal reflection of the light guide plate 121 or 321. The first surface 122 or 322 faces the second surface 123 or 323. In addition, parallel light is incident from the first surface 122 or 322 corresponding to a light incidence surface, then propagates inside the light guide plate through total reflection, and is emitted from the first surface 122 or 322 corresponding to a light emission surface. However, the present disclosure is not limited thereto, and the light incidence surface may be formed by the second surface 123 or 323, and the light emission surface may be formed by the first surface 122 or 322.

In Embodiment 1 or Embodiment 3 described later, the image forming device 111 is an image forming device with a first configuration, and has a plurality of pixels arranged in a two-dimensional matrix state. Specifically, the image forming device 111 includes a reflective spatial light modulation device 150, and a light source 153 constituted by a light emitting diode emitting white light. Each image forming device 111 is entirely accommodated in a casing 113 (indicated by the dot chain line in FIG. 1), an opening (not shown) is provided in the related casing 113, and light is emitted from the optical system (a parallel light emitting optical system or a collimating optical system) 112 via the opening. The reflective spatial light modulation device 150 includes a liquid crystal display (LCD) 151 formed from an LCOS which is a light value, and a polarization beam splitter 152 which reflects some of light from the light source 153 so as to be guided to the liquid crystal display 151 and transmits some of light reflected by the liquid crystal display 151 therethrough so as to be guided to the optical system 112. The liquid crystal display 151 includes a plurality (for example, 640×480) of pixels (liquid crystal cells) arranged in a two-dimensional matrix state. The polarization beam splitter 152 has an existing configuration and structure. Non-polarized light emitted from the light source 153 runs into the polarization beam splitter 152. A P polarization component passes through the polarization beam splitter 152 and is emitted outward. On the other hand, an S polarization component is reflected by the polarization beam splitter 152 so as to be incident to the liquid crystal display 151, is reflected inside the liquid crystal display 151, and is emitted from the liquid crystal display 151. Here, of the light beams emitted from the liquid crystal display 151, the light beams emitted from the pixels displaying "white" include many P polarization components, and the light beams emitted from the pixels displaying "black" include many S polarization components. Therefore, the P polarization components of the light beams emitted from the liquid crystal display 151 and running into the polarization beam splitter 152 pass through the polarization beam splitter 152 and are guided to the optical system 112. On the other hand, the S polarization components are reflected in the polarization beam splitter 152 and are returned to the light source 153. The optical system 112 includes, for example, a convex lens and generates parallel light, and thus the image forming device 111 (more specifically, the liquid crystal display 151) is disposed at a location (position) corresponding to the focal length in the optical system 112.

The frame 10 includes a front portion 11 which is disposed on the front side of the observer, two temple portions 13 which are installed at both ends of the front portion 11 via hinges 12 so as to rotatably move, and a modern portion (also called a tip cell, an earmuff, or an ear pad) 14 which is installed in a front end part of each of the temple portions 13. In addition, a nose pad (not shown) is installed. In other words, an assembly of the frame 10 and the nose pad basically has substantially the same structure as typical glasses. Further, the respective casings 113 are installed in the temple portions 13 so as to be attachable and detachable using installation members 19. The frame 10 is manufactured using metal or plastic. In addition, the respective casings 113 may be installed in the temple portions 13 so as not to be attachable and detachable using the installation members 19. Further, in an observer who possesses and wears the glasses, the respective casings 113 may be installed in the temple portions of the frame of the glasses of the observer so as to be attachable and detachable using the installation members 19. The respective casings 113 may be installed outside the temple portions 13 or may be installed inside the temple portions 13.

In addition, wires (a signal line, a power supply line, and the like) 15 extending from one of the image forming devices 111A extend outward from the front end part of the modern portion 14 via the temple portion 13 and the inside of the modern portion 14 and are connected to a control device (a control circuit, or a control unit) 18. Further, each of the image forming devices 111A and 111B includes a headphone portion 16, and a wire 16' for the headphone portion extending from each of the image forming devices 111A and 111B extends from the front end part of the modern portion 14 to the headphone portion 16 via the temple portion 13 and the inside of the modern portion 14. More specifically, the wire 16' for the headphone portion extends from the front end part of the modern portion 14 to the headphone portion 16 so as to go around the back side of the auricle. With this configuration, it is possible to provide a clean display instrument without giving an impression in which the headphone portion 16 or the wire 16' for the headphone portion is disposed in a disorderly manner.

The wires (a signal line, a power supply line, and the like) 15 are connected to the control device (control circuit) 18 as described above. The control device 18 includes an image information storage device 18A. In addition, processes for displaying images are performed in the control device 18. The control device 18 and the image information storage device 18A may be formed using existing circuits.

In addition, the imaging apparatus 17 including a solid-state imaging element formed using a CCD or a CMOS sensor and a lens (not shown) is installed in a central part 11' of the front portion 11 via an appropriate installation member (not shown). A signal from the imaging apparatus 17 is sent to, for example, the image forming device 111A via a wire (not shown) extending from the imaging apparatus 17.

The dimming device 700 in Embodiment 1 includes a light shutter in which a light transmission control material layer 705 is formed of a liquid crystal material layer. In other words, the dimming device 700 includes a transparent first substrate 701 opposite to the optical device 120, a transparent second substrate 703 opposite to the first substrate 701, electrodes 702 and 704 respectively provided on the first substrate 701 and the second substrate 703, and the light transmission control material layer 705 sealed between the first substrate 701 and the second substrate 703. Here, the first substrate 701 and the second substrate 703 are made of a plastic material. In addition, the first electrode 702 and the second electrode 704 include transparent electrodes made of indium tin oxide (ITO), and are formed using a combination of a PVD method such as a sputtering method and a lift-off method. Further, the light transmission control material layer 705 is formed of, specifically, a liquid crystal material layer using a TN (Twisted Nematic) type liquid crystal material. The first electrode 702 and the second electrode 704 are so-called beta electrodes which are not patterned. The first electrode 702 and the second electrode 704 are connected to the control device 18 via a connector and a wire (neither shown). Outer edge parts of the two substrates 701 and 703 are sealed by a sealing agent 706. Further, the first substrate 701 of the dimming device 700 is adhered to a protection member 126 (protecting the light guide plate 121) by an adhesive 707. In addition, polarization films are respectively bonded to the outer surface of the first substrate 701 and the outer surface of the second substrate 703, and these polarization films are not shown. Further, the first substrate 701 of the dimming device 700 is made to be shorter than the light guide plate 121, and the first substrate 701 of the dimming device 700 is fixed to the protection member 126 by the adhesive 707. The adhesive 707 is disposed at the outer edge part of the first substrate 701. This is also the same for the embodiments described in the following. Furthermore, the optical device 120 and the dimming device 700 are disposed in this order from the observer.

The light transmittance of the dimming device 700 can be controlled by voltages applied to the first electrode 702 and the second electrode 704. Specifically, for example, when a voltage is applied to the first electrode 702 in a state where the second electrode 704 is grounded, an arrangement state of liquid crystals in the liquid crystal material layer forming the light transmission control material layer 705 varies, and thereby the light transmittance of the liquid crystal material layer varies (refer to FIGS. 4A and 4B). Voltages applied to the first electrode 702 and the second electrode 704 can be controlled by the observer operating a control knob provided in the control device 18. In other words, the light transmittance of the dimming device 700 may be adjusted while the observer observes an image from the optical device 120 or 320.

Figure 6:
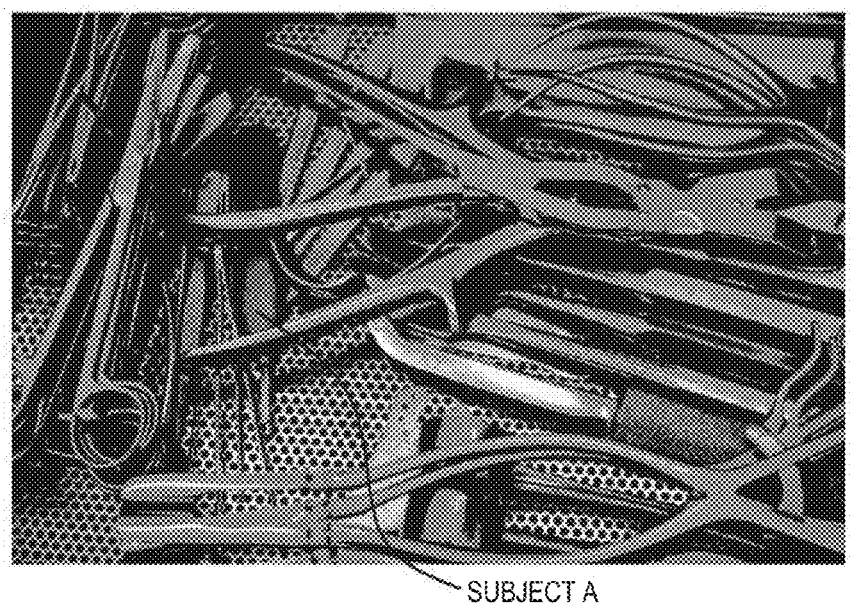
FIG. 6 is a diagram illustrating the external world viewed through the optical device (a light guide unit).

In addition, in the display instrument of Embodiments 1 to 12, or in the image display method of Embodiments 1 to 12, a light amount of ambient light incident from the outside is reduced by the dimming device 700 in a first mode in which an image captured by the imaging apparatus 17 is displayed on the image display apparatus 100, 200, 300, 400 or 500. In addition, in the first mode, the image display apparatus 100, 200, 300, 400 or 500 functions as anontransmissive type. FIG. 6 shows the external world viewed through the optical device (a light guide unit) 120, 320 or 520. Here, a "subject A" imaged by the imaging apparatus 17 is set to a screwdriver placed under the tools. In addition, the grip part and the front end part of the screwdriver are set as feature points of the screwdriver which is the subject A. In the first mode, the overall image captured by the imaging apparatus 17 is displayed in the image forming devices 111A and 111B. In the first mode, an image (an image viewed in the optical device 120, 320 or 520 by the observer) displayed on the image display apparatus 100, 200, 300, 400 or 500 is shown in FIG. 7A.

Figure 7A:
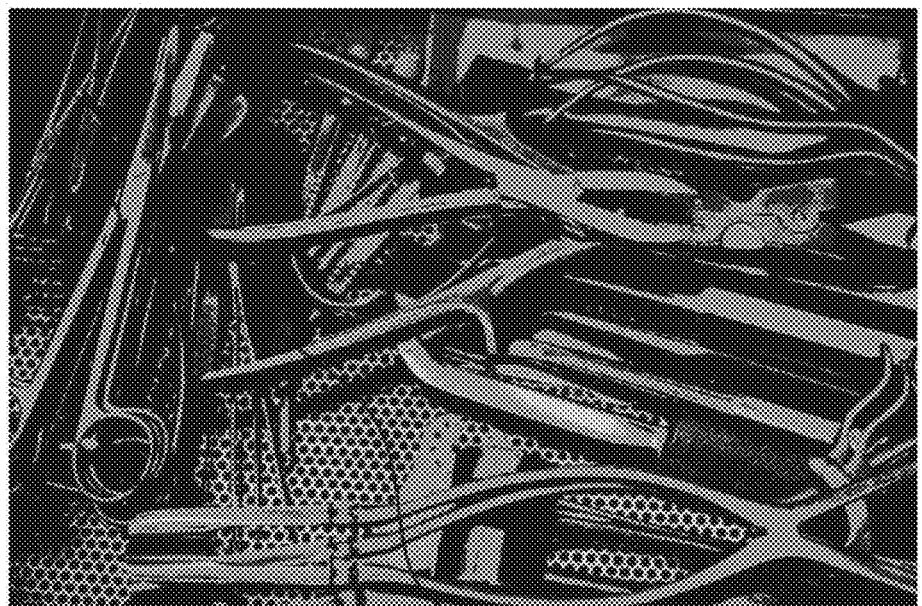
FIGS. 7A and 7B are respectively a diagram illustrating an image (an image viewed in the optical device by an observer) displayed on the image display apparatus and a diagram illustrating a state where an image of a subject conforming to information stored in an image information storage device is displayed on the image display apparatus, in a first mode.

In addition, in the first mode, data regarding a subject (specifically, the subject A in this case) imaged by the imaging apparatus 17 may be compared with information stored in the image information storage device 18A, and information (specifically, character information such as a "screwdriver") corresponding to the data regarding the subject (the subject A) conforming to the information stored in the image information storage device 18A may be displayed around the subject A as shown in FIG. 7A, or be displayed so as to overlap the subject A. Alternatively, only the image captured by the imaging apparatus 17 may be displayed without displaying this information.

Here, the data regarding the subject imaged by the imaging apparatus may be, for example, data of extracted feature points of the subject imaged by the imaging apparatus 17. In addition, the information stored in the image information storage device may be, for example, data of feature points of various objects. Further, specifically, for example, a comparison may be performed with regard to whether extracted feature points of the subject imaged by the imaging apparatus conform to feature points stored in the image information storage device.

Figure 7B:
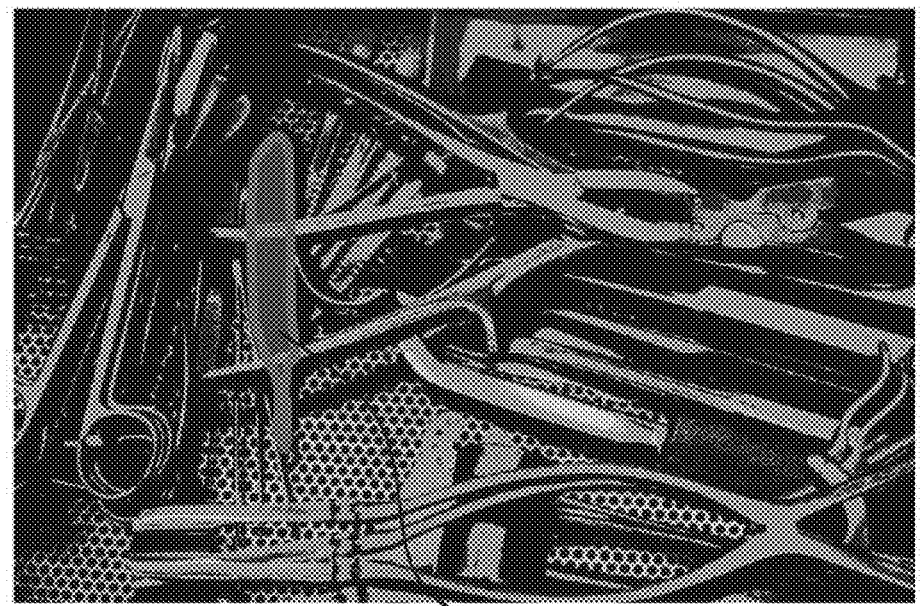
Figure 8:
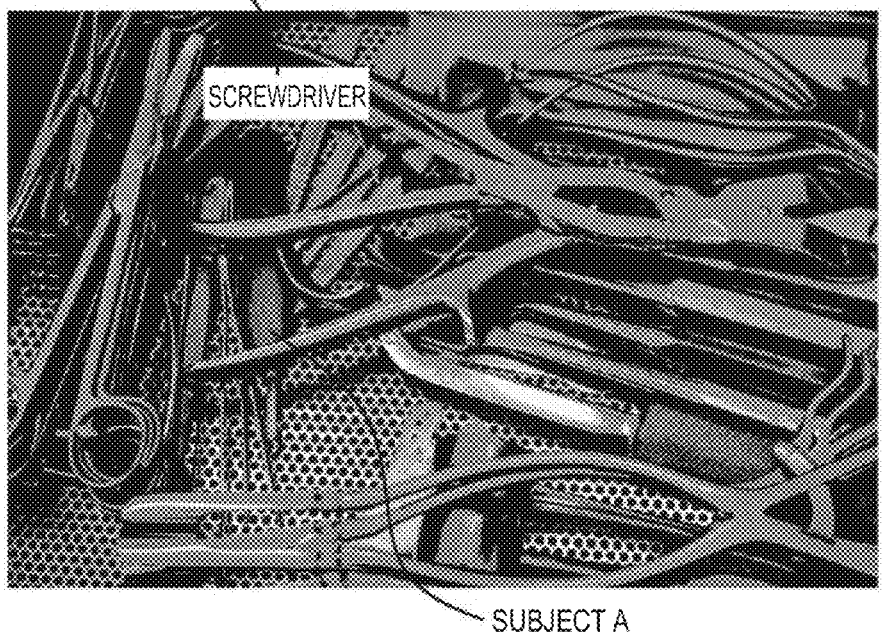
FIG. 8 is a diagram illustrating a state where a subject viewed through the dimming device and the optical device or an image displayed in the optical device and information corresponding to data regarding the subject are displayed in an overlapping manner in a second mode.

Alternatively, in the first mode, data regarding a subject imaged by the imaging apparatus 17 may be compared with information stored in the image information storage device 18A, and an image of the subject (the subject A in this example) conforming to the information stored in the image information storage device 18A may be displayed on the image display apparatus 100, 200, 300, 400 or 500 in a state where a light amount of ambient light incident from the outside is reduced by the dimming device 700 (that is, in a state where the first mode is continued) (refer to FIG. 7B). In this case, an enhancement process (for example, a color being added to the outline of the subject A) may be performed on the image of the subject A. Alternatively, data regarding the subject imaged by the imaging apparatus 17 may be compared with the information stored in the image information storage device 18A, and information (specifically, for example, character data such as a "screwdriver") corresponding to the data regarding the subject may be displayed on the image display apparatus 100, 200, 300, 400 or 500 in a state where a light amount of ambient light incident from the outside is reduced by the dimming device 700, that is, an image of the external environment is viewed in the optical device (a light guide unit) 120, 320 or 520 (that is, in a state where the first mode is continued). More specifically, in the first mode, the information corresponding to the data regarding the subject is displayed so as to overlap the image of the subject in the image displayed on the optical device 120, 320 or 520 or around the image of the subject (refer to FIG. 8), and this will be described later in detail.

In addition, in the first mode, when a light amount of ambient light incident to the dimming device is "1", a light amount of the ambient light passing through the dimming device is 0.1 or less, and preferably 0.05 or less.

Next, an operation mode of the image display apparatus 100, 200, 300, 400 or 500 is switched from the first mode to a second mode. The mode switching between the first mode and the second mode may be performed by inputting sound using a provided microphone (not shown) (an instruction based on an observer's voice). Alternatively, the mode switching may be performed using a provided infrared-ray emitting and receiving device (not shown), and, specifically, may be performed by detecting blinking of the observer using the infrared-ray emitting and receiving device. In this second mode, the image display apparatus 100, 200, 300, 400 or 500 functions as a semi-transmissive type, and, data regarding the subject imaged by the imaging apparatus 17 may be compared with the information stored in the image information storage device 18A, and information (specifically, for example, character data such as a "screwdriver") corresponding to the data regarding the subject may be displayed on the image display apparatus in a state where a light amount of ambient light incident from the outside is not reduced by the dimming device 700, that is, the external world are viewed through the optical device (a light guide unit) 120, 320 or 520. More specifically, in the second mode, the information corresponding to the data regarding the subject is displayed so as to overlap the subject viewed from the dimming device 700 and optical device 120, 320 or 520 or around the subject (refer to FIG. 8), and this will be described later in detail.

In the second mode, when a light amount of ambient light incident to the dimming device 700 is "1", a light amount of the ambient light passing through the dimming device 700 is 0.3 to 0.8, and preferably 0.5 to 0.8.

Alternatively, the operation mode of the image display apparatus 100, 200, 300, 400 or 500 is switched from the first to a third mode. The mode switching between the first mode and the third mode may be performed in the same method as the mode switching between the first mode and the second mode. Here, in the third mode, data regarding the subject imaged by the imaging apparatus 17 may be compared with the information stored in the image information storage device 18A, and an image (specifically, an image of the subject A) of the subject having data corresponding to information stored in the image information storage device 18A may be displayed on the image display apparatus 100, 200, 300, 400 or 500 in a state where a light amount of ambient light incident from the outside is not reduced by the dimming device 700, that is, the image display apparatus functions as a semi-transmissive type and the external world are viewed through the optical device (light guide unit) 120, 320 or 520. More specifically, in the third mode, the image of the subject A is displayed so as to overlap the subject A viewed through the dimming device 700 and the optical device 120, 320 or 520 (refer to FIG. 9).

In the third mode, when a light amount of ambient light incident to the dimming device 700 is "1", a light amount of the ambient light passing through the dimming device 700 is 0.1 to 0.6, and preferably 0.3 to 0.4.

Here, in the third mode, the subject viewed through the dimming device 700 and the optical device 120, 320 or 520 overlaps the image of the subject displayed on the image display apparatus 100, 200, 300, 400 or 500 by adjusting the image of the subject displayed on the image display apparatus 100, 200, 300, 400 or 500. Specifically, the image of the subject displayed on the image display apparatus 100, 200, 300, 400 or 500 may undergo enlargement and reduction processes, a rotation process, and a movement process while viewing the subject through the dimming device 700 and the optical device 120, 320 or 520. More specifically, an image data process may be performed based on an affine transform matrix. More specifically, the image displayed on the optical device 120, 320 or 520 is moved horizontally and vertically, is rotatably moved, or is enlarged and reduced using a switch (not shown) disposed in the control device 18. Thereby, a display position correcting signal is generated in the control device 18, and an image signal is superimposed on the display position correcting signal. In the first mode, the image display apparatus 100, 200, 300, 400 or 500 displays the information corresponding to the data regarding the subject so as to overlap the image of the subject in the image displayed on the optical device 120, 320 or 520 or around the image of the subject, and, in the second mode, the image display apparatus 100, 200, 300, 400 or 500 displays the information corresponding to the data regarding the subject so as to overlap the subject viewed through the dimming device 700 and the optical device 120, 320 or 520 or around the subject; however, the above-described processes may be performed before this display.

Figure 9:
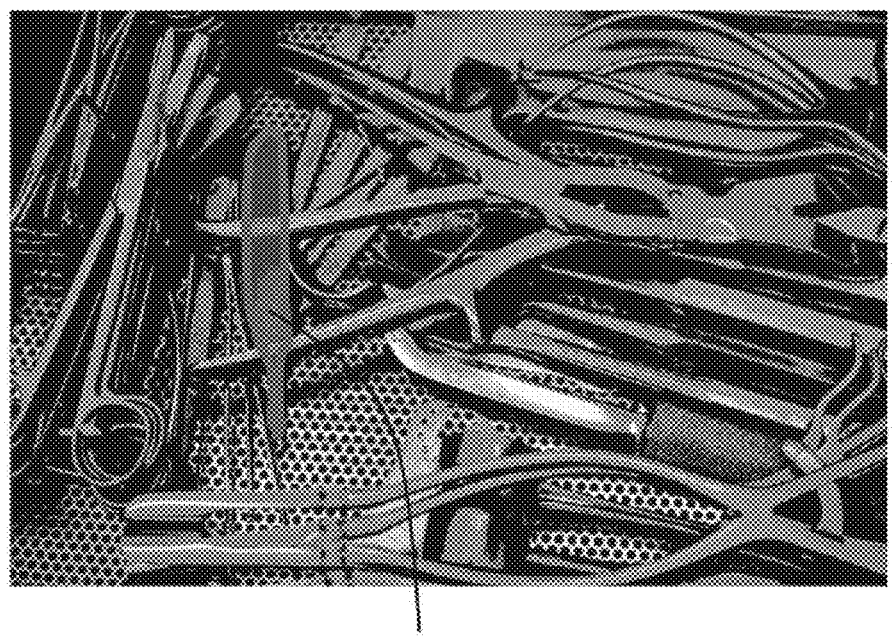
FIG. 9 is a diagram illustrating a state where an image of the subject is displayed so as to overlap the subject viewed through the dimming device and the optical device in a third mode.
Figure 10:
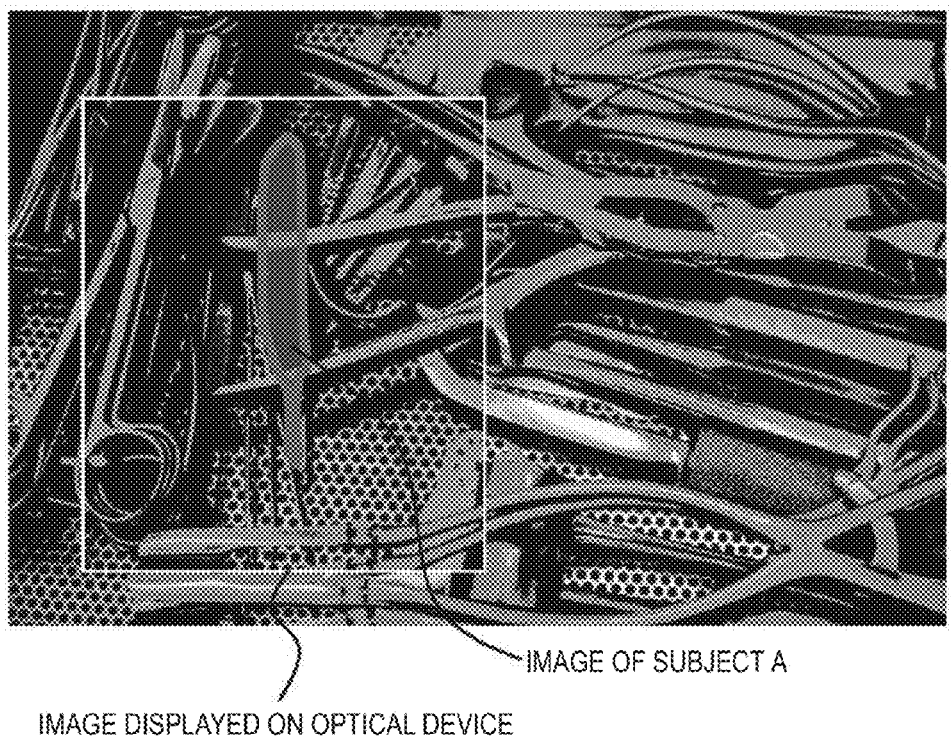
FIG. 10 is a diagram illustrating a state where an image which is a portion of an image captured by an imaging apparatus and includes a specific subject is displayed on the image display apparatus in a third mode.

In addition, in a case where the subject viewed through the dimming device 700 and the optical device 120, 320 or 520 overlaps the image of the subject displayed on the image display apparatus 100, 200, 300, 400 or 500, as shown in FIG. 9, overlapping with the subject A may be performed, or, as shown in FIG. 10, an image which is a portion of the image captured by the imaging apparatus 17 and includes a specific subject (the subject A) may be displayed on the image display apparatus 100, 200, 300, 400 or 500. In addition, in FIG. 10, a portion of the image captured by the imaging apparatus 17 is indicated by the white range.

Figure 11:
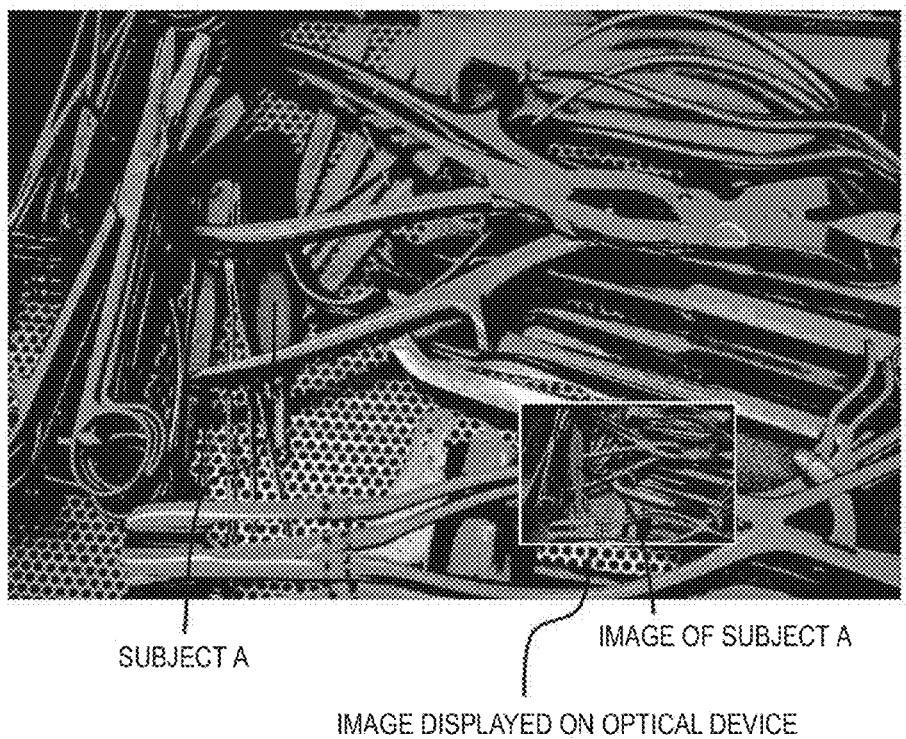
FIG. 11 is a diagram illustrating a state where an image of a subject displayed on the image display apparatus is smaller than the subject viewed through the dimming device and the optical device.

Alternatively, in the third mode, the image of the subject displayed on the image display apparatus 100, 200, 300, 400 or 500 is adjusted such that the image of the subject displayed on the image display apparatus is smaller than the subject viewed through the dimming device 700 and the optical device 120, 320 or 520 (refer to FIG. 11). In addition, in FIG. 11, the reduced image is indicated by the white range.

In addition, in a binocular type in which two image display apparatuses are provided, one image display apparatus (for example, a right eye image display apparatus) may perform the above-described operations, and the other image display apparatus (for example, a left eye image display apparatus) may be in a state where a light amount of ambient light incident from the outside is not reduced by the dimming device 700 at all times (refer to FIG. 6).

In the display instrument or the image display method of Embodiment 1, the dimming device which adjusts a light amount of ambient light incident from the outside is disposed in the optical device, and, in the first mode in which an image captured by the imaging apparatus is displayed on the image display apparatus, a light amount of ambient light incident from the outside is reduced by the dimming device. In other words, the display instrument can be used as both the non-transmissive image display apparatus and the semi-transmissive image display apparatus on the basis of control of operations and non-operations of the dimming device. In addition, since a light amount of ambient light incident from the outside is reduced by the dimming device, it is possible to match an external object with a displayed image with high accuracy.

Embodiment 2

Figure 12:
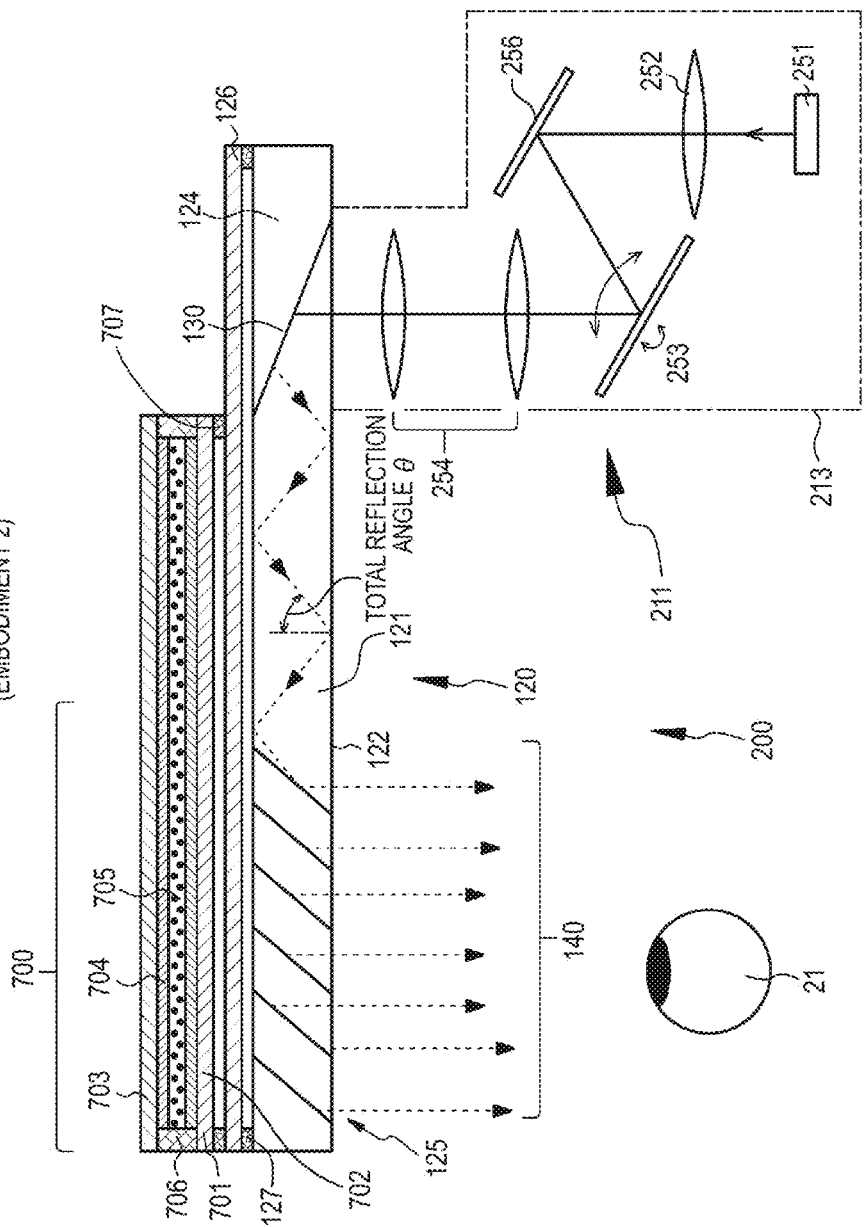
FIG. 12 is a conceptual diagram of an image display apparatus in a display instrument of Embodiment 2.

Embodiment 2 is a modification of Embodiment 1. As shown in FIG. 12 which is a conceptual diagram of the image display apparatus 200 in the display instrument (head mounted display) of Embodiment 2, the image forming device 211 includes an image forming device with the second configuration in Embodiment 2. In other words, a light source 251 and a scanning unit 253 which scans parallel light emitted from the light source 251 are provided. More specifically, the image forming device 211 includes (i) the light source 251, (ii) a collimating optical system 252 which converts light emitted from the light source 251 into parallel light, (iii) the scanning unit 253 which scans the parallel light emitted from the collimating optical system 252, and (iv) a relay optical system 254 which relays the parallel light scanned by the scanning unit 253 so as to be emitted. In addition, each image forming device 211 is entirely accommodated in a casing 213 (indicated by the dot chain line in FIG. 12), an opening (not shown) is provided in the related casing 213, and light is emitted from the relay optical system 254 via the opening. Further, the respective casings 213 are installed in the temple portions 13 so as to be attachable and detachable using installation members 19.

The light source 251 includes a light emitting element which emits white light. In addition, light emitted from the light source 251 is incident to the collimating optical system 252 which has positive optical power as a whole and is emitted as parallel light. Further, the parallel light is reflected by a total reflection mirror 256, and undergoes horizontal scanning and vertical scanning by the scanning unit 253 including MEMS which can scan incident parallel light in a two-dimensional manner by using a micromirror which freely rotates in a two-dimensional direction, thereby generating a kind of two-dimensional image and virtual pixels (the number of pixels may be the same as in Embodiment 1). In addition, the light from the virtual pixels passes through the relay optical system (a parallel light emitting optical system) 254 formed of an existing relay optical system, and a light flux converted into parallel light is incident to the optical device 120.

The optical device 120 which causes the light flux converted into parallel light in the relay optical system 254 to be incident thereto, be guided and be emitted therefrom has the same configuration and structure as the optical device described in Embodiment 1, and thus detailed description thereof will be omitted. In addition, the display instrument of Embodiment 2 has substantially the same configuration and structure as the display instrument of Embodiment 1 except for the image forming device 211 is different, and thus detailed description thereof will be omitted.

Embodiment 3

Figure 13:
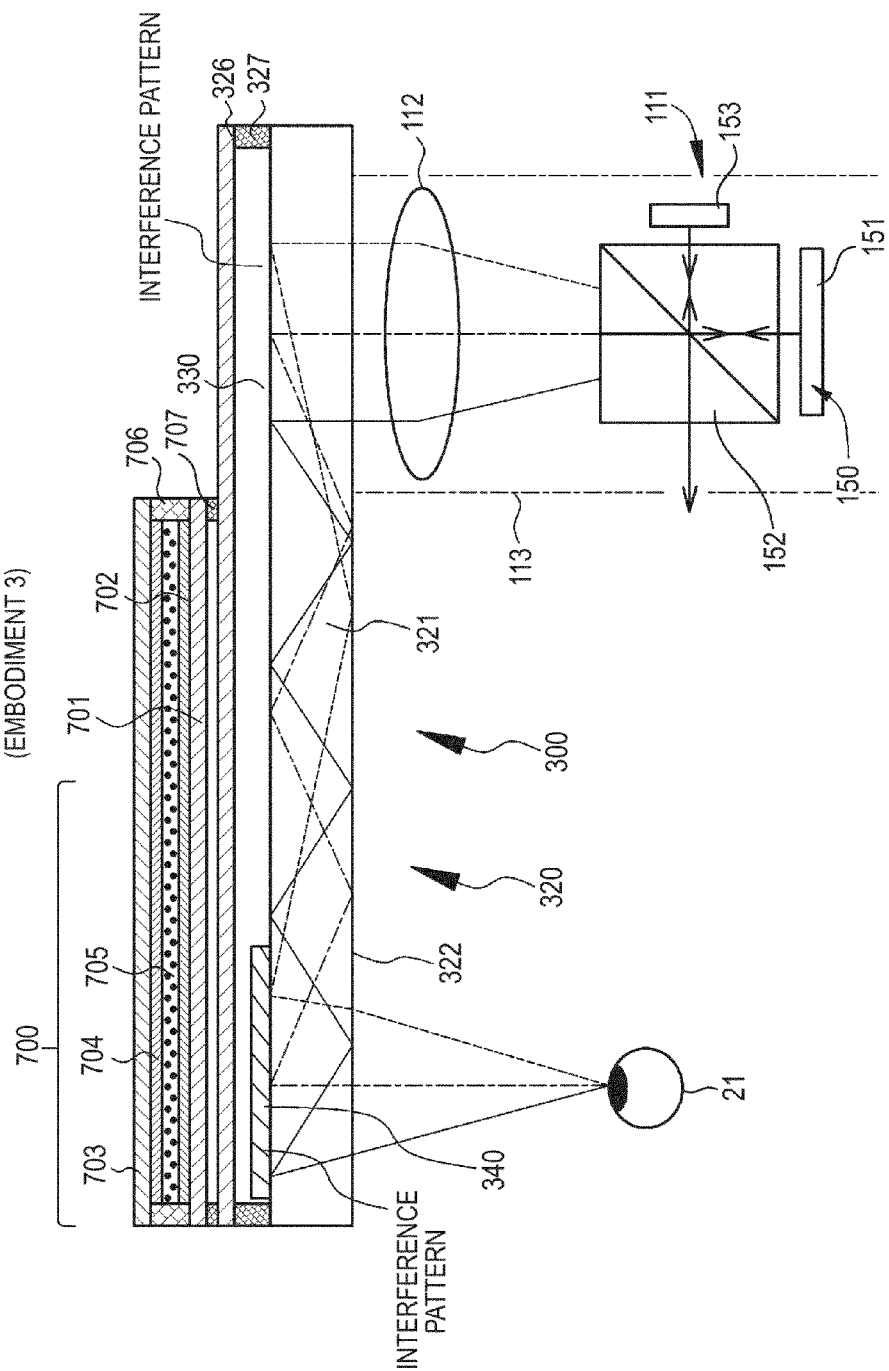
FIG. 13 is a conceptual diagram of an image display apparatus in a display instrument of Embodiment 3.
Figure 14:
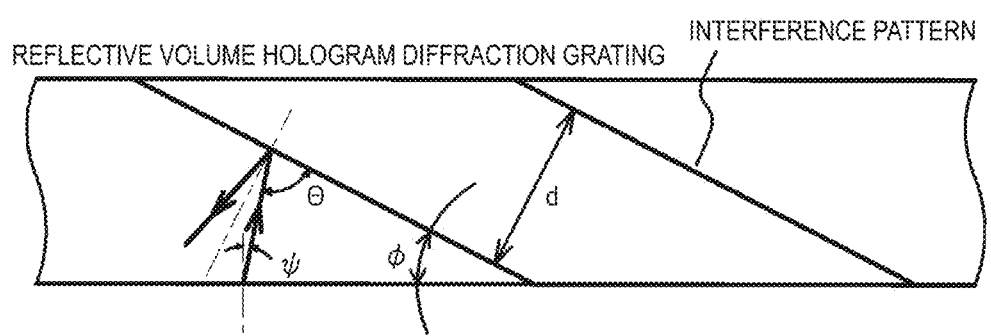
FIG. 14 is a schematic cross-sectional view illustrating an enlarged portion of a reflective volume hologram diffraction grating in the display instrument of Embodiment 3.

Embodiment 3 is also a modification of Embodiment 1. FIG. 13 is a conceptual diagram of the image display apparatus 300 in the display instrument (head mounted display) of Embodiment 3. In addition, FIG. 14 is a schematic cross-sectional view illustrating an enlarged portion of a reflective volume hologram diffraction grating. In Embodiment 3, the image forming device 111 includes an image forming device with the first configuration in the same manner as in Embodiment 1. Further, basic configuration and structure of the optical device 320 are the same as the optical device 120 of Embodiment except that configuration and structures of the first deflection unit and the second deflection unit are different.

In Embodiment 3, the first deflection unit and the second deflection unit are disposed on a surface of the light guide plate 321 (specifically, the second surface 323 of the light guide plate 321). In addition, the first deflection unit diffracts light incident to the light guide plate 321, and the second deflection unit causes the light which has propagated inside the light guide plate 321 through total reflection to undergo a plurality of diffractions. Here, the first deflection unit and the second deflection unit includes a diffraction grating element, specifically, a reflective diffraction grating element, more specifically, a reflective volume hologram diffraction grating. In the following description, for convenience, the first deflection unit including the reflective volume hologram diffraction grating is referred to as a "first diffraction grating member 330", and, for convenience, the second deflection unit formed by the reflective volume hologram diffraction grating is referred to as a "second diffraction grating member 340".

In addition, in Embodiment 3, or Embodiment 4 described later, the first diffraction grating member 330 and the second diffraction grating member 340 are formed by laminating a single diffraction grating layer. In addition, an interference pattern corresponding to one kind of wavelength band (or a wavelength) is formed on each diffraction grating layer made of a photopolymer material and is manufactured in a method in the related art. A pitch of the interference pattern formed on the diffraction grating layer (diffraction optical element) is constant, and the interference pattern is linear and is parallel to the Z axis. In addition, the axial lines of the first diffraction grating member 330 and the second diffraction grating member 340 are parallel to the X axis, and the normal lines thereof are parallel to the Y axis.

FIG. 14 is a partial cross-sectional view illustrating an enlarged reflective volume hologram diffraction grating. An interference pattern with a slant angle φ is formed in the reflective volume hologram diffraction grating. Here, the slant angle φ indicates an angle formed between the surface of the reflective volume hologram diffraction grating and the interference pattern. The interference pattern is formed from the inside of the reflective volume hologram diffraction grating to the surface. The interference pattern satisfies the Bragg condition. Here, the Bragg condition indicates a condition satisfying the following Equation (A). In Equation (A), m indicates a positive integer, λ indicates a wavelength, d indicates a pitch of the grating surface (an interval in the normal direction of a virtual plane including the interference pattern), and Θ indicates the complementary angle of an incidence angle to the interference pattern. In addition, in a case where light enters the diffraction grating member at an incidence angle Ψ, a relationship between Θ, the slant angle φ, and the incidence angle Ψ is as in Equation (B).

$$m \cdot \lambda = 2 \cdot d \cdot \sin(\Theta) \quad (A)$$

$$\Theta = 90° - (\varphi + \Psi) \quad (B)$$

As described above, the first diffraction grating member 330 is disposed on (adhered to) the second surface 323 of the light guide plate 321, and diffracts and reflects parallel light incident to the light guide plate 321 such that the parallel light incident to the light guide plate 321 from the first surface 322 is totally reflected inside the light guide plate 321. Further, as described above, the second diffraction grating member 340 is disposed on (adhered to) the second surface 323 of the light guide plate 321, and causes the parallel light which has propagated inside the light guide plate 321 through the total reflection to undergo a plurality of diffractions and reflections and to be emitted from the first surface 322 in a parallel light state from the light guide plate 321.

In addition, the parallel light propagates inside the light guide plate 321 through the total reflection and is then emitted. At this time, since the light guide plate 321 is thin and a path along with the light travelling inside the light guide plate 321 is long, the number of total reflections until reaching the second diffraction grating member 340 is different depending on each angle of view. More specifically, of the parallel light beams incident to the light guide plate 321, the number of reflections of a parallel light beam incident with an angle in a direction close to the second diffraction grating member 340 is smaller than the number of reflections of a parallel light beam incident to the light guide plate 321 with an angle in a direction distant from the second diffraction grating member 340. This is because the parallel light which is diffracted and reflected in the first diffraction grating member 330 and is incident to the light guide plate 321 at an angle in a direction close to the second diffraction grating member 340 has a smaller angle formed with the normal line of the light guide plate 321 when the light propagating inside the light guide plate 321 runs into the inner surface of the light guide plate 321 than the parallel light incident to the light guide plate 321 at an angle in a reverse direction thereto. In addition, a shape of the interference pattern formed inside the second diffraction grating member 340 and a shape of the interference pattern formed inside the first diffraction grating member 330 are symmetric with respect to a virtual plane perpendicular to the axial line of the light guide plate 321. The surfaces of the first diffraction grating member 330 and the second diffraction grating member 340 which do not face the light guide plate 321 are covered by a protection member (a protection plate) 326 such that the first diffraction grating member 330 and the second diffraction grating member 340 are prevented from being damaged. Further, the light guide plate 321 and the protection member 326 are adhered to each other by an adhesive 327 at the outer circumferential part. In addition, the light guide plate 321 may be protected by bonding a transparent protection film to the first surface 322.

The light guide plate 321 in Embodiment 4 described later basically also has the same configuration and structure as the above-described configuration and structure of the light guide plate 321.

The display instrument of Embodiment 3 has substantially the same configuration and structure as the display instrument of Embodiment 1 except that the optical device 320 is different as described above, and thus detailed description thereof will be omitted.

Embodiment 4

Figure 15:
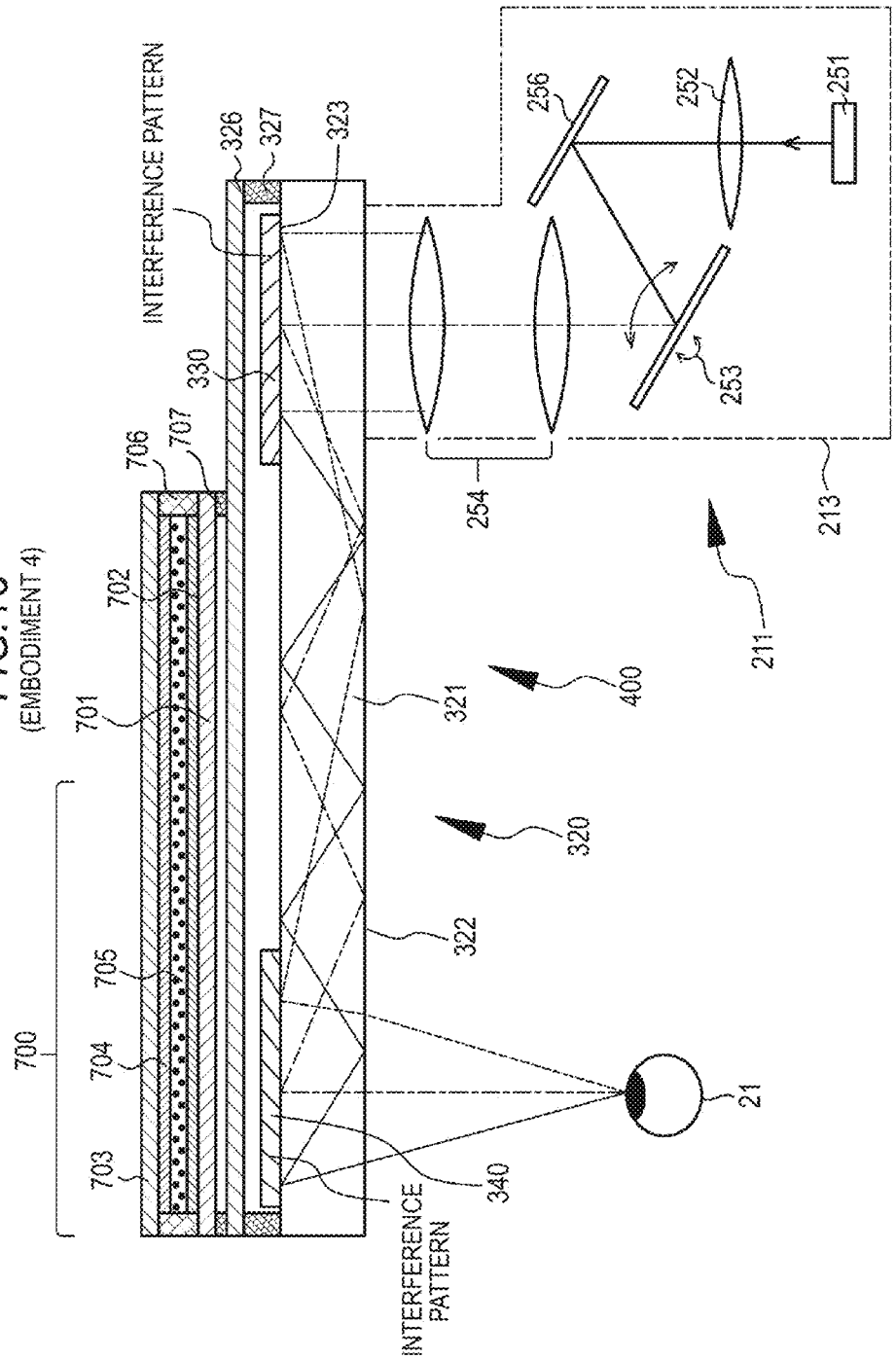
FIG. 15 is a conceptual diagram of an image display apparatus in a display instrument of Embodiment 4.

Embodiment 4 is a modification of Embodiment 3. FIG. 15 is a conceptual diagram of an image display apparatus in the display instrument (head mounted display) of Embodiment 4. The light source 251, the collimating optical system 252, the scanning unit 253, the parallel light emitting optical system (the relay optical system 254), and the like in the image display apparatus 400 of Embodiment 4 have the same configurations and structures (the image display apparatus with the second configuration) as in Embodiment 2. Further, the optical device 320 in Embodiment 4 has the same configuration and structure as the optical device 320 in Embodiment 3. The display instrument of Embodiment 4 has substantially the same configuration and structure as the display instrument of Embodiment 2 except for the above-described differences, and thus detailed description thereof will be omitted.

Embodiment 5

Figure 16:
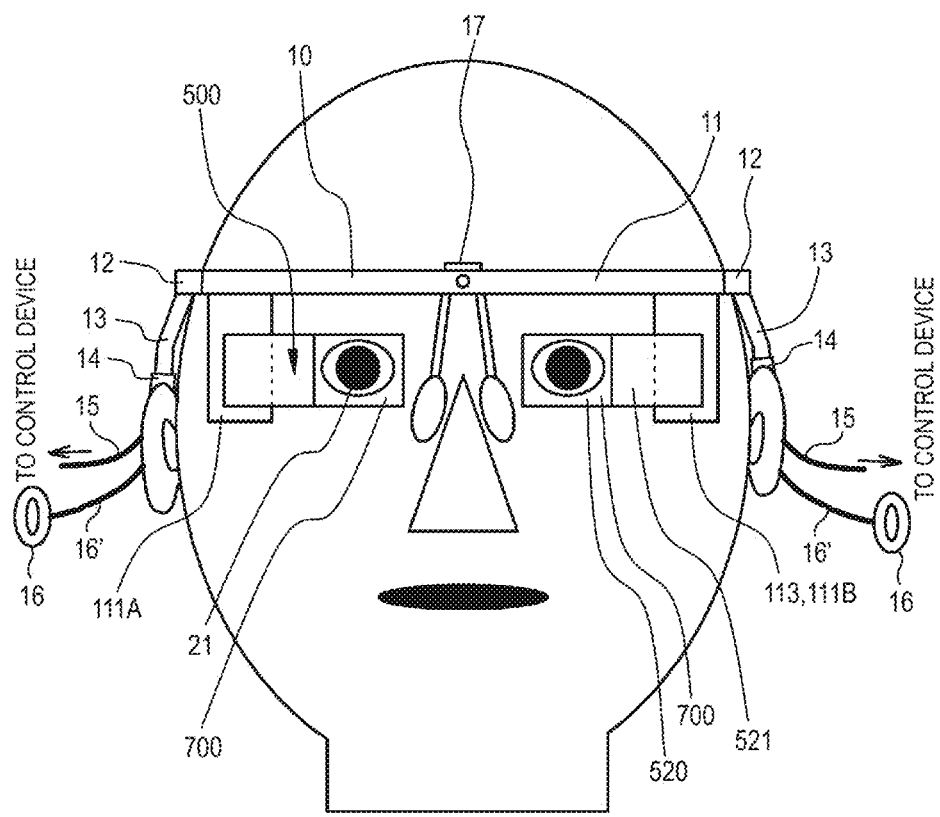
FIG. 16 is a schematic diagram of a display instrument of Embodiment 5 viewed from the front side.
Figure 17:
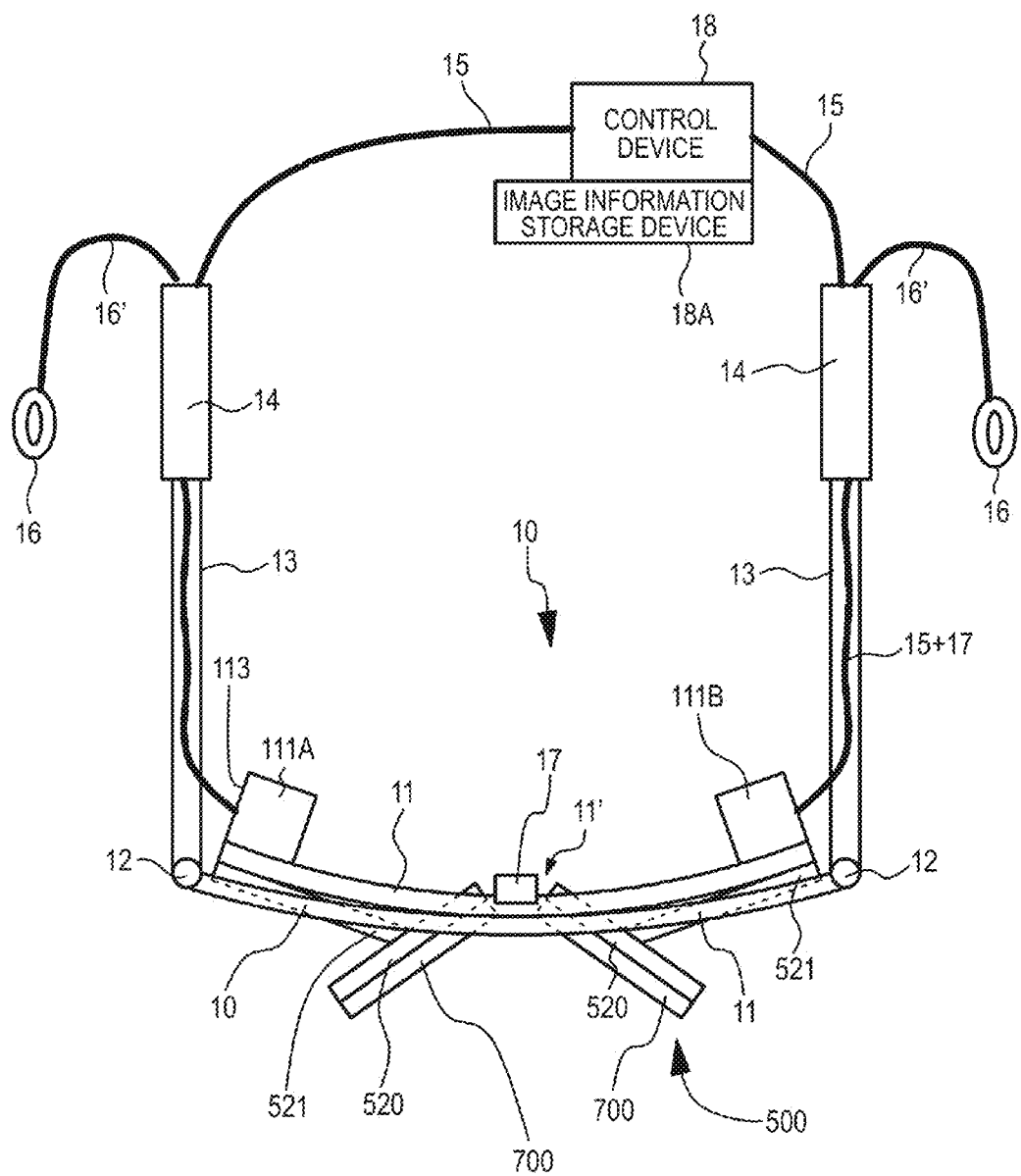
FIG. 17 is a schematic diagram of the display instrument of Embodiment 5 viewed from the top side.

Embodiment 5 is a modification of the image display apparatus in Embodiments 1 to 4. FIG. 16 is a schematic diagram of a display instrument of Embodiment 5 viewed from the front side, and FIG. 17 is a schematic diagram thereof viewed from the top side.

In Embodiment 5, the optical device 520 forming the image display apparatus 500 includes a semi-transmissive mirror which allows light emitted from the image forming devices 111A and 111B to be incident thereto and to be emitted therefrom toward the pupil 21 of the observer. In addition, although, in Embodiment 5, a structure is employed in which the light emitted from the image forming devices 111A and 111B propagates inside a transparent member 521 such as a glass plate or a plastic plate and is incident to the optical device 520 (semi-transmissive mirror), a structure may be employed in which the light propagates through the air and is incident to the optical device 520. Further, the image forming device may be the image forming device 211 described in Embodiment 2.

The respective image forming devices 111A and 111B are installed in the front portion 11 by using, for example, screws. In addition, the member 521 is installed in each of the image forming devices 111A and 111B, the optical device 520 (a semi-transmissive mirror) is installed in the member 521, and the dimming device 700 is installed in the optical device 520 (a semi-transmissive mirror). The display instrument of Embodiment 5 has substantially the same configuration and structure as the display instrument of Embodiments 1 to 4 except for the above-described differences, and thus detailed description thereof will be omitted.

Embodiment 6

Figure 18A:
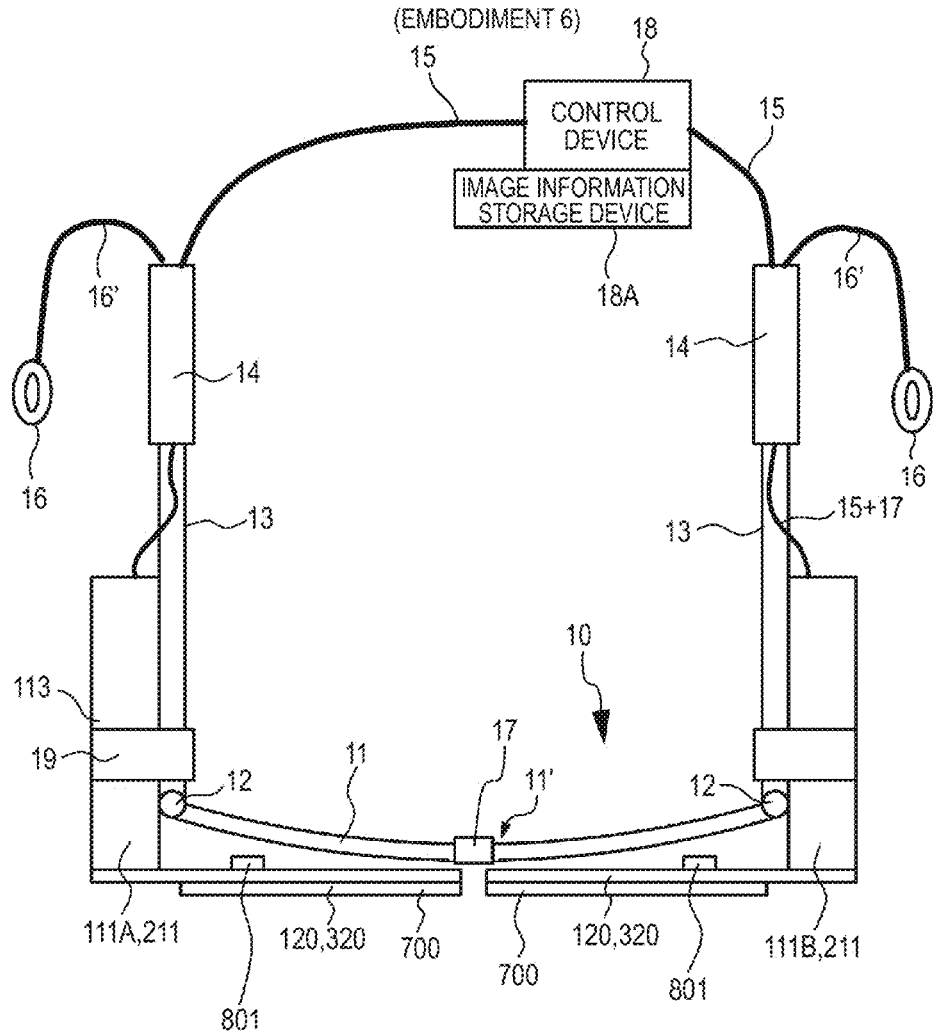
FIGS. 18A and 18B are respectively a schematic diagram of a display instrument of Embodiment 6 viewed from the top side and a schematic diagram of circuits which control an illuminance sensor.
Figure 18B:
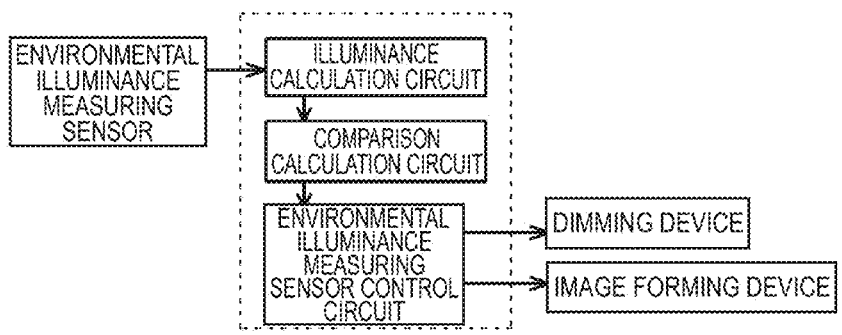

Embodiment 6 is also a modification of Embodiments 1 to 4. FIG. 18A is a schematic diagram of the display instrument of Embodiment 6 viewed from the top side. In addition, FIG. 18B is a schematic diagram illustrating circuits which control an illuminance sensor.

The display instrument of Embodiment 6 further includes a first illuminance sensor (an environmental illuminance measuring sensor) 801 which measures the illuminance of an environment in which the display instrument is placed, and the light transmittance of the dimming device 700 is controlled based on a measurement result of the first illuminance sensor 801. In addition, the luminance of an image formed by the image forming device 111 or 211 is controlled independently based on a measurement result of the first illuminance sensor 801. The first illuminance sensor 801 having an existing configuration and structure may be disposed, for example, at an outer end part of the optical device 120 or 320 or at the outer end part of the dimming device. The first illuminance sensor 801 is connected to the control device 18 via a connector and a wire (neither shown). The control device 18 includes circuits which control the first illuminance sensor 801. The circuits controlling the first illuminance sensor 801 include an illuminance calculation circuit which receives a measurement value from the first illuminance sensor 801 and obtains an illuminance, a comparison calculation circuit which compares a value of the illuminance obtained by the illuminance calculation circuit with a standard value, and an environmental illuminance measuring sensor control circuit which controls the dimming device 700 and/or the image forming device 111 or 211 on the basis of a value obtained by the comparison calculation circuit, and these circuits may be formed using existing circuits. When the dimming device 700 is controlled, the light transmittance of the dimming device 700 is controlled, and, on the other hand, when the image forming device 111 or 211 is controlled, the luminance of an image formed by the image forming device 111 or 211 is controlled. Further, the control of the light transmittance in the dimming device 700 and the control of the luminance in the image forming device 111 or 211 may be performed independently or in correlation with each other.

For example, when a measurement result of the first illuminance sensor 801 is equal to or more than a predetermined value (a first illuminance measurement value), the light transmittance of the dimming device 700 is made to be equal to or less than a predetermined value (a first light transmittance). On the other hand, when a measurement result of the first illuminance sensor 801 is equal to or less than a predetermined value (a second illuminance measurement value), the light transmittance of the dimming device 700 is made to be equal to or more than a predetermined value (a second light transmittance). Here, the first illuminance measurement value may be 10 lux, the first light transmittance may be any of 1% to 30%, the second illuminance measurement value may be 0.01 lux, and the second light transmittance may be any one of 51% to 99%.

In addition, the first illuminance sensor (an environmental illuminance measuring sensor) 801 in Embodiment 6 may be applied to the display instrument described in Embodiments 2 to 5. Further, in a case where the display instrument includes an imaging apparatus, the first illuminance sensor 801 may be formed using a light sensing element for exposure measurement provided in the imaging apparatus.

In the display instrument of Embodiment 6 or Embodiment 7 described later, the light transmittance of the dimming device is controlled based on a measurement result of the first illuminance sensor (environmental illuminance measuring sensor), the luminance of an image formed by the image forming device is controlled based on a measurement result of the first illuminance sensor, the light transmittance of the dimming device is controlled based on a measurement result of a second illuminance sensor (transmission light illuminance measuring sensor), and the luminance of an image formed by the image forming device is controlled based on a measurement result of the second illuminance sensor. Therefore, it is possible not only to give high contrast to an image observed by the observer but also to optimize an observation state of an image depending on the illuminance of the environment in which the display instrument is placed.

Embodiment 7

Figure 19A:
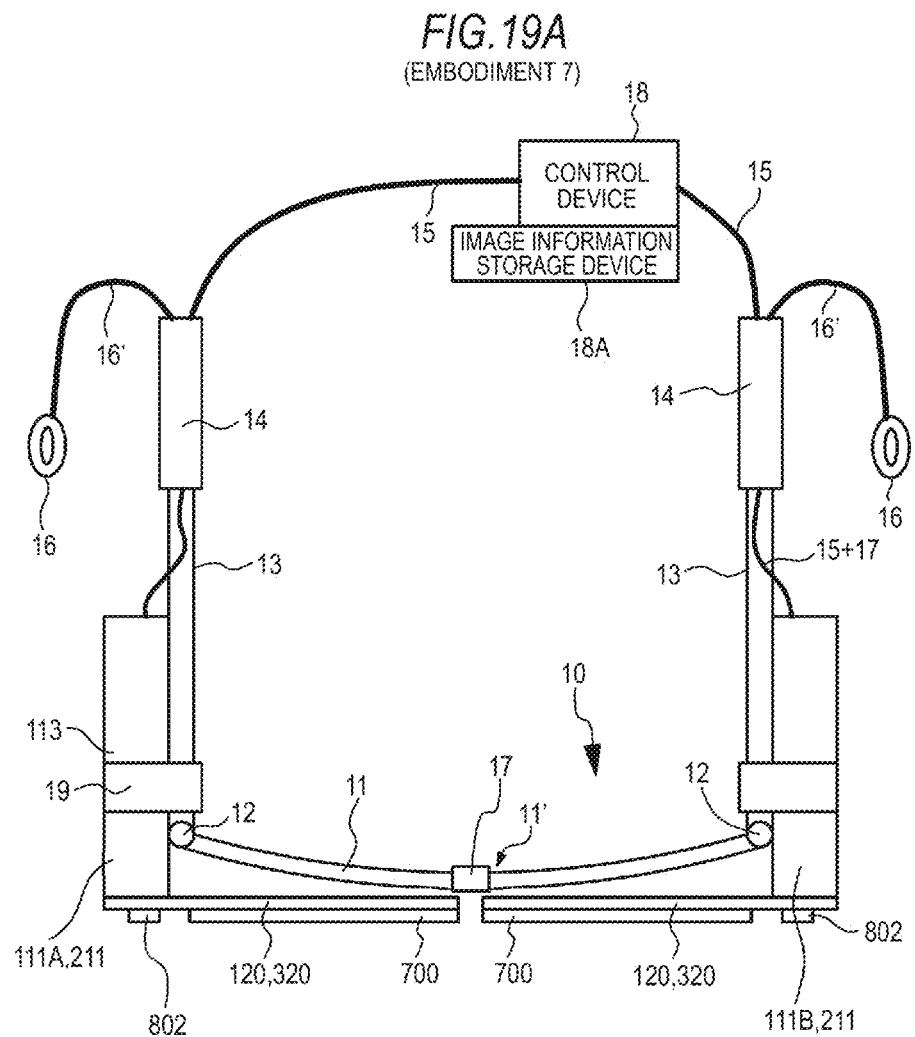
FIGS. 19A and 19B are respectively a schematic diagram of a display instrument of Embodiment 7 viewed from the top side and a schematic diagram of circuits which control an illuminance sensor.
Figure 19B:
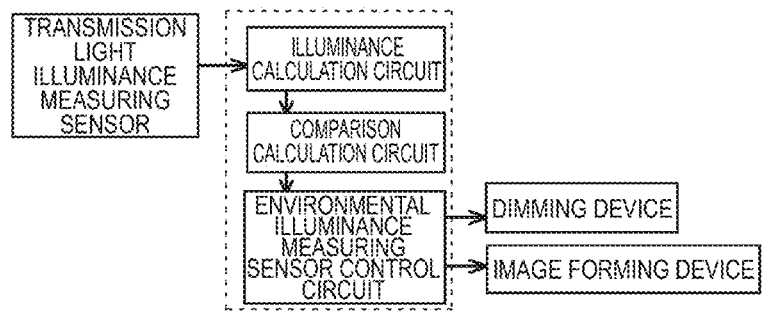

Embodiment 7 is also a modification of Embodiments 1 to 4. FIG. 19A is a schematic diagram of the display instrument of Embodiment 7 viewed from the top side. In addition, FIG. 19B is a schematic diagram of circuits which control the illuminance sensor.

The display instrument of Embodiment 7 further includes the second illuminance sensor (transmission light illuminance measuring sensor) 802 which measures illuminance based on light transmitted through the dimming device from the external environment, that is, measures whether or not environmental light is transmitted through the dimming device and is incident after being adjusted to a desired illuminance, and the light transmittance of the dimming device 700 is controlled based on a measurement result of the second illuminance sensor 802. In addition, the luminance of an image formed by the image forming device 111 or 211 is controlled independently based on a measurement result of the second illuminance sensor 802. The second illuminance sensor 802 having an existing configuration and structure is disposed further toward the observer side than the optical device 120, 320 or 520. Specifically, the second illuminance sensor 802 may be disposed, for example, on a surface on the observer side of the light guide plate 121 or 321. The second illuminance sensor 802 is connected to the control device 18 via a connector and a wire (neither shown). The control device 18 includes circuits which control the second illuminance sensor 802. The circuits controlling the second illuminance sensor 802 include an illuminance calculation circuit which receives a measurement value from the second illuminance sensor 802 and obtains an illuminance, a comparison calculation circuit which compares a value of the illuminance obtained by the illuminance calculation circuit with a standard value, and a transmission light illuminance measuring sensor control circuit which controls the dimming device 700 and/or the image forming device 111 or 211 on the basis of a value obtained by the comparison calculation circuit, and these circuits may be formed using existing circuits. When the dimming device 700 is controlled, the light transmittance of the dimming device 700 is controlled, and, on the other hand, when the image forming device 111 or 211 is controlled, the luminance of an image formed by the image forming device 111 or 211 is controlled. Further, the control of the light transmittance in the dimming device 700 and the control of the luminance in the image forming device 111 or 211 may be performed independently or in correlation with each other. Furthermore, in a case where a measurement result of the second illuminance sensor 802 is not controlled to a desired illuminance in view of the illuminance of the first illuminance sensor 801, that is, the measurement result of the second illuminance sensor 802 is not a desired illuminance, or subtler illuminance adjustment is desired, the light transmittance of the dimming device may be adjusted while monitoring a value of the second illuminance sensor 802.

In addition, the second illuminance sensor (a transmission light illuminance measuring sensor) 802 in Embodiment 7 may be applied to the display instrument described in Embodiments 2 to 4. Alternatively, the second illuminance sensor 802 in Embodiment 7 may be combined with the first illuminance sensors 801 in Embodiment 6, and, in this case, through various tests, the control of the light transmittance in the dimming device 700 and the control of the luminance of the image in the image forming device 111 or 211 may be performed independently or in correlation with each other.

Embodiment 8

Figure 21:
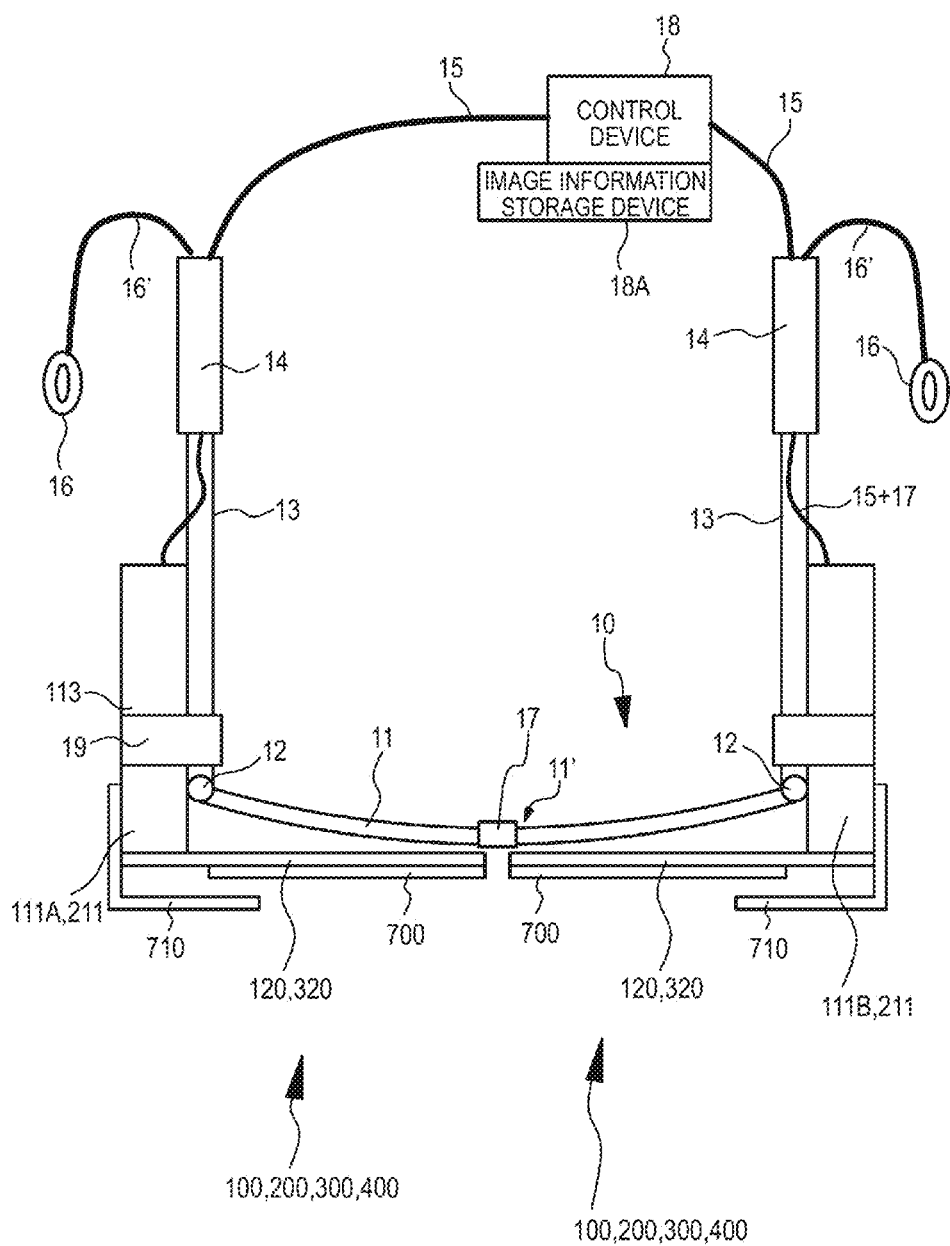
FIG. 21 is a schematic diagram of the display instrument of Embodiment 8 viewed from the top side.
Figure 22A:
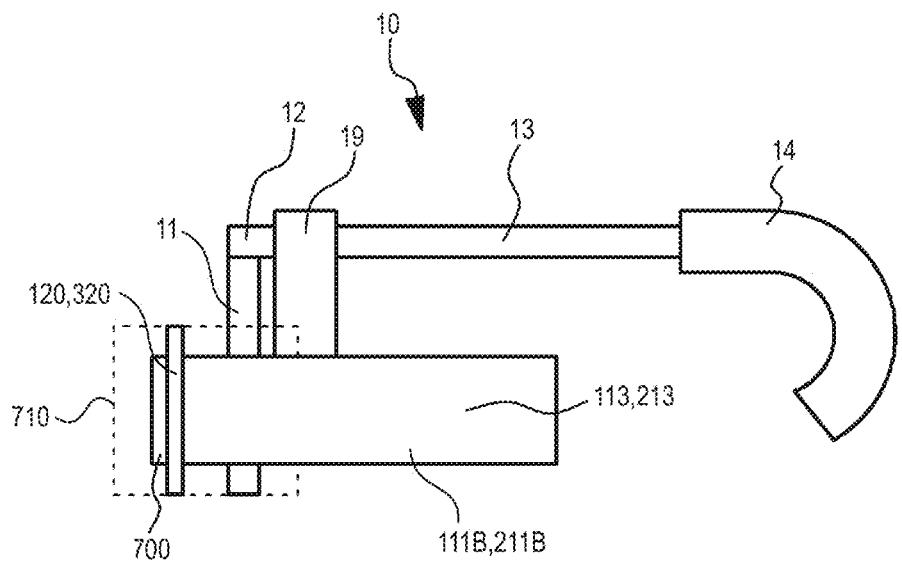
FIGS. 22A and 22B are respectively a schematic diagram of the display instrument of Embodiment 8 viewed from the lateral side and a schematic diagram of optical device and dimming device parts in the display instrument of Embodiment 8 viewed from the front side.
Figure 22B:
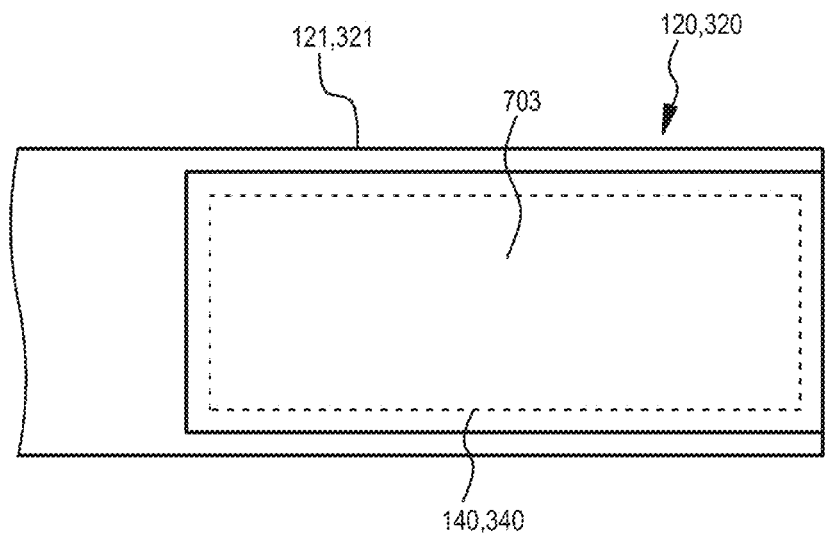
Figure 23:
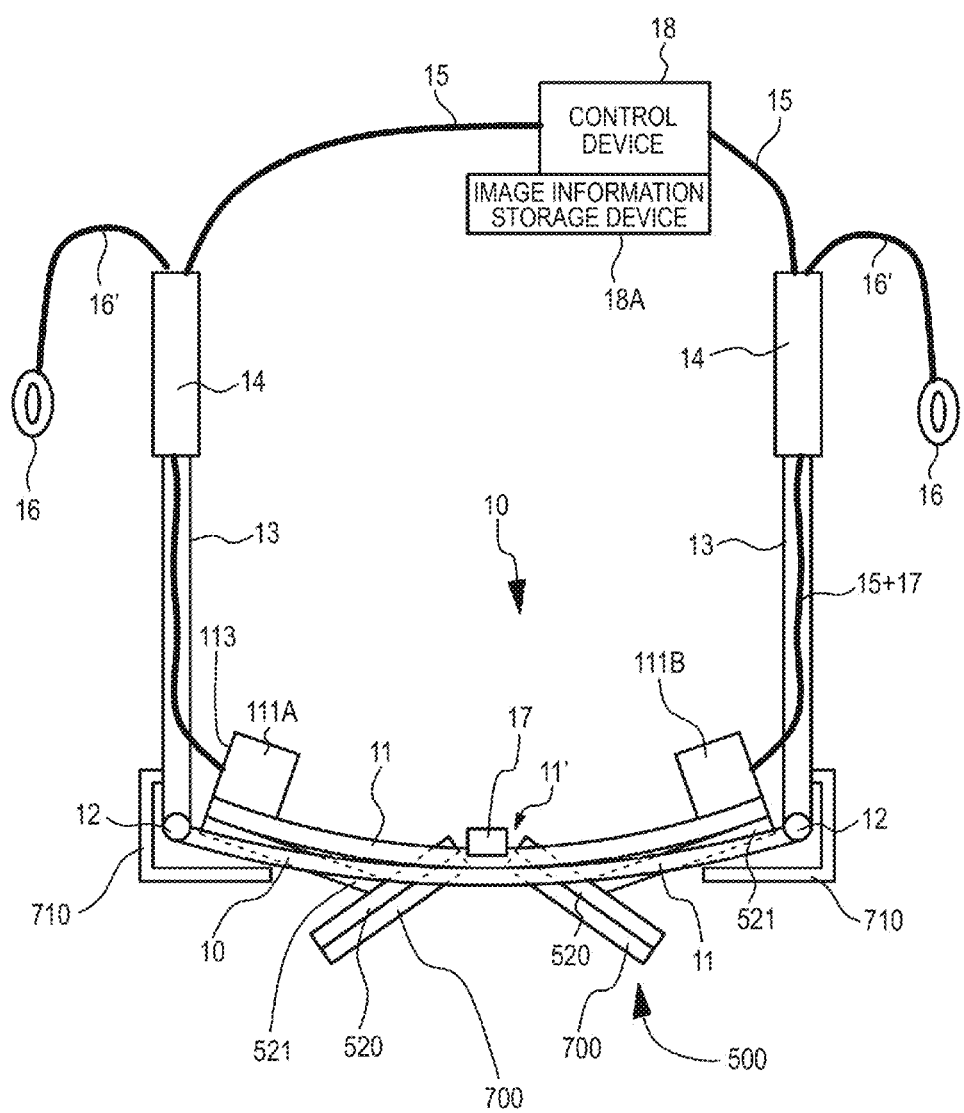
FIG. 23 is a conceptual diagram of a modified example of the display instrument of Embodiment 8.

Embodiment 8 is a modification of Embodiments 1 to 7, and relates to a display instrument according to the first example of the present disclosure. FIG. 20 is a conceptual diagram of the image display apparatus of Embodiment 8; FIG. 21 is a schematic diagram of the display instrument (specifically, a head mounted display (HMD)) of Embodiment 8 viewed from the top side; FIG. 22A is a schematic diagram of the display instrument of Embodiment 8 viewed from the lateral side; and FIG. 22B is a schematic diagram of optical device and dimming device parts viewed from the front side. In addition, in FIG. 22A, a light blocking member is indicated by the dotted line. Further, FIG. 23 is a conceptual diagram illustrating a modified example of the display instrument of Embodiment 8. Furthermore, the example shown in FIG. 21 is a modified example of the display instrument of Embodiments 1 to 4, and the example shown in FIG. 23 is a modified example of the display instrument of Embodiment 5.

In the display instrument of the Embodiment 8, a light blocking member 710 which blocks ambient light from being incident to the optical device 120 is disposed in a region of the optical device 120 to which light emitted from each of the image forming devices 111A and 111B is incident, specifically, a region in which the first deflection unit 130 is provided. Here, the region of the optical device 120 to which light emitted from each of the image forming devices 111A and 111B is incident is included in a projection image of the light blocking member 710 onto the optical device 120. In addition, a projection image of the end portion of the dimming device 700 onto the optical device 120 is included in the projection image of the light blocking member 710 onto the optical device 120.

In Embodiment 8, the light blocking member 710 is disposed apart from the optical device 120 on an opposite side to the side of the optical device 120 where each of the image forming devices 111A and 111B is disposed. The light blocking member 710 is made of, for example, an opaque plastic material. The light blocking member 710 may integrally extend from the casing 113 of each of the image forming devices 111A and 111B, may be installed in the casing 113 of each of the image forming devices 111A and 111B, may integrally extend from the frame 10, or may be installed in the frame 10. In addition, in the shown example, the light blocking member 710 integrally extends from the casing 113 of each of the image forming devices 111A and 111B.

In the display instrument of the Embodiment 8, the light blocking member which blocks ambient light from being incident to the optical device is disposed in the region of the optical device to which light emitted from the image forming device is incident. Therefore, since the ambient light is not originally incident to the region to which light emitted from the image forming device is incident, specifically the ambient light is not incident to the first deflection unit 130, even if an incident light amount of the ambient light varies due to an operation of the dimming device, there is no deterioration in image display quality due to occurrence of undesired stray light or the like in the display instrument.

Embodiment 9

Figure 24:
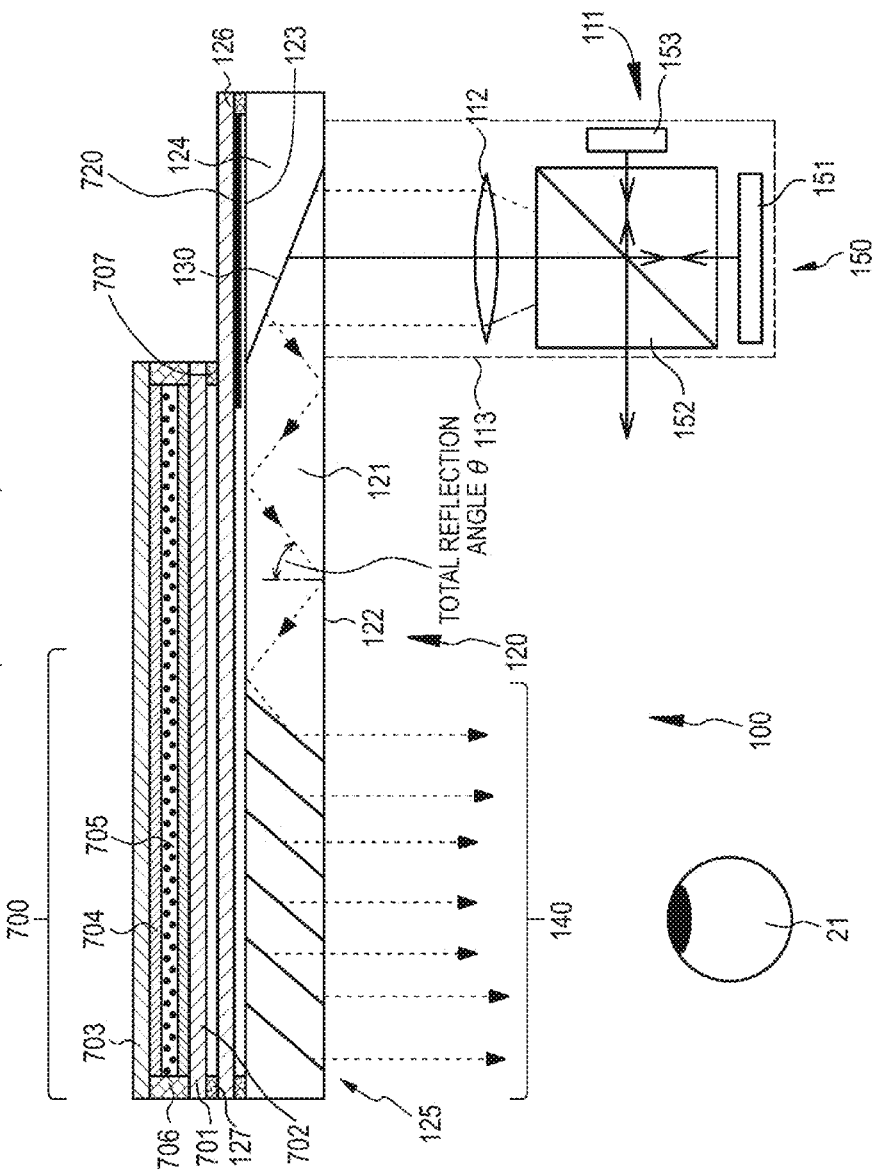
FIG. 24 is a conceptual diagram of a display instrument of Embodiment 9.

Embodiment 9 is a modification of Embodiment 8. As shown in FIG. 24 which is a conceptual diagram, in the display instrument of Embodiment 9, a light blocking member 720 is disposed in the optical device 120 part on an opposite side to the side where each of the image forming devices 111A and 111B is disposed, unlike in Embodiment 8. Specifically, an opaque ink is printed in the optical device 120 (specifically, on the inner surface of the protection member 126) so as to form the light blocking member 720. The display instrument of Embodiment 9 has the same configuration and structure as the display instrument of Embodiment 8 except for the above-described differences, and thus detailed description thereof will be omitted. In addition, the light blocking member 720 of Embodiment 9 may be combined with the light blocking member 710 of Embodiment 8. Further, the light blocking member 720 may be formed on the outer surface of the protection member 126.

Embodiment 10

Figure 25:
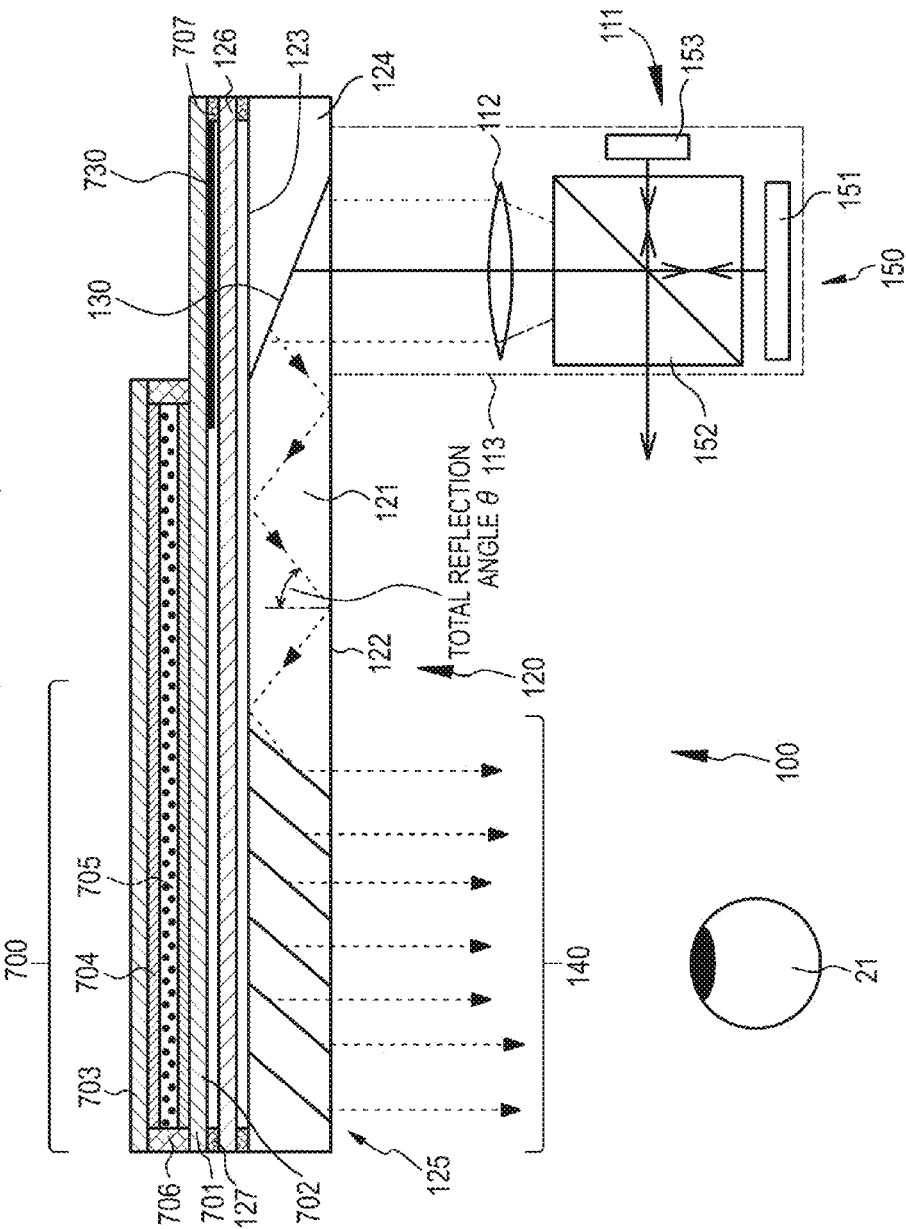
FIG. 25 is a conceptual diagram of a display instrument of Embodiment 10.
Figure 26:
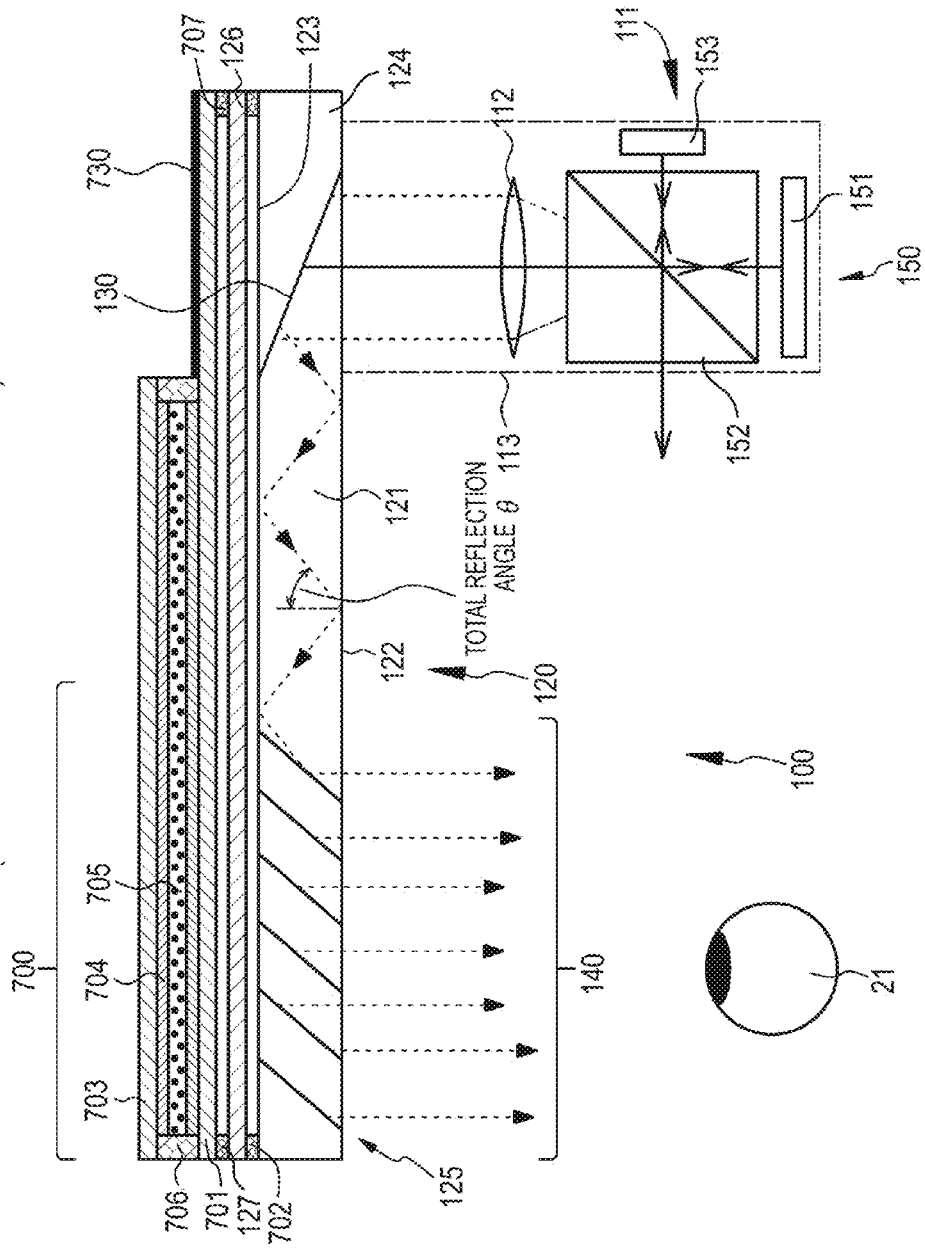
FIG. 26 is a conceptual diagram of a modified example of the display instrument of Embodiment 10.

Embodiment 10 is also a modification of Embodiment 8. As shown in FIG. 25 or 26 which is a conceptual diagram, in the display instrument of Embodiment 10, a light blocking member 730 is disposed in the dimming device 700 unlike in Embodiments 8 and 9. Specifically, an opaque ink is printed in the dimming device 700 so as to form the light blocking member 730. In addition, in the example shown in FIG. 25, the light blocking member 730 is formed on the outer surface of the first substrate 701 of the dimming device 700, and, in the example shown in FIG. 26, the light blocking member 730 is formed on the inner surface of the first substrate 701 of the dimming device 700. The display instrument of Embodiment 10 has the same configuration and structure as the display instrument of Embodiment 8 except for the above-described differences, and thus detailed description thereof will be omitted. In addition, the light blocking member 730 of Embodiment 10 may be combined with the light blocking member 710 of Embodiment 8, the light blocking member 730 of Embodiment 10 may be combined with the light blocking member 720 of Embodiment 9, or, the light blocking member 730 of Embodiment 10, the light blocking member 710 of Embodiment 8, and the light blocking member 720 of Embodiment 9 may be combined with each other.

Embodiment 11

Figure 27:
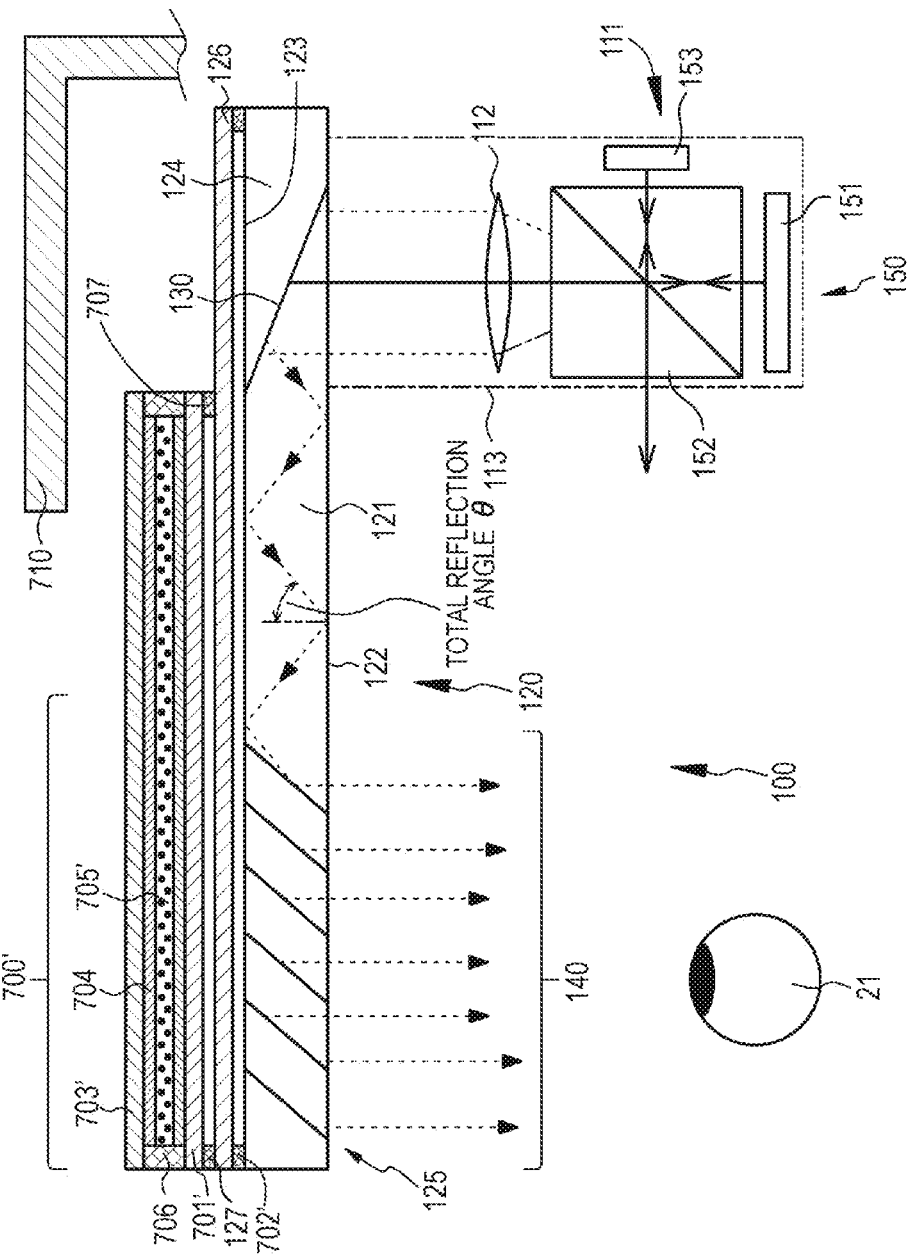
FIG. 27 is a conceptual diagram of a display instrument of Embodiment 11.

Embodiment 11 is a modification of Embodiments 8 to 10. In Embodiments 8 to 10, the light transmission control material layer 705 is formed of a liquid crystal material layer. On the other hand, as shown in FIG. 27 which is a conceptual diagram, in the display instrument of Embodiment 11, a dimming device 700' includes a light shutter in which a light transmission control material layer 705' is formed of an inorganic electroluminescence material layer. Here, a material of the inorganic electroluminescence material layer uses tungsten oxide ($WO_3$). In addition, a first substrate 701' and a second substrate 703' forming the dimming device 700' are formed of a transparent glass substrate such as soda-lime glass or super white glass, and the second substrate 703' is thinner than the first substrate 701'. Specifically, the thickness of the second substrate 703' is 0.2 mm, and the thickness of the first substrate 701' is 0.4 mm. The display instrument of Embodiment 11 has the same configuration and structure as the display instrument of Embodiments 8 to 10 except for the above-described differences, and thus detailed description thereof will be omitted. In addition, the first substrate 701' of the dimming device 700' and the protection member 126 are adhered to each other by the adhesive 707 in the same manner as in Embodiment 8.

Embodiment 12

Figure 28:
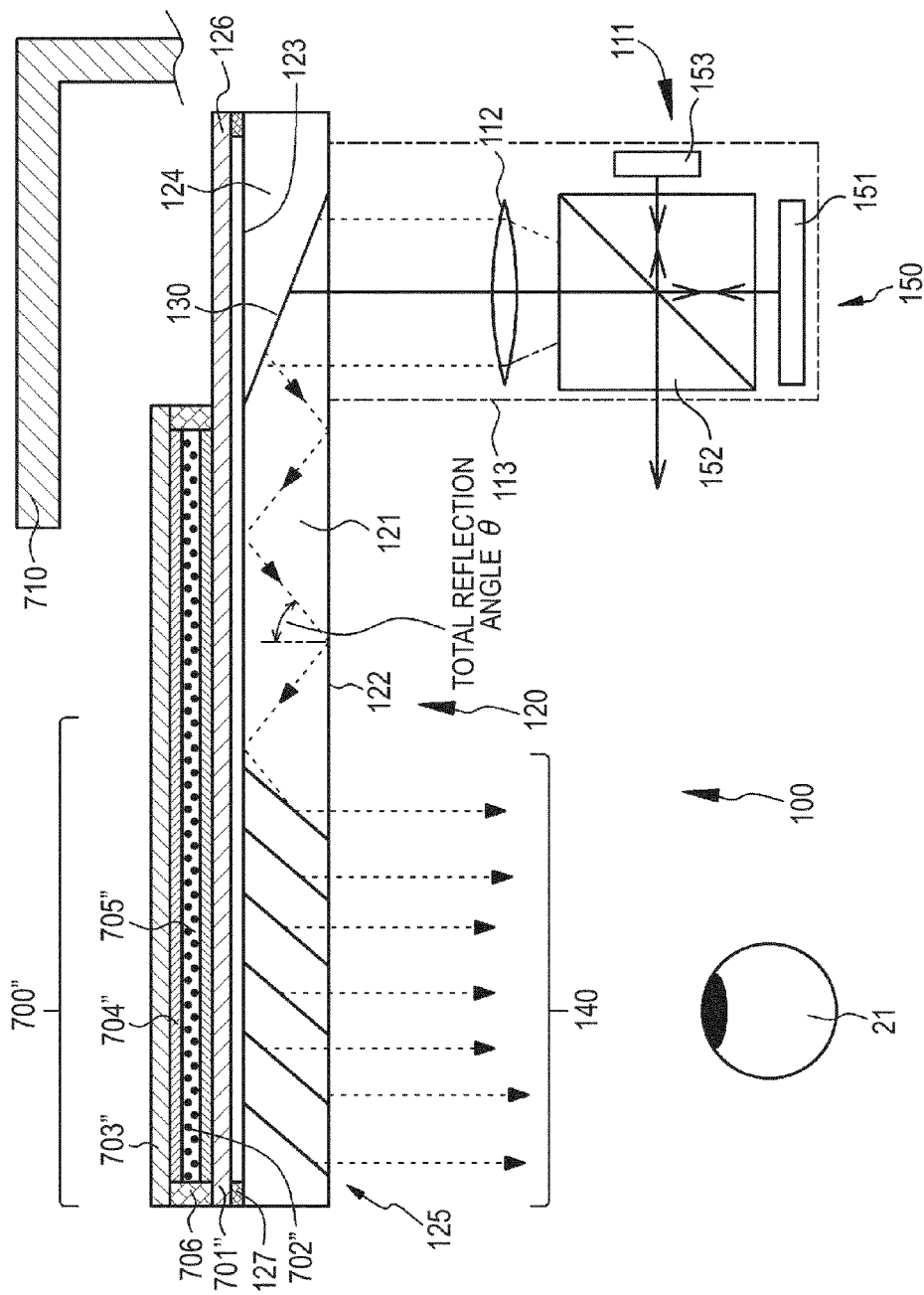
FIG. 28 is a conceptual diagram of a display instrument of Embodiment 12.
Figure 29:
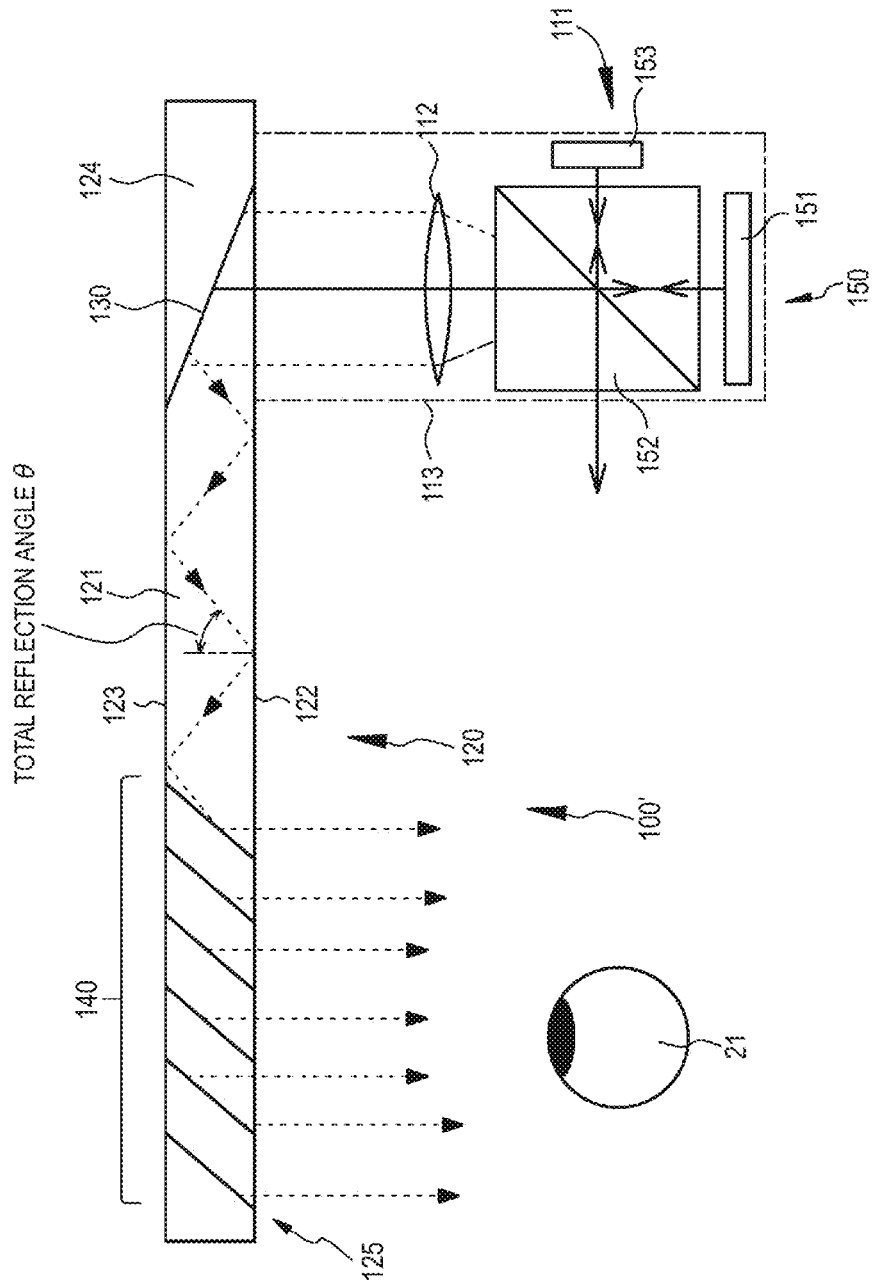
FIG. 29 is a conceptual diagram of an image display apparatus in a display instrument in the related art.
Figure 30:
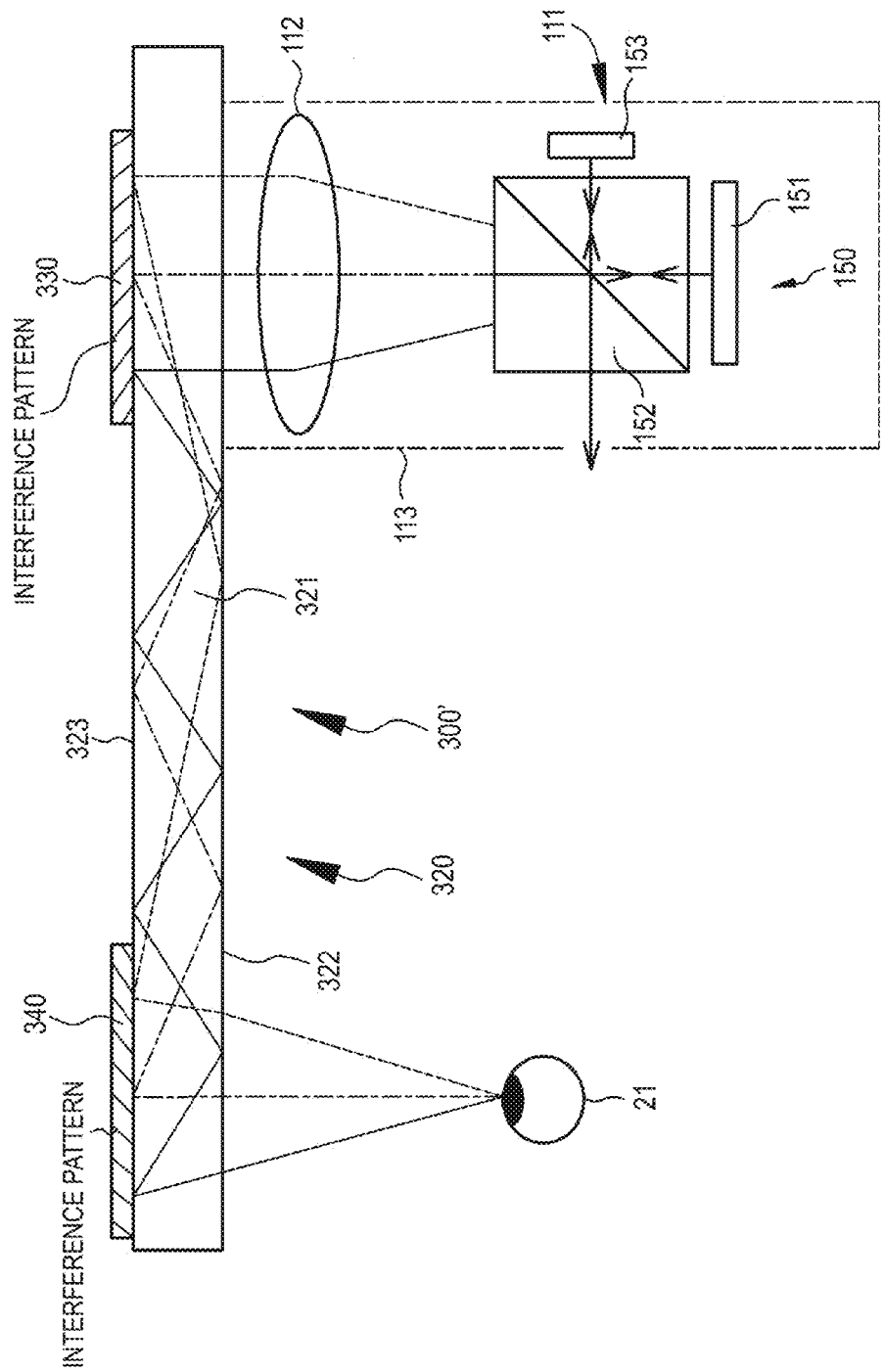
FIG. 30 is a conceptual diagram of an image display apparatus in a modified example of the display instrument in the related art.

Embodiment 12 relates to a display instrument according to the second example of the present disclosure, and relates to a modification of Embodiment 11. As shown in FIG. 28 which is a conceptual diagram, in the display instrument of Embodiment 12, a dimming device 700'' includes a first substrate 701'' opposite to the optical device 120, a second substrate 703'' opposite to the first substrate 701'', electrodes 702'' and 704'' respectively provided on the first substrate 701'' and the second substrate 703'', and a light transmission control material layer 705'' sealed between the first substrate 701'' and the second substrate 703''. In addition, the first substrate 701'' is also used as a constituent member (specifically, the protection member 126) of the optical device 120. In other words, the first substrate 701'' and the protection member 126 are common members and are commonly used.

As above, in Embodiment 12, since the first substrate 701'' forming the dimming device 700'' is also used as a constituent member (the protection member 126) of the optical device 120, the weight of the entire display instrument can be reduced, and thus there is no concern that a user of the display instrument may feel discomfort.

The display instrument of Embodiment 12 has the same configuration and structure as the display instrument of Embodiment 11, and thus detailed description thereof will be omitted. In addition, the light blocking member in the display instrument of Embodiment 12 may be the same configuration and structure as in the dimming device in the display instrument of Embodiments 8 to 10, and thus detailed description thereof will be omitted.

As described above, although the present disclosure has been described based on the preferable embodiments, the present disclosure is not limited to the embodiments. The configurations and structures of the display instrument (a head mounted display) and the image display apparatus described in the embodiments are only an example, and may be appropriately changed. For example, a surface relief hologram may be disposed in the light guide plate (refer to U.S. Patent No. 20040062505 A1). In the optical device 320, the diffraction grating element may use a transmissive diffraction grating element, and, one of the first deflection unit and the second deflection unit may be formed using a reflective diffraction grating element, and the other thereof may be formed using a transmissive diffraction grating element. Alternatively, the diffraction grating element may use a reflective blazed-diffraction grating element.

Although, in the embodiments, only the display instrument having the image information storage device has been described, the present disclosure is not limited thereto, and a so-called cloud computer may perform the function of the image information storage device. In addition, in this case, the display instrument is provided with a communication unit, for example, a mobile phone or a smart phone, or the display instrument is combined with the communication unit, and thereby sending and receiving, and exchanging of a variety of information or data can be performed between the cloud computer and the display instrument.

The dimming device may be disposed in the region of the optical device from which light is emitted so as to be attachable and detachable. In order to dispose the dimming device so as to be attachable and detachable, for example, the dimming device may be installed in the optical device using screws made of transparent plastic, and may be connected to the control circuit (for example, included in the control device 18 for controlling the image forming device) for controlling the light transmittance of the dimming device via connectors and wires.

Depending on cases, a light shutter according to an electrodeposition method employing electrodeposition and dissociation phenomena caused by a reversible oxidation-reduction reaction of a metal (for example, silver particles) may be used. Specifically, $Ag^+$ and $I^-$ are dissolved in an organic solvent, an appropriate voltage is applied to electrodes so as to reduce $Ag^+$, and thus Ag is deposited, thereby decreasing the light transmittance of the dimming device. On the other hand, Ag is oxidized so as to be dissolved as $Ag^+$, thereby increasing the light transmittance of the dimming device. Alternatively, a light shutter employing a color variation of a material caused by the oxidation-reduction reaction of an electrochromic material may be used. Specifically, the first electrode and the second electrode are formed of so-called transparent beta electrodes, and a first electrochromic material layer and a second electrochromic material layer are interposed between the first electrode and the second electrode. The first electrochromic material layer is formed using, for example, a Prussian blue complex, and the second electrochromic material layer is formed using, for example, a nickel-substituted Prussian blue complex. Alternatively, depending on cases, a light shutter which controls light transmittance using an electrowetting phenomenon may be used. Specifically, the first electrode is patterned in a comb shape, whereas the second electrode is formed of a so-called transparent beta electrode, and an insulating first liquid and a conductive second liquid fill a gap between the first electrode and the second electrode. In addition, a voltage is applied between the first electrode and the second electrode, and thereby a shape of an interface between the first liquid and the second liquid varies, for example, from a planar shape to a curved shape so as to control the light transmittance.

In addition, the present disclosure may be implemented as the following configurations.

(1) A head-mounted display device comprising:
an image display apparatus configured to display a captured image of a portion of an environment viewable through the head-mounted display device; and
a dimmer configured to, while the captured image is displayed, allow a portion of ambient light from the environment to pass through the dimmer.

(2) The head-mounted display device of (1), further comprising:
at least one storage device configured to store display data; and
wherein the image display apparatus is further configured to display the display data.

(3) The head-mounted display device of (2), wherein the display data is selected from the group comprising a character, a word, a sentence, a figure, an illustration, a still image and a moving image.

(4) The head-mounted display device of (1), further comprising:
a controller configured to, in response to receiving an indication to switch from a first mode of operation to a subsequent mode of operation:
command the image display apparatus to switch from displaying the captured image to displaying the display data; and
command the dimmer to switch from allowing a first portion of ambient light from the environment to pass through the dimmer to allowing a second portion of ambient light from the environment to pass through the dimmer.

(5) The head-mounted display device of (4), wherein the display data is at least one word describing at least one subject of the environment viewable through the head-mounted display device.

(6) The head-mounted display device of (4), wherein the display data is at least one image corresponding at least one subject of the environment viewable through the head-mounted display device.

(7) The head-mounted display device of (4), wherein:
the first portion of ambient light to pass through the dimmer is less than the second portion of ambient light to pass through the dimmer.

(8) The head-mounted display device of (4), wherein the indication to switch from the first mode of operation to the subsequent mode of operation is received from a user of the head-mounted display device.

(9) The head-mounted display device of (8), further comprising:

a microphone configured to receive a voice command from the user to switch from the first mode of operation to a subsequent mode of operation.

(10) The head-mounted display device of (8), further comprising:
an infrared receiver configured to receive a eye-blinking command from the user to switch from the first mode of operation to a subsequent mode of operation.

(11) A method of displaying information on a head-mounted display device, the method comprising:
displaying a captured image of a portion of an environment viewable through the display device; and
dimming ambient light received through the head-mounted display device from the environment while displaying the captured image.

(12) The method of (11), further comprising:
displaying display data stored in at least one storage device.

(13) The method of (12), wherein the display data is selected from the group comprising a character, a word, a sentence, a figure, an illustration, a still image and a moving image.

(14) The method of (12), further comprising:
in response to receiving an indication to switch from a first mode of operation to a subsequent mode of operation:
switching from displaying the captured image to displaying the display data; and
switching from dimming the ambient light received through the display device from the environment by a first amount to dimming the ambient light received through the display device from the environment by a second amount.

(15) The method of (14), wherein the display data is at least one word describing at least one subject of the environment viewable through the display device.

(16) The method of (14), wherein the display data is at least one image corresponding to at least one subject of the environment viewable through the display device.

(17) The method of (14), wherein the first amount more than the second amount.

(18) The method of (14), wherein the indication to switch from the first mode of operation to a subsequent mode of operation is received from a user of the head-mounted display device.

(19) The method of (18), wherein the indication from the user is a voice command or an eye-blinking command.

(20) A head-mounted display device comprising:
display means for displaying a captured image of a portion of an environment viewable through the display device; and
dimming means for dimming ambient light received through the head-mounted display device from the environment while displaying the captured image.

(21) Display Device
A display instrument including
(i) a frame that is worn on a head part of an observer;
(ii) an image display apparatus that is installed in the frame; and
(iii) an imaging apparatus,
wherein the image display apparatus includes
(A) an image forming device;
(B) an optical device that allows light emitted from the image forming device to be incident thereto, to be guided, and to be emitted therefrom; and
(C) a dimming device that adjusts a light amount of ambient light incident from the outside, and wherein, in a first mode in which an image captured by the imaging apparatus is displayed on the image display apparatus, the light amount of ambient light incident from the outside is reduced by the dimming device.

(22) The display instrument set forth in (21), wherein, in the first mode, the overall image or a portion thereof captured by the imaging apparatus is displayed in the image forming device.

(23) The display instrument set forth in (21), further including an image information storage device, wherein, in the first mode, data regarding a subject imaged by the imaging apparatus is compared with information stored in the image information storage device, and an image of the subject conforming to the information stored in the image information storage device is displayed on the image display apparatus in a state where a light amount of ambient light incident from the outside is reduced by the dimming device.

(24) The display instrument set forth in (23), wherein the data regarding the subject imaged by the imaging apparatus is compared with the information stored in the image information storage device, and information corresponding to the data regarding the subject is displayed on the image display apparatus.

(25) The display instrument set forth in any one of (21) to (24), wherein, in the first mode, when a light amount of ambient light incident to the dimming device is "1", a light amount of the ambient light passing through the dimming device is 0.1 or less.

(26) The display instrument set forth in any one of (21) to (25), further including an image information storage device, wherein, in a second mode different from the first mode, data regarding a subject imaged by the imaging apparatus is compared with information stored in the image information storage device, and information corresponding to the data regarding the subject is displayed on the image display apparatus in a state where a light amount of ambient light incident from the outside is not reduced by the dimming device.

(27) The display instrument set forth in (26), wherein, in the second mode, information corresponding to the data regarding the subject is displayed on the image display apparatus so as to overlap the subject viewed through the dimming device and the optical device or around the subject.

(28) The display instrument set forth in (26) or (27), further including a microphone, wherein switching between the first mode and the second mode is controlled by inputting sound using the microphone.

(29) The display instrument set forth in (26) or (27), further including an infrared-ray emitting and receiving device, wherein switching between the first mode and the second mode is controlled using the infrared-ray emitting and receiving device.

(30) The display instrument set forth in any one of (26) to (29), wherein, in the second mode, when a light amount of ambient light incident to the dimming device is "1", a light amount of the ambient light passing through the dimming device is 0.3 to 0.8.

(31) The display instrument set forth in any one of (21) to (29), further including an image information storage device, wherein, in a third mode different from the first mode, data regarding a subject imaged by the imaging apparatus is compared with information stored in the image information storage device, and an image of the subject having data corresponding to information stored in the image information storage device is displayed on the image display apparatus in a state where a light amount of ambient light incident from the outside is not reduced by the dimming device.

(32) The display instrument set forth in (31), wherein, in the third mode, when a light amount of ambient light incident to the dimming device is "1", a light amount of the ambient light passing through the dimming device is 0.1 to 0.6.

(33) The display instrument set forth in (31) or (32), wherein, in the third mode, the image of the subject displayed on the image display apparatus is adjusted so as to overlap the subject viewed through the dimming device and the optical device with the image of the subject displayed on the image display apparatus.

(34) The display instrument set forth in (31) or (32), wherein, in the third mode, the image of the subject displayed on the image display apparatus is adjusted such that the image of the subject displayed on the image display apparatus is smaller than the subject viewed through the dimming device and the optical device.

(35) The display instrument set forth in any one of (21) to (34), further including a pair of image display apparatuses installed in the frame, wherein one of the image display apparatuses is in a state where a light amount of ambient light incident from the outside is not reduced by the dimming device at all times.

(36) Image Display Method

An image display method using a display instrument including
  (i) a frame that is worn on a head part of an observer;
  (ii) an image display apparatus that is installed in the frame; and
  (iii) an imaging apparatus, wherein the image display apparatus includes
    (A) an image forming device;
    (B) an optical device that allows light emitted from the image forming device to be incident thereto, to be guided, and to be emitted therefrom; and
    (C) a dimming device that adjusts a light amount of ambient light incident from the outside, the method including causing the dimming device to reduce the light amount of ambient light incident from the outside in a first mode in which an image captured by the imaging apparatus is displayed on the image display apparatus.

(37) The image display method set forth in (36), wherein the display instrument further includes an image information storage device, and wherein, in a second mode after performing the first mode, data regarding a subject imaged by the imaging apparatus is compared with information stored in the image information storage device, and information corresponding to the data regarding the subject is displayed on the image display apparatus in a state where a light amount of ambient light incident from the outside is not reduced by the dimming device.

(38) The image display method set forth in (36) or (37), wherein the display instrument further includes an image information storage device, and wherein, in a third mode after performing the first mode, data regarding a subject imaged by the imaging apparatus is compared with information stored in the image information storage device, and an image of the subject having data corresponding to information stored in the image information storage device is displayed on the image display apparatus in a state where a light amount of ambient light incident from the outside is not reduced by the dimming device.

(39) The image display method set forth in (38), wherein, in the third mode, the image of the subject displayed on the image display apparatus is adjusted so as to overlap the subject viewed through the dimming device and the optical device with the image of the subject displayed on the image display apparatus.

(40) The image display method set forth in (38), wherein, in the third mode, the image of the subject displayed on the image display apparatus is adjusted such that the image of the subject displayed on the image display apparatus is smaller than the subject viewed through the dimming device and the optical device.

It should be understood by those skilled in the art that various modifications, combinations, sub-combinations and alterations may occur depending on design requirements and other factors insofar as they are within the scope of the appended claims or the equivalents thereof.

What is claimed is:

1. A head-mounted display device comprising:
   an image sensor configured to capture an image of a portion of an environment viewable through the head-mounted display device;
   a display configured to display an image captured by the image sensor of the portion of the environment viewable through the head-mounted display device, the display comprising at least one diffraction grating member comprising a plurality of laminated diffraction grating layers each causing diffractive reflection of light beams of a different wavelength band;
   a light shutter configured to allow an amount of ambient light from the environment to pass through the light shutter when the head-mounted display is configured in a first mode of operation, and to decrease the amount of ambient light from the environment allowed to pass through the light shutter when the head-mounted display device is configured in a second mode of operation; and
   a control circuit configured to:
      selectively place the head-mounted display in either of the first mode of operation or the second mode of operation,
      process the image captured by the image sensor to extract feature points therefrom and to compare the extracted feature points with information identifying feature points of various objects to determine whether the extracted feature points conform to the feature points identified by the information, and
      in response to determining that the extracted feature points conform to the feature points identified by the information, cause the light shutter to decrease the amount of ambient light that is allowed to pass the light shutter and cause the display to present display data together with the captured image.

2. The head-mounted display device of claim 1, wherein the display data is selected from the group consisting of a character, a word, a sentence, a figure, an illustration, a still image and a moving image.

3. The head-mounted display device of claim 1, wherein:
   the display is configured so as not to display the display data when the head-mounted display device is configured in the first mode of operation.

4. The head-mounted display device of claim 3, wherein the display data comprises at least one word describing at least one subject of the environment viewable through the head-mounted display device.

5. The head-mounted display device of claim 3, wherein the display data comprises at least one image corresponding at least one subject of the environment viewable through the head-mounted display device.

6. The head-mounted display device of claim 3, further comprising a user interface configured to allow a user of the head-mounted display device to input an indication to cause the controller to switch the head-mounted display from the second mode of operation to the first mode of operation.

7. The head-mounted display device of claim 6, wherein the user interface comprises a microphone configured to receive a voice command from the user to switch from the second mode of operation to the first mode of operation.

8. The head-mounted display device of claim 6, wherein the user interface comprises an infrared receiver circuit configured to receive an eye-blinking command from the user to switch from the second mode of operation to the first of operation.

9. The head-mounted display of claim 3, wherein the display is configured so as not to display the captured image data when the head-mounted display is configured in the first mode of operation.

10. The head-mounted display of claim 3, wherein the display is configured to display the display data when the head-mounted display is configured in the second mode of operation.

11. The head-mounted display of claim 3, wherein the display is configured to display the captured image data when the head-mounted display is configured in the first mode of operation.

12. The head-mounted display of claim 11, wherein the display is configured to display the display data when the head-mounted display is configured in the second mode of operation.

13. The head-mounted display of claim 11, wherein the display is configured so as not to display the display data when the head-mounted display is configured in the second mode of operation.

14. The head-mounted display of claim 1, wherein the display is configured to display the display data when the head-mounted display is configured in the second mode of operation.

15. A method of displaying information on a head-mounted display device, the method comprising:
   with an image sensor of the head-mounted display device, capturing an image of a portion of an environment viewable through the display device;
   displaying on a display an image captured by the image sensor of the portion of the environment viewable through the display device, the display comprising at least one diffraction grating member comprising a plurality of laminated diffraction grating layers each causing diffractive reflection of light beams of a different wavelength band;
   controlling a light shutter so as to allow an amount of ambient light from the environment to pass through the light shutter in a first mode of operation and to decrease the amount of ambient light from the environment that is allowed to pass through the light shutter in a second mode of operation;
   processing the captured image to extract feature points therefrom;
   comparing the extracted feature points with information that identifies feature points of various objects to determine whether the extracted feature points conform to the feature points identified by the information; and
   in response to determining that the extracted feature points conform to the feature points identified by the information, controlling the light shutter to decrease the amount of ambient light that is allowed to pass the light shutter and displaying, on the display, display data corresponding to the information.

16. The method of claim 15, wherein the display data is selected from the group consisting of a character, a word, a sentence, a figure, an illustration, a still image and a moving image.

17. The method of claim 15, further comprising:
in response to receiving an indication to switch from the second mode of operation to the first mode of operation:
  switching from displaying the captured image to displaying the display data; and
  switching from controlling the light shutter to decrease the amount of ambient light from the environment that is allowed to pass through the light shutter to controlling the light shutter to allow the amount of ambient light from the environment to pass through the shutter.

18. The method of claim 17, wherein the display data comprises at least one word describing at least one subject of the environment viewable through the display device.

19. The method of claim 17, wherein the display data comprises at least one image corresponding to at least one subject of the environment viewable through the display device.

20. The method of claim 17, wherein the indication to switch from the second mode of operation to the first mode of operation is received from a user of the head-mounted display device.

21. The method of claim 20, wherein the indication from the user is a voice command or an eye-blinking command.

* * * * *